US012445505B2

(12) United States Patent
Liu et al.

(10) Patent No.: US 12,445,505 B2
(45) Date of Patent: Oct. 14, 2025

(54) ELECTRONIC CONFERENCING

(71) Applicant: Apple Inc., Cupertino, CA (US)

(72) Inventors: Xudong Liu, Campbell, CA (US);
Huan He, Mountain View, CA (US);
Nelson M. Leduc, San Jose, CA (US);
Nicholas J. Circosta, Mountain View, CA (US); Daniel B. Pollack, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/485,274

(22) Filed: Sep. 24, 2021

(65) Prior Publication Data

US 2022/0247705 A1    Aug. 4, 2022

Related U.S. Application Data

(60) Provisional application No. 63/189,148, filed on May 15, 2021, provisional application No. 63/143,714, filed on Jan. 29, 2021.

(51) Int. Cl.
*H04L 65/1069* (2022.01)
*A63F 13/79* (2014.01)
(Continued)

(52) U.S. Cl.
CPC .......... *H04L 65/1069* (2013.01); *A63F 13/79* (2014.09); *A63F 13/87* (2014.09);
(Continued)

(58) Field of Classification Search
CPC ............. H04L 65/1069; H04L 12/1813; H04L 12/1818; H04L 12/1822; H04L 51/046;
(Continued)

(56) References Cited

U.S. PATENT DOCUMENTS 6,192,123 B1    2/2001  Grunsted
6,851,053 B1    2/2005  Liles
(Continued)

FOREIGN PATENT DOCUMENTS

CN    103299313 A    9/2013
CN    104125071 A    10/2014
(Continued)

OTHER PUBLICATIONS

International Search Report and Written Opinion from PCT/US2021/063225, dated May 3, 2022, 14 pages.
(Continued)

*Primary Examiner* — Suraj M Joshi
(74) *Attorney, Agent, or Firm* — BAKERHOSTETLER

(57) ABSTRACT

Aspects of the subject technology provide for secure, privacy-preserving access to electronic conferencing. In one or more implementations, an electronic device may obtain a service-specific alias that is specific to a device-identified set of services. The service-specific alias may be separate from an account alias for an account and configured to allow or deny communications to one or more devices associated with the account via the set of services. In one or more implementations, the service-specific alias is associated with a conferencing service and a conferencing session. An initiating user can provide an invitation to the conferencing session with the service-specific alias, so that participants can contact the initiating user via the service-specific alias for permission to join the conferencing session (e.g., without revealing the permanent contact information of the initiating user). In this way, the privacy of the initiating user can be preserved.

21 Claims, 27 Drawing Sheets

(51) Int. Cl.
*A63F 13/87* (2014.01)
*G06F 16/955* (2019.01)
*H04L 9/40* (2022.01)
*H04L 12/18* (2006.01)
*H04L 51/046* (2022.01)
*H04L 51/212* (2022.01)
*H04L 51/52* (2022.01)
*H04L 65/403* (2022.01)

(52) U.S. Cl.
CPC ...... *G06F 16/9566* (2019.01); *H04L 12/1813* (2013.01); *H04L 12/1818* (2013.01); *H04L 12/1822* (2013.01); *H04L 51/046* (2013.01); *H04L 51/212* (2022.05); *H04L 51/52* (2022.05); *H04L 63/0421* (2013.01); *H04L 63/0442* (2013.01); *H04L 63/06* (2013.01); *H04L 63/102* (2013.01); *H04L 63/108* (2013.01); *H04L 65/403* (2013.01)

(58) Field of Classification Search
CPC ... H04L 51/212; H04L 51/52; H04L 63/0421; H04L 63/0442; H04L 63/06; H04L 63/102; H04L 63/108; H04L 65/403; H04L 63/0414; H04L 63/101; G06F 16/9566
See application file for complete search history.

(56) References Cited

U.S. PATENT DOCUMENTS

| | | |
|---|---|---|
| 8,811,962 B1 | 8/2014 | Smith |
| 9,049,024 B2 | 6/2015 | Sundaram |
| 9,203,875 B2 | 12/2015 | Huang et al. |
| 9,781,257 B2 | 10/2017 | Bloebaum |
| 10,135,612 B1 | 11/2018 | Leavy |
| 11,095,724 B2 | 8/2021 | Fisher |
| 11,308,228 B1 | 4/2022 | Tian |
| 2002/0091769 A1 | 7/2002 | Drozdzewicz |
| 2004/0066709 A1 | 4/2004 | Morykwas |
| 2005/0129193 A1 | 6/2005 | Watts |
| 2006/0140200 A1* | 6/2006 | Black ................. H04L 65/1043 370/401 |
| 2008/0226051 A1 | 9/2008 | Srinivasan |
| 2009/0235329 A1 | 9/2009 | Chavez |
| 2011/0051912 A1 | 3/2011 | Sundaram |
| 2011/0302408 A1 | 12/2011 | McDermott |
| 2011/0302708 A1 | 12/2011 | McDermott |
| 2012/0226997 A1 | 9/2012 | Pang |
| 2012/0331401 A1 | 12/2012 | Tipimeni |
| 2013/0018950 A1 | 1/2013 | Narayanan |
| 2013/0022190 A1 | 1/2013 | Oliver |
| 2013/0336310 A1 | 12/2013 | Laasik |
| 2014/0099004 A1 | 4/2014 | DiBona |
| 2014/0136949 A1 | 5/2014 | Wang |
| 2015/0180981 A1 | 6/2015 | Tan |
| 2016/0087940 A1* | 3/2016 | Miller ................. G06F 9/45558 726/15 |
| 2016/0174064 A1 | 6/2016 | Brinskele |
| 2016/0247123 A1 | 8/2016 | Hoist |
| 2017/0104959 A1 | 4/2017 | Bracken |
| 2017/0142096 A1 | 5/2017 | Reddy |
| 2019/0103984 A1 | 4/2019 | Yang |
| 2019/0149511 A1* | 5/2019 | Dias ........................ H04L 12/12 726/5 |
| 2019/0205410 A1* | 7/2019 | Goldberg .............. G06F 16/156 |
| 2020/0084057 A1 | 3/2020 | Wadhwa |
| 2020/0137025 A1 | 4/2020 | Sapul |
| 2020/0358755 A1* | 11/2020 | Abdul ..................... H04L 67/55 |
| 2022/0232010 A1* | 7/2022 | Zhang ..................... G06F 21/44 |

FOREIGN PATENT DOCUMENTS

| | | |
|---|---|---|
| CN | 108650482 A | 10/2018 |
| CN | 108833943 A | 11/2018 |
| CN | 112565656 A | 3/2021 |
| DE | 60210575 T2 | 4/2007 |
| EP | 1701511 A | 9/2006 |
| JP | 2015-532802 A | 11/2015 |
| WO | WO 2015/013592 | 1/2015 |

OTHER PUBLICATIONS

Desruisseaux, RFC 5545—Internet Calendaring and Scheduling Core Object Specification (iCalendar), Sep. 2009.
Partial European Search Report from European Patent Application No. 24197009.4, dated Sep. 20, 2024, 13 pages.
Extended European Search Report from European Patent Application No. 24197009.4, dated Dec. 11, 2024, 10 pages.
Indian Office Action from Indian Patent Application No. 202317047267, dated Jan. 2, 2025, 7 pages with English translation.

\* cited by examiner

ELECTRONIC CONFERENCING

CROSS REFERENCE TO RELATED APPLICATIONS

This application claims the benefit of priority to U.S. Provisional Patent Application No. 63/143,714, entitled "Video Conferencing," filed on Jan. 29, 2021, and U.S. Provisional Patent Application No. 63/189,148, entitled "Electronic Conferencing," filed on May 15, 2021, the disclosure of each of which is hereby incorporated herein in its entirety.

TECHNICAL FIELD

The present description relates generally to electronic conferencing, including, for example, secure, privacy-preserving, access to conferencing using electronic devices.

BACKGROUND

Video conferencing allows people in remote locations to each view an incoming video stream of each other in real time.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Conferencing applications can be installed on electronic devices to allow users of the electronic devices to exchange and view audio and/or video feeds of each other in real time, such as in a video conferencing session. However, users that do not have the conferencing application installed on their device, users that do not have an updated version of the conferencing application on their device, and/or users of devices running platforms (e.g., operating systems) that are not compatible with the conferencing application can sometimes be undesirably excluded from a conferencing session that the other participant(s) of the conferencing session would like that user to join.

In some scenarios, web-based access to a conferencing session can be provided by a server, for a user of an electronic device that does not have access to the conferencing application being used by other participants in the session. However, it can be challenging to provide web-based access to a conference while protecting the privacy of the participants, preventing eavesdropping on the audio and/or video streams being exchanged during the conferencing session, preventing uninvited participants from joining the conference, and allowing server operations for data exchanges without exposing conference content and/or participants to the server(s).

Aspects of the subject technology disclosed herein can be helpful, for example, in providing secure, privacy-preserving web-based access to electronic conferencing, such as for users that do not have a conferencing application installed on their device, users that do not have an updated version of the conferencing application on their device, and/or users of devices running platforms (e.g., operating systems) that are not compatible with the conferencing application.

Figure 1:
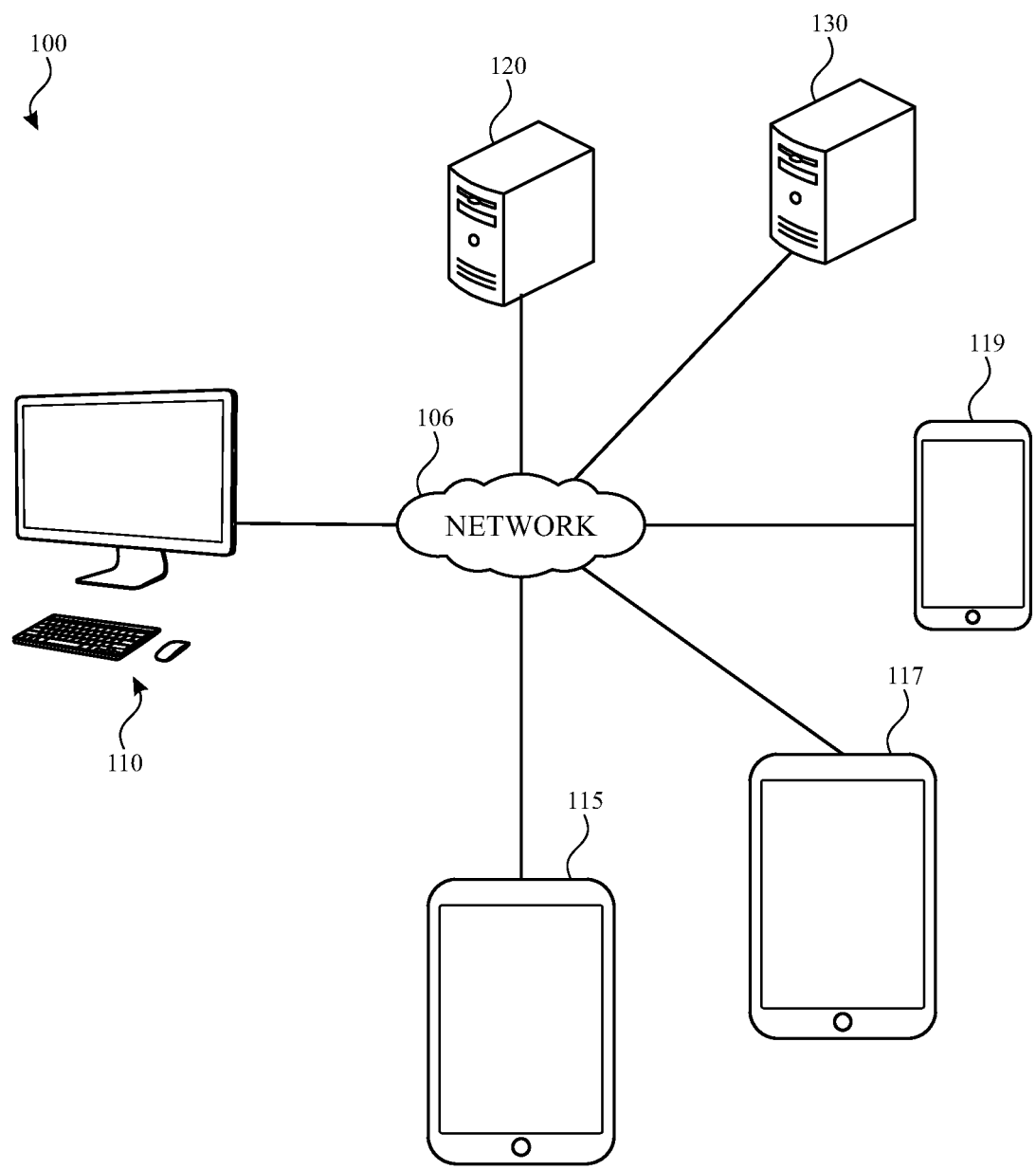
FIG. 1 illustrates an example network environment for electronic conferencing in accordance with one or more implementations.

FIG. 1 illustrates an example network environment 100 in which electronic conferencing may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, an electronic device 117, an electronic device 119, a server 120 (e.g., an identity server), and a server 130 (e.g., an application server and/or a relay server). The network 106 may communicatively (directly or indirectly) couple the electronic device 110, the electronic device 115, the electronic device 117, the electronic device 119, the server 120, and/or the server 130. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, the electronic device 117, the server 120, and the server 130; however, the network environment 100 may include any number of electronic devices and/or any number of servers communicatively coupled to each other directly or via network 106.

The electronic device 110, the electronic device 115, the electronic device 117, and/or the electronic device 119 may each be any of, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 110 may include a video conferencing application installed and accessible by a user of the electronic device.

In FIG. 1, by way of example, the electronic device 110 is depicted as a desktop computer. In one or more implementations, the electronic device 110 may include a camera and may provide a conferencing application and/or a browser for exchanging audio and/or video streams, over the network 106, with a corresponding conferencing application that is installed and accessible at, for example, electronic device 115. In FIG. 1, by way of example, the electronic device 115 is depicted as a tablet device with a touchscreen. In one or more implementations, the electronic device 115 may also include a camera and may provide a conferencing application for exchanging audio and/or video streams, over the network 106, with the a corresponding application that is installed and accessible at electronic device 110 and/or with web-application being operated via electronic device 110. In FIG. 1, by way of example, the electronic device 117 is depicted as a tablet device with a touchscreen. In one or more implementations, the electronic device 117 may also include a camera and may provide a conferencing application and/or a web browser application for accessing the network 106. In FIG. 1, by way of example, the electronic device 119 is depicted as a smartphone with a touchscreen. In one or more implementations, the electronic device 119 may include a video conferencing application installed and accessible by a user of the electronic device.

In one or more implementations, the electronic device 115, the electronic device 117, and/or the electronic device 119 may be logged into an account with a server such as the server 120 and/or the server 130. In one or more implementations, the electronic device 110 may not be associated with or may not be logged in to an account with the server 120 and/or the server 120 in various operational scenarios described herein as examples. In one or more implementations, the electronic device 119 and/or the electronic device 117 may be associated with (e.g., logged into and/or registered to) an account with which the electronic device 115 is also associated e.g., logged into and/or registered to). In one or more implementations, the electronic device 110, the electronic device 115, the electronic device 117, and/or the electronic device 119 may be, and/or may include all or part of, the electronic device discussed below with respect to the electronic system discussed below with respect to FIG. 33. In one or more implementations, the electronic device 119 may also include a camera and may provide a conferencing application and/or web browser application and/or a conferencing application for accessing the network 106.

In one or more implementations, one or more servers such as the server 120 and/or the server 130 may perform operations for managing secure exchange of audio and/or video streams between various electronic devices such as the electronic device 110, the electronic device 115, the electronic device 117, and/or the electronic device 119, such as during a conferencing session. In one or more implementations, the server 120 may be or include an identity server that stores account information associated with the electronic device 110, the electronic device 115, the electronic device 119, and/or users of those devices. In one or more implementations, the server 120 may store mappings between temporary identifiers (e.g., service-specific aliases) for accounts of users that initiate and/or participate in conferencing sessions and other identifiers (e.g., account aliases, account identifiers, telephone numbers, email addresses, or other permanent identifiers) for the accounts. In one or more implementations, one or more servers such as the server 130 may be or include an application server that provide resources (e.g., browser code such as JavaScript code, content for notifications, updates to session access information, encrypted data, and/or other resources) for web-based access to, and/or participation in a conferencing session by, for example, the electronic device 117, with, for example, the electronic device 110, the electronic device 115, and/or the electronic device 119 (and/or one or more other devices). In one or more implementations, one or more servers such as the server 130 may be or include a relay server that relays encrypted communications between devices that have been admitted into a conferencing session and that are participants in the conferencing session. In one or more implementations, a relay server may manage expellability of one or more participant devices that are connected to a conferencing session. In one or more implementations, one or more servers, such as the server 130 may communicate with an identity server (e.g., server 120) before, during, and/or after a communication session, such as to map aliases to accounts, and/or to obtain contact information for one or more devices having and/or logged into an account with the identity server or the application server. For explanatory purposes, the server 120 and the server 130 are each depicted as a single server. However, it is appreciated that the server 120 and/or the server 130 may be implemented as a common server, or may each be implemented as multiple servers, such as a system of servers. For example, in one or more implementations, the server 130 may represent one or more application servers and/or one or more relay servers.

Figure 2:
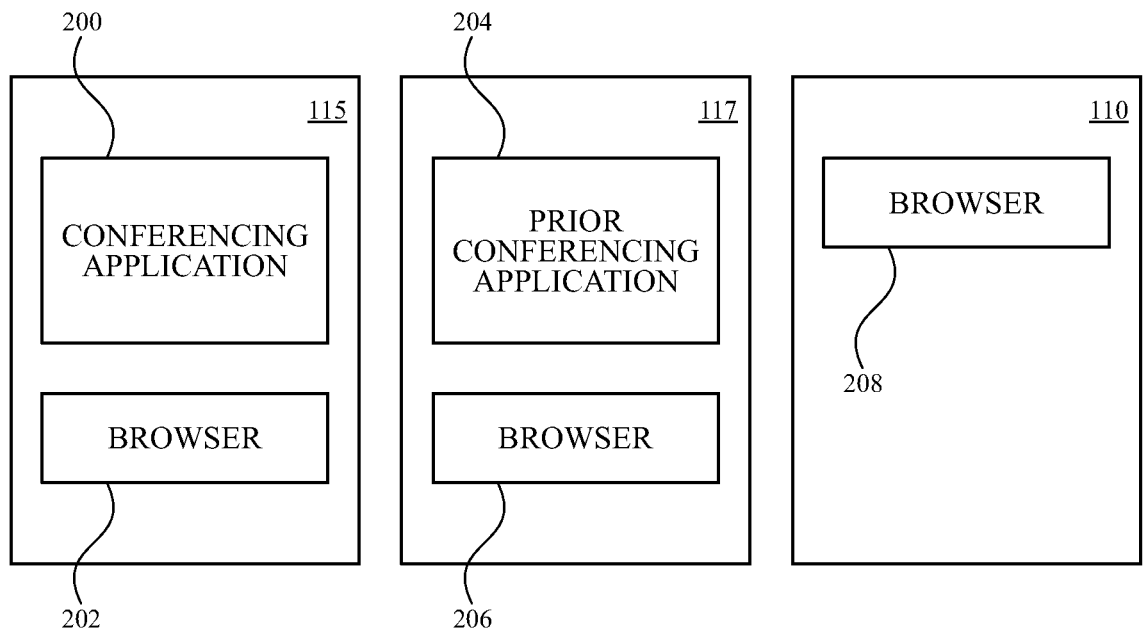
FIG. 2 illustrates a schematic diagram showing aspects of exemplary electronic devices that may be participant devices in a conferencing session in accordance with one or more implementations

FIG. 2 illustrates schematic diagrams of various electronic devices that can be participant devices in a call or a conferencing session, in accordance with implementations of the subject technology. In the example of FIG. 2, electronic device 115 includes a conferencing application 200 and a browser 202. For example, the electronic device 115 having the conferencing application 200 may have the code for the standalone conferencing application 200 installed on the electronic device 115. For example, the code for executing the conferencing application 200 may have been downloaded to the electronic device 115 from an application store or repository (e.g., at a remote server) and installed for execution at the electronic device 115. The electronic device 115 may initiate, using the conferencing application 200, a conferencing session (also referred to herein as a call) such as an audio conferencing session (also referred to herein as an audio call) or a video conferencing session (also referred to herein as a video call). For example, the electronic device 115 may initiate the conferencing session, in part, by inviting one or more other electronic devices to the conferencing session through app-based communications with instances of the conferencing application 200 running on the other devices. Initiating the conferencing session may also include beginning the conferencing session, such as by establishing communications with a server such as a relay server for the conferencing session and/or with one or more of the other electronic device, via the relay server.

However, as illustrated in FIG. 2 some electronic devices, such as electronic device 117, may have a prior conferencing application 204 installed thereon, such as a version of the conferencing application 200 that is outdated or incompatible with the version of the conferencing application 200 at the device that is initiating the conferencing session. For example, the electronic device 117 having the prior conferencing application 202 may have the code for the standalone prior conferencing application 202 installed on the electronic device 117. For example, the code for executing the prior conferencing application 202 may have been downloaded to the electronic device 117 from an application store or repository (e.g., at a remote server), and installed for execution at the electronic device 117, prior to the conferencing application 200 (e.g., an updated version of the prior conferencing application 202) becoming available from the application store or repository. In one or more implementations, a portion of the code for the prior conferencing application 202 may include code (e.g., hooks) that can be used to communicate with the updated version of the conferencing application 202, so that the prior conferencing application 202 may utilize parts of new features of the conferencing application 200, without the prior conferencing application 202 having all of the code corresponding to the new features. For example, the hooks may include hooks for processing components of a link received from the conferencing application 200, and/or for redirecting a call invitation to a web-based application, such as a browser at the electronic device 117. For example, the electronic device 117 may also have a browser 206 or other application for accessing web-based content. As described in further detail hereinafter in connection with, for example, FIGS. 4 and 5, the electronic device 115 may invite electronic device 117 that has a prior conferencing application 204 to a call or conferencing session by providing components of a link for the call or conferencing session to the prior conferencing application 204 at that device. It is also appreciated that, in one or more implementations, the electronic device 117 may have, obtain, or upgrade to the fully updated version of the conferencing application 200.

As another example, other electronic devices, such as electronic device 110 in FIG. 2, may have a browser 208, but may not have any version of the conferencing application 200 installed or available at the device. For example, the electronic device (e.g., electronic device 110) may have a different operating system and/or a different manufacturer from the device initiating the conferencing session using conferencing application 200, or may simply not have downloaded or installed the conferencing application 200. As described in further detail hereinafter in connection with, for example, FIGS. 6-32, the electronic device 115 may invite electronic device 110 that has a browser 208 but does not have a conferencing application 200 to a call or conferencing session by providing a link for the call to the electronic device 110. FIGS. 7-32 also illustrate various operations and/or interactions that may be performed by the electronic device 115 using conferencing application 200, the electronic device 117 using the prior conferencing application 204 and/or the browser 206, and/or the electronic device 110 using the browser 208, for joining and/or otherwise participating in a conferencing session.

Figure 3:
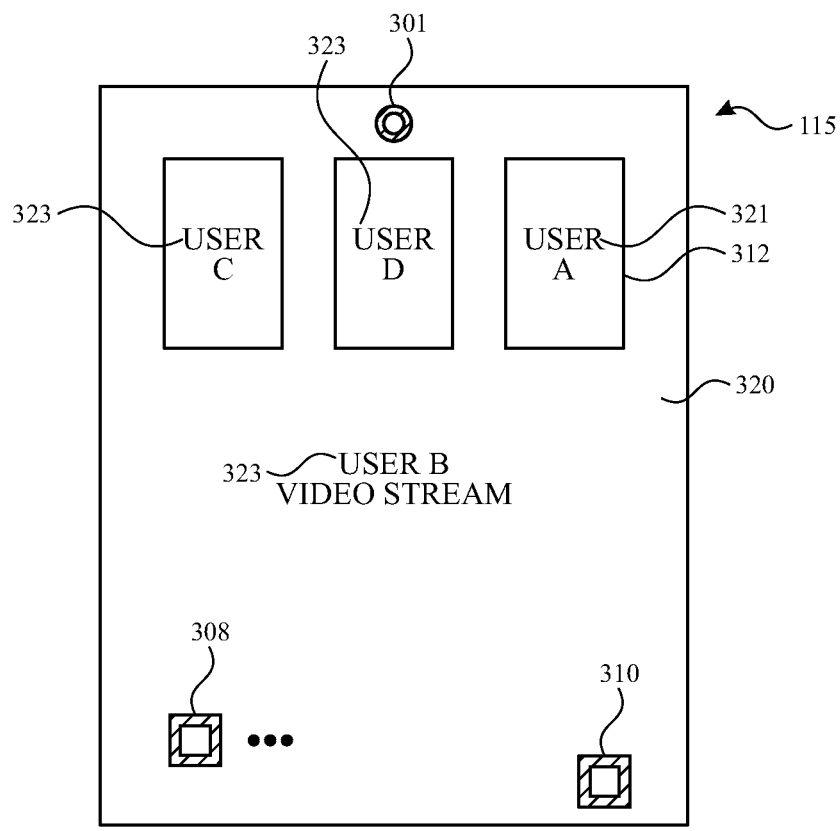
FIG. 3 illustrates a schematic diagram showing an example of a participant device during a conferencing session in accordance with one or more implementations.

FIG. 3 illustrates various aspects of a conferencing session in accordance with aspects of the subject disclosure. For example, electronic device 115 is shown in FIG. 3 during a conferencing session using a conferencing application (e.g., conferencing application 200) running at the device. As shown in the example of FIG. 3, the conferencing application at the electronic device 115 can provide a primary video stream view 320 and a secondary video stream view 312, such as a picture-in-picture video stream view. Electronic device 115 as shown in FIG. 3 includes a camera 301 that can, for a video conferencing session, obtain and provide a continuous stream of image frames that are provided to the conferencing application for viewing by the user of electronic device 115 (e.g., a user "A") and/or for transmission to one or more other participant devices (e.g., to electronic device 110 for a user "B", electronic device 117 for a user "C", and electronic device 119 for a user "D").

In the example of FIG. 3, the video stream 321 from camera 301 is an outgoing video stream being transmitted from electronic device 115 to remote electronic devices of remote users B, C, and D, and being locally displayed for user A in secondary video stream view 312. In the example of FIG. 3, an incoming video stream 323 from user "B" is displayed for viewing by user "A" in primary video stream view 320.

In the example of FIG. 3, the incoming video stream 323 for user B may be provided to the electronic device 115, for example, by a browser 208 executing code for a web-based application at electronic device 110 (e.g., in which the electronic device 110 that does not have the conferencing application installed interacts, via the browser 208, with code running at a server for the web-based application), and the incoming video stream 323 for user C may be provided to the electronic device 115, for example, by a browser 206 executing code for a web-based application at electronic device 117 (e.g., a device at which the video conferencing application is out of date or is unavailable). In one or more implementations, the incoming video stream 323 for user D may be provided to the electronic device 115, for example, by a conferencing application 200 running at electronic device 119.

In the example of FIG. 3, primary video stream view 320 covers substantially the entire display of electronic device 115 with a portion being covered by the secondary video stream view 312, and additional video stream views for an incoming video stream 323 for each of users C and D. However, this is merely illustrative, and other arrangements of primary video stream view 320 and secondary video stream view 312 can be provided (e.g., two equally sized side-by-side or top-bottom video stream views), and/or more or fewer participants (users) can participate in the video conferencing application.

As shown in FIG. 3, the conferencing application 200 may also provide input options such as camera-select option 310 (e.g., for switching to a rear-facing camera or other camera to provide the video stream 321) and an add option 308, which can be selected for inviting one or more new users to the conferencing session and/or generating a link to the conferencing session that can be provided to another device by other channels (e.g., in a text message, in an email, in a social media post, etc.). When a user such as user A selects the add option 308, the conferencing application 200 may provide an option to allow contact information (e.g., a telephone number or an email address) of a desired invitee to be provided to the conferencing application or selected from within the conferencing application (e.g., from a set of contacts stored at the electronic device). After receiving contact information for a desired invitee (e.g., to add the desired invitee to an ongoing conferencing session and/or to include the desired invitee in an initial invitation for a new conferencing session), the conferencing application 200 may determine (e.g., in cooperation with one or more servers such as server 120) whether one or more devices associated with the contact information have the conferencing application installed and available.

If it is determined that a device associated with the contact information has the conferencing application 200 installed and available, the conferencing application 200 of the device of user A (e.g., at electronic device 115) may interact with the conferencing application 200 at the device of the desired invitee to generate a native notification of the invitation. In this example, the device of the desired invitee can use the conferencing application 200 at that device to access the conferencing session.

If it is determined that a device associated with the contact information does not have the conferencing application installed and available or has an incompatible or outdated version of the conferencing application, the conferencing application 200 at electronic device 115 may generate information for a link to the conferencing session. In one or more implementations, the electronic device 115 may be unable to determine whether the conferencing application is installed or available at another device and may generate the link to the conferencing session based on being unable to make the determination. In one or more implementations, a link to the conferencing session may be generated a the electronic device 115 without attempting to determine whether a conferencing application is available at another device. The link (e.g., a web link as a uniform resource locator (URL) or a uniform resource indicator (URI) or other network identifier) and/or the information for the link can be provided to the device that does not have the conferencing application installed and available or has an incompatible or outdated version of the conferencing application via text message, email, or other messaging or network communications systems. In this example, the device of the desired invitee can use the link and/or the information for the link to access the conferencing session (e.g., using a web browser), such as described hereinafter in connection with various aspects of FIGS. 4-32.

Once a conferencing session has been established, for example, between electronic device 115, electronic device 110, electronic device 117, and/or electronic device 119, in order to protect the content of the exchanged video streams from, for example, eavesdropping (e.g., by malicious third-party actors and/or even by the servers 120 and/or 130), audio and/or video streams may be end-to-end encrypted, so that only the intended end users (e.g., the participants in the conferencing session that have decryption keys for the content) can access the content. However, it can also be helpful, in some implementations, to provide some information about the type of content being exchanged to one or more servers (e.g., one or more of servers 120 and/or 130), such as to allow the servers to better manage the exchange of the encrypted content. For example, metadata can be provided from a sending device (e.g., electronic device 115) to a server (e.g., server 130), from one server to another server, and/or from a server to a recipient device (e.g., electronic device 117), along with encrypted content. For example, the metadata may include a resolution for each of several versions of the encrypted video that facilitates a server determining which version to send to a recipient device, according to the capabilities of a recipient device.

Metadata that is provided with the end-to-end encrypted video content on one or more hops along the way between the sending device and the recipient device may be hop-by-hop encrypted. In this way, the metadata intended for access at a particular device and/or server can be decrypted by that devices and/or server, without allowing access to the end-to-end encrypted video content. In various implementations, the end-to-end encrypted video content may also be hop-by-hop encrypted (e.g., in a double encryption of the video content that includes a hop-by-hop encryption of the already end-to-end encrypted data) at one or more stages along the route between the sending device and the recipient device.

Video data is often encoded using network allocation layer (NAL) units. In one or more implementations, codec-specific packetization of encoded video data (e.g., for transmission of the data over a network such as network 106) can be performed by parsing the encoded video data to identify NAL units, and generating packets for transmission based on the NAL units. A recipient device (e.g., a depacketizer at the recipient device) can then detect and decode the NAL units in the packets for further processing and display of the video data. However, as described herein, video data can be end-to-end encrypted to prevent access to, or eavesdropping on, the video data during transmission. This encryption of encoded video data can prevent codec-specific packetizers and/or depacketizers from detecting the NAL units, which can be disruptive to packetization and/or depacketization processes.

In accordance with aspects of the subject technology, packetization operations for encrypted video content may be performed, for example, to allow depacketization of encrypted video data without requiring changes to a depacketizer. For example, a packetizer (e.g., at a sending device that is part of a video conferencing session with one or more recipient devices) may receive encrypted video data (e.g., encrypted encoded video frames that includes one or more encrypted NAL units), perform a codec-specific transformation of the encrypted video data to generate one or more new NAL units that include encrypted encoded video data, and then packetize the new NAL units that include encrypted encoded video data for transmission. In this way, a depacketizer (e.g., at a recipient device) that expects to receive unencrypted video data encoded using NAL units, can process new NAL units that include the encrypted encoded video data to expose the encrypted encoded video data for decryption and further processing at the recipient device(s).

In one or more other implementations, a generic packetizer may be provided that is not codec-specific (e.g., for packetization of encrypted video content). For example, a generic packetizer may packetize encrypted and/or unencrypted video content based on the available packet size and without reference to the content or any underlying encoding of the content to be packetized. For example, a generic packetizer may receive unencrypted or encrypted content such as encrypted video data, divide the received content according to a packet size, include the divided content in packets having the packet size (e.g., each packet including the divided data bounded by a start-of-packet and end-of-packet indicator), and fill and send the packets until all of the content has been sent. A generic packetizer may facilitate inclusion of information that may be useful to a server, such as server 120 and/or server 130, to accompany the encrypted video data in the packets. For example, the information may be added as metadata by the generic packetizer as header extensions for packets of encrypted video data. The information may include, for example, an indicator of whether the video data in the packet includes a keyframe (e.g., an I-frame or another frame that can be decoded independently of other video frames), a resolution or bit rate of the video data, a codec profile, or a timestamp (as examples) associated with the video data.

Figure 4:
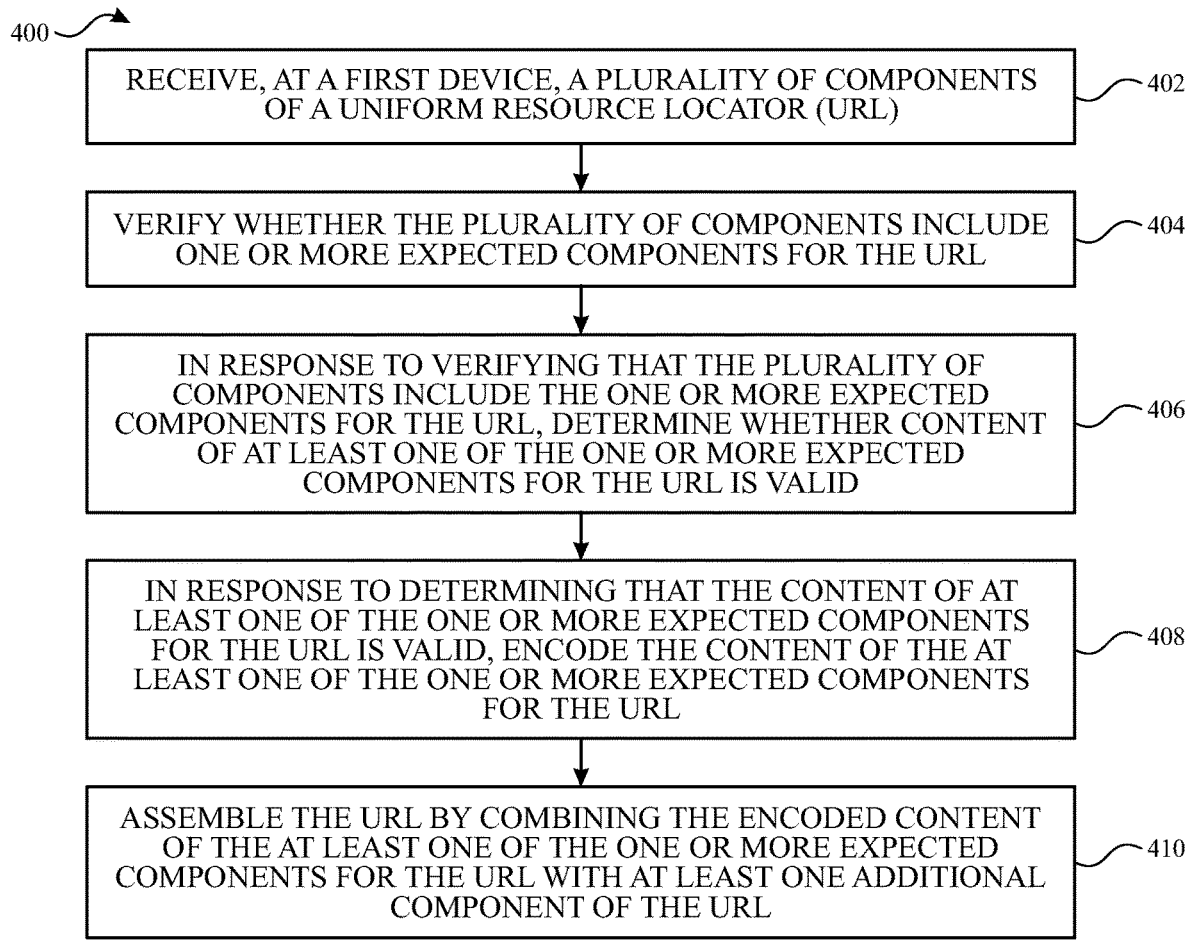
FIG. 4 illustrates a flow diagram of an example process for processing link information at a recipient device having a version of a conferencing application in accordance with one or more implementations.

FIG. 4 illustrates a flow diagram of an example process 400 for processing link information for a conferencing session, such as by a device having a prior conferencing application that is outdated or incompatible with a version of the conferencing application at a device that is initiating the conferencing session, in accordance with one or more implementations. For explanatory purposes, the process 400 is primarily described herein with reference to the components of FIG. 1 (particularly with reference to electronic device 117), which may be executed by one or more processors of the electronic device 117 of FIG. 1. However, the process 400 is not limited to the electronic device 117, and one or more blocks (or operations) of the process 400 may be performed by one or more other components of other suitable devices, such as one or more of the electronic device 110, the electronic device 115, the electronic device 119, and/or one or more servers such as the server 120 and/or the server 130. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a first device (e.g., electronic device 117) may receive a plurality of components of a uniform resource locator (URL). In one or more implementations, the plurality of components may not include sufficient information to contact another device. For example, the plurality of components may not include sufficient components to generate an actionable URL. For example, the plurality of components may be missing another component of the URL, such as a domain, a subdomain, a path component, a host component, and/or the like. The components of the URL may be received, for example, as part of an invitation to a video conferencing session with another device (e.g., electronic device 115), such as via a text message, an email, a webpage, or generally any message or communication. The plurality of components may include, for example, a version number corresponding to the URL, and an identifier and a key corresponding to a video conferencing session (e.g., an identifier and public key corresponding to the user and/or device that sent and/or created the invitation). In one or more implementations, receiving the plurality of components of the URL at the first device may include receiving the plurality of components of the URL with a first version of an application running at the first device from a second, different version of the application running at a second device.

At block 404, the first device verifies whether the plurality of components include one or more expected components for the URL. In response to a failure to verify the presence of the one or more expected components for the URL, an error message may be provided. Verifying whether the plurality of components include the one or more expected components for the URL may include determining whether the plurality of components include a version number corresponding to a format for the URL.

At block 406, in response to verifying that the plurality of components include the one or more expected components for the URL, the first device may determine whether content of at least one of the one or more expected components for the URL is valid. In response to a determination that the content of the at least of the one or more expected components for the URL is invalid, an error message may be provided.

Verifying (at block 404) whether the plurality of components include the one or more expected components for the URL may include determining whether the plurality of components include an identifier associated with a video conferencing session and associated with an initiating user of the video conferencing session. In one or more implementations, the identifier may be or include a temporary identifier (e.g., a service-specific alias) for the initiating user that is configured to expire after termination of the video conferencing session. In one or more implementations, a server such as server 120 may store a mapping between the temporary identifier and a permanent identifier for the initiating user. The temporary identifier may be revocable by the initiating user. The temporary identifier may be restricted to a particular service such as a video conferencing service.

Verifying whether the plurality of components include the one or more expected components for the URL may also include determining whether the plurality of components include a public key for the video conferencing session. The public key may be, for example, a public key of an (e.g., P-256) elliptic curve key agreement, where the private key is held by the initiating user of the video conferencing session. For example, verifying whether the plurality of components include the one or more expected components may include determining (e.g., without inspecting the content of the data) whether the number of received components matches an expected number of components, and/or determining whether a message including the plurality of components includes data in each of one or more message fields in which the expected components are expected to be received.

In one or more implementations, determining (at block 406) whether the content of at least one of the one or more expected components for the URL is valid may include determining whether the identifier conforms to a first expected format (e.g., a format having a header that flags the identifier as an identifier, and a data string having a predetermined number of bytes) and/or determining whether the public key conforms to a second expected format (e.g., determining whether the public key has a predetermined number of bytes of data having an expected type). In one or more implementations, the first expected format may include a header string and a universally-unique identifier (UUID) byte string having an expected number of bytes. In one or more implementations, the second expected format may include an expected number of bytes for the public key.

At block 408, in response to determining that the content of at least one of the one or more expected components for the URL is valid, the first device may encode the content of the at least one of the one or more expected components for the URL. Encoding the content of the at least one of the one or more expected components for the URL may include encoding the identifier and/or encoding the public key. Encoding the identifier may include transforming the identifier from a first format (e.g., the format in which the identifier was received) to a second format (e.g., a URL-safe format), such as by performing a URL-safe base-64 encoding of the bytes of the identifier. Encoding the public key may include transforming the public key from a first format (e.g., the format in which the public key was received) to a second format (e.g., a URL-safe format), such as by performing a URL-safe base-64 encoding of the bytes of the public key. However, these encodings are merely examples, and the identifier and/or the public key may be transformed using URL component encoding (e.g., percent encoding), protocol buffer (protobuf) encoding, or other encodings.

At block 410, the first device may assemble the URL by combining the encoded content of the at least one of the one or more expected components for the URL with at least one additional component of the URL. In one or more implementations, the at least one additional component of the URL includes a domain, and assembling the URL includes appending the encoded content of the at least one of the one or more expected components as a fragment of the URL following the domain (e.g., following a hashtag in the URL). In various implementations, receiving the plurality of components of the URL may include receiving the domain, or the domain may be pre-stored at the first device and assembling the URL may include obtaining the domain from local storage at the first device. In one or more implementations, the domain is a web domain, and receiving the plurality of components of the URL at the first device includes receiving the plurality of components in an invitation to a video conferencing session, the invitation generated by a video conferencing application at a second device (e.g., electronic device 115).

In one or more implementations, the first device (e.g., a video conferencing application at the first device) may provide a notification (e.g., in a UI for a user of the first device), the notification including the assembled URL and an option to connect to the video conferencing session. The first device may also receive a selection (e.g., by the user of the first device) of the option to connect to the video conferencing session, and redirect the first device to attempt to connect to the assembled URL with a browser at the first device.

In one or more implementations, responsive to the attempt to connect to the assembled URL, the first device may receive (e.g., from a server associated with the assembled URL) an update to one or more portions of the URL such as an update to the domain of the URL. The first device may access, via the browser, a web application for connecting to the video conferencing session using the assembled URL with the update to the domain.

In one or more implementations, the first device may connect to the video conferencing session using a browser at the first device to access a server (e.g., server 120 and/or server 130) associated with the assembled URL. In one or more implementations, connecting to the video conferencing session may include connecting to the video conferencing session without exposing the public key to the server. For example, connecting to the video conferencing session without exposing the public key to the server may include signing, with the browser at the first device using the public key, a request-to-join message from the first device to a second device of the initiating user of the video conferencing session. In one or more implementations, the assembled URL corresponds to a video conferencing session that includes at least one participant device that does not have any version of the application installed or available.

Figure 5:
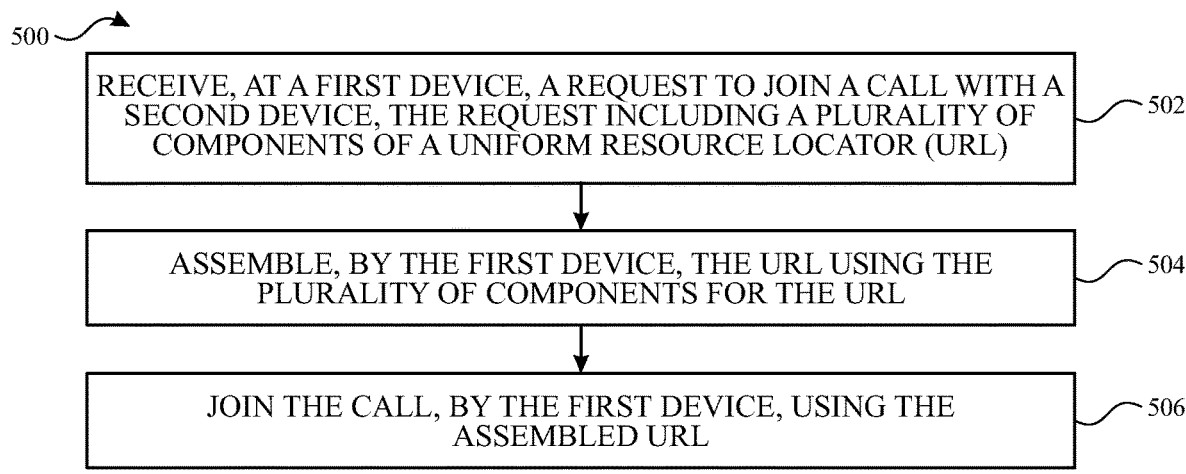
FIG. 5 illustrates a flow diagram of another example process for processing link information at a recipient device having a version of a conferencing application in accordance with one or more implementations.

FIG. 5 illustrates a flow diagram of an example process 500 for processing link information for a conferencing session, such as by a device having a conferencing application that is outdated or incompatible with a version of the conferencing application at a device that is initiating the conferencing session, in accordance with one or more implementations. For explanatory purposes, the process 500 is primarily described herein with reference to the components of FIG. 1 (particularly with reference to electronic device 117), which may be executed by one or more processors of the electronic device 117 of FIG. 1. However, the process 500 is not limited to the electronic device 117, and one or more blocks (or operations) of the process 500 may be performed by one or more other components of other suitable devices, such as one or more of the electronic device 110, the electronic device 115, the electronic device 119, and/or one or more servers such as the server 120 and/or the server 130. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, a first device (e.g., electronic device 117 having prior conferencing application 204) receives a request to join a call with a second device (e.g., electronic device 115), the request including components of a uniform resource locator (URL). For example, the request to join the call may be generated at the second device (e.g., using a conferencing application such as conferencing application 200 at the second device) and provided to the first device (e.g., via one or more servers, such as server 130). For example, the call may be an audio call (also referred to herein as an audio conferencing session) or a video call (also referred to herein as an video conferencing session). In one or more implementations, the first device may also verify whether the components include one or more expected components (e.g., a service-specific alias and a key, as described above in connection with block 404 of FIG. 4) for the URL. In one or more implementations, the first device may also determine whether content of at least one of the components for the URL is valid (e.g., as described above in connection with block 406 of FIG. 4). In one or more implementations, the second device is an initiating device of the call. For example, the second device may initiate the call by, using a conferencing application such as conferencing application 200 at the second device, provisioning a temporary alias (e.g., a service-specific alias) for an account associated with the first device and generating a public key for the call, and providing the temporary alias and the public key (e.g., and/or one or more other components of the URL) to the first device and/or one or more other devices. Initiating the call at the second device may also include providing a native invitation to the call, from the conferencing application 200 at the second device, to a corresponding conferencing application 200 at yet another one or more devices. Initiating the call at the second device may also include generating a complete link for the call (e.g., including the temporary alias and the public key) and providing the complete link to one or more additional devices. In one or more implementations, the second device may also begin the call, such as be establishing a communications session with one or more servers (e.g., a relay server such as server 130), and/or with one or more other devices via the relay server.

At block 504, the first device assembles the URL using (e.g., by combining) the plurality of components for the URL. In one or more implementations, the first device may encode at least one the components for the URL to produce at least one encoded component. The at least one encoded component may be included in the assembled URL. In one or more implementations, the first device may encode content of the components for the URL, for assembly into the URL. In one or more implementations, assembling the URL includes obtaining a domain for the URL and including the domain in the URL (e.g., by appending the components, following the domain, as a fragment of the URL, such as following a hashtag symbol in the URL). In one or more implementations, assembling the URL may also include obtaining one or more additional elements of the URL (a user identifier, an application identifier, nonce, etc.) that were not received in the invitation from the second device, in the URL.

In one illustrative example, if the first device receives two components such as "service-specific_alias_1" and "key_1", the first device may obtain a domain such as "conferencingapplicationserver.com", and may assemble the URL by adding the two components as a fragment, to form a URL such as "conferencingserver.com/#a=service-specific_alias_1&k=key_1". In examples in which a version number is provided, the URL may be assembled to include the version number (e.g., "1") in the fragment, to form a URL such as "conferencingserver.com/#v=1&a=service-specific_alias_1&k=key_1". In examples in which the service-specific alias and the key are encoded using an encoding function encode( ) before being assembled into the URL, the first device may assemble a URL such as, for example, "conferencingserver.com/#v=1&a=encode(service-specific_alias_1)&k=encode(key_1)".

In one or more implementations, assembling the URL may include assembling the URL based on verifying, by the first device, that the plurality of components include one or more expected components for the URL. In one or more implementation, the first device may also receive an additional request including an additional plurality of components of an additional uniform resource locator (URL), and not assemble the additional URL based on determining that the additional plurality of components do not include one or more expected components for the additional URL and/or based on determining that the content of at least one of the additional plurality of components is not valid.

At block 506, the first device joins the call using the assembled URL. For example, joining the call may include receiving, by the first device, a selection (e.g., a user selection via an input component of the first device) of the assembled URL, attempting, by the first device, to connect to the call with a browser (e.g., browser 206) using the assembled URL, and joining, by the first device, the call using the assembled URL without providing a key included in the plurality of components to a server corresponding to the URL. Joining the call may also include signing, by the device (e.g., with the browser) using the key, a request-to-join message from the first device to the second device. Further details of processes and/or operations that can be performed for joining a call using an assembled URL (or a complete link including the domain and the components) are discussed hereinafter in connection with, for example, FIGS. 10, 11, 20, 21, and 22). In one or more implementations, after the operations of FIG. 4 and/or after the operations of blocks 502 and 504 of FIG. 5, the electronic device 117 may utilize the browser 206 to perform operations described herein after in connection various aspects of FIGS. 7-32 to join and/or otherwise participate in the conferencing session.

Aspects of the processes of FIGS. 4 and 5 can be performed, by an electronic device (e.g., electronic device 117) having a version of a conferencing application (e.g., prior conferencing application 204) that is outdated or that is incompatible with the version of the conferencing application (e.g., conferencing application 200) running at the initiating device (e.g., electronic device 115) for a conferencing session. However, in other scenarios, a desired invitee for a conferencing session may be a user of an electronic device (e.g., electronic device 110) that does not have any version of the conferencing application and/or an electronic device (e.g., electronic device 110) having a different operation system and/or a different manufacturer from the initiating device.

Figure 6:
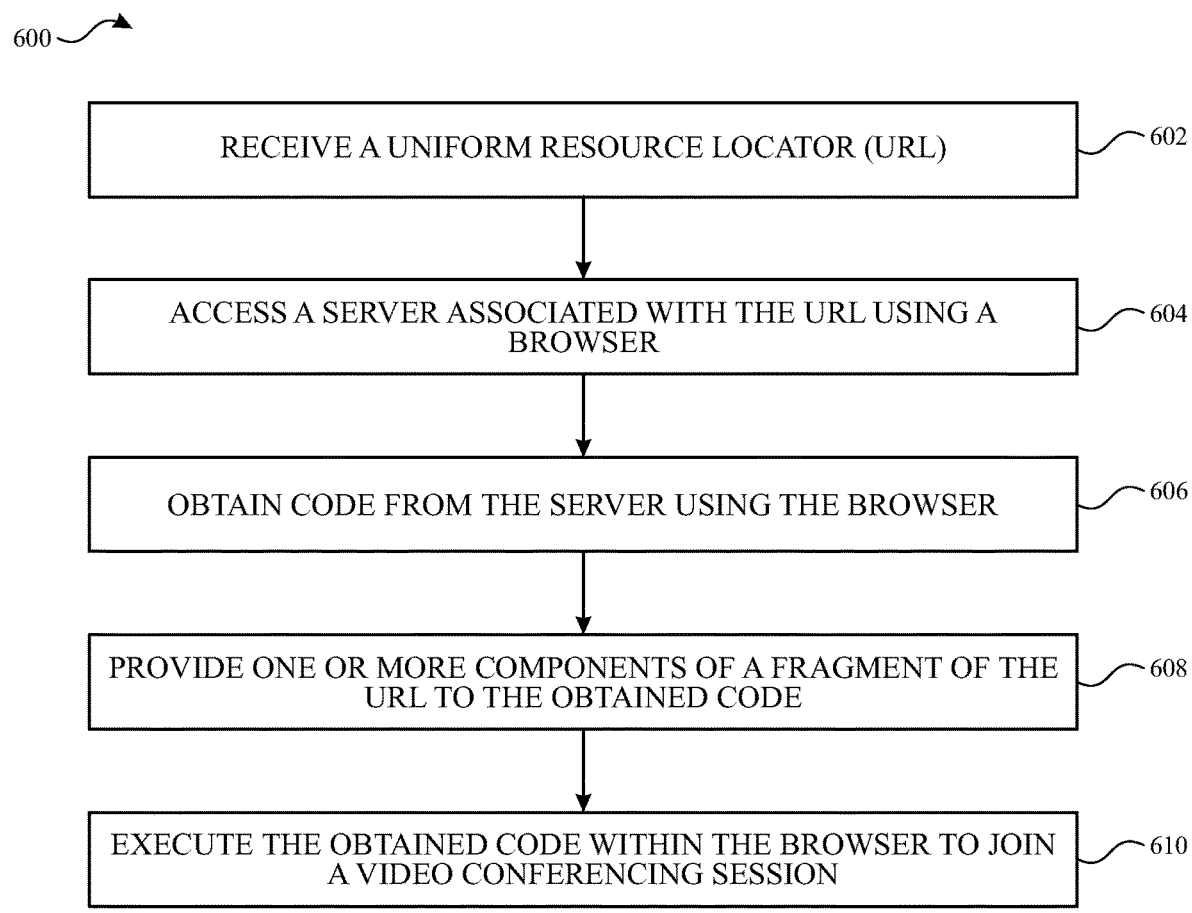
FIG. 6 illustrates a flow diagram of an example process for joining a video conferencing session using a device that does not have a conferencing application in accordance with one or more implementations.

FIG. 6 illustrates a flow diagram of an example process 600 for joining a conferencing session without using and/or without having access to a conferencing application, in accordance with one or more implementations. For explanatory purposes, the process 600 is primarily described herein with reference to the components of FIGS. 1 and 2 (particularly with reference to electronic device 110), which may be executed by one or more processors of the electronic device 110 of FIGS. 1 and 2. However, the process 600 is not limited to the electronic device 110, and one or more blocks (or operations) of the process 600 may be performed by one or more other components of other suitable devices, such as one or more of the electronic device 117, the electronic device 115, the electronic device 119, and/or one or more servers such as the server 120 and/or the server 130. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At block 602, a first device (e.g., electronic device 110) may receive a uniform resource locator (URL) corresponding to a conferencing session that is being or has been initiated by a conferencing application at a second device (e.g., electronic device 115). The first device may receive the URL, for example, in a text message, an email, webpage, or any other message. The URL may include a domain (e.g., a web domain associated with a server, such as server 130 of FIG. 1, which may be or include a conferencing application server) or information for obtaining a domain, and one or more components such as a version number (e.g., a version number corresponding to a format for the URL), an identifier (e.g., a temporary identifier such as a service-specific alias associated with the conferencing session and an initiating user of the conferencing session), and a key (e.g., a public key of a key pair for the conferencing session, the key pair including a private key held by the initiating device of the conferencing session, and/or a symmetric key). Components of the URL, such as the version number, the identifier, and the key, may be disposed in a fragment of the URL (e.g., after a hashtag in the URL). In one or more implementations, the URL may not include version number. In one or more implementations, the version number may correspond to a minimum supported version (e.g., in which a URL having a version number N would indicate that any device configured to handle any version with a version number less than N would be unable to process the URL).

At block 604, responsive to a user of the first device accessing (e.g., clicking on) the URL, the first device may navigate (e.g., using a browser such as browser 208) to a server corresponding to the URL (e.g., a server such as server 130 identified in the domain of the URL). For example, the browser at the first device may send one or more hypertext transfer protocol (HTTP) requests to the server, receive one or more HTTP responses from the server, and load and render a web page corresponding to the URL in the browser using the HTTP responses.

At block 606, using the browser, the first device may obtain (e.g., download responsive to an HTTP request to the server) code (e.g., code that, when executed, serves as a communication client on the first device for communicating with one or more servers such as the server 120 and/or the server 130, such as JavaScript code corresponding to a web application for conferencing in some examples) from the server within the web browser. The first device may download the code from the server without providing the components of the URL (e.g., the version number, the identifier, or the key) to the server (e.g., as described hereinafter in connection with FIG. 20).

At block 608, the first device may then pass one or more of the version number, the identifier, and the key from the fragment of the URL to the downloaded code (e.g., as parameters or inputs to the downloaded code).

At block 610, the first device may execute the downloaded code within the browser to join the video conferencing session. For example, the first device may execute the downloaded code within the browser to generate and sign and/or encrypt a request-to-join message to be provided to the second device (e.g., as discussed in further detail hereinafter in connection with FIGS. 10 and 21). The first device may, for example, sign and/or encrypt the request-to-join message locally at the first device using the key received in the fragment of the URL. The downloaded code may include logic for performing various other operations for joining and/or participating in the video conferencing session, such as operations for verifying the presence of components of the URL (e.g., verifying the presence of the identifier and/or the key, such as described above in connection with block 404 of FIG. 4), validating portions of the URL (e.g., validating the content of the identifier and/or the key, such as described above in connection with block 406 of FIG. 4), encoding and or decoding portions of the URL (e.g., encoding the content of the identifier and/or the key, such as described above in connection with block 408 of FIG. 4), capturing video and/or audio using a camera of the first device, encoding, decoding, packetizing, and/or depacketizing video and/or audio data as described herein, and/or exchanging communications (e.g., including packetized video data) with one or more servers and/or one or more devices including the second device.

In one or more implementations, the URL may also include (e.g., as part of the fragment of the URL) an indicator of whether the initiating user has initiated and audio/video session or an audio-only session. The web application (e.g., the downloaded code within the browser) determining, using this audio/video indicator, whether to activate a camera while joining the session corresponding to the URL, or to provide an audio-only UI for joining and/or participating in and audio-only session (e.g., a voice call).

When a user that has a device with a conferencing application invites another user of another device having the same conferencing application to a conferencing session (e.g., via exchange of native messages between the conferencing applications in response to the user of the device selecting or entering the other user's phone number or other contact information into the conferencing application as the user's device, and selecting an option to send the invitation and/or to begin the conferencing session), the conferencing applications on the two devices can provide a level of trust between the users. For example, the conferencing application can require registration of the device and/or the user with a server that facilitates conferencing sessions between the conferencing applications. This server knowledge of the users/devices with the conferencing applications can facilitate a level of trust between the users and/or a level of control of the use of the conferencing application for contact between the users.

However, as described herein, it can also be desirable to allow users of devices that do not have the conferencing application installed to access a conferencing session. For example, a user having a device with the conferencing application may desire to invite other participants to a conferencing session, such as for a book club meeting. The initiating user may desire that participants with the conferencing application and without the conferencing application be able to attend the book club conferencing session, potentially including participants with which the initiating user has not established trust or even previously interacted with. In some circumstances, the initiating user of the conferencing session may not want to reveal their permanent identity and/or contact information (e.g., a phone number or an email address) to all of the invited participants. Moreover participants desiring to join a conferencing session and or initiate a conferencing session may also desire that a server facilitating the conferencing session does not track who is in participating in the conferencing session.

In accordance with aspects of the disclosure, conferencing sessions may be provided between participant devices, in which the privacy of the initiating user of the conferencing session is at least initially preserved with respect to invitees to the conferencing session, and in which the privacy of the participants in the conferencing session is preserved with respect to one or more servers that facilitate the exchange of data for the conferencing session. For example, in accordance with aspects of the disclosure, an initiating user of a conferencing session can provision a new temporary identifier (sometimes referred to herein as a service-specific alias) for a particular conferencing session. The service-specific alias for the conferencing session can be provided to invitees to the conferencing session, so that initiating user can invite participants to the conferencing session without revealing their permanent identity or contact information. For example, an initiating user may desire to invite a group of potential participants to a conferencing session for a book club. However, the initiating user may not desire to reveal their phone number or email address to all of the potential participants, because this would allow the potential participants to continue contacting the initiating user via conferencing applications, via messaging applications, via telephone calls, or via emails or other means (which may be undesirable to the initiating user). By obtaining a service-specific alias for the conferencing session, the initiating user can provide an invitation to the conferencing session along with the service-specific alias, so that participants can contact the initiating user via the service-specific alias for permission to join the conferencing session (e.g., without revealing the permanent contact information of the initiating user). In this way, the privacy of the initiating user can be preserved.

The device of the initiating user of a conferencing session can also generate a key pair (e.g., an asymmetric keypair including a public key and a private key) and/or a symmetric key for the conferencing session. A device of the initiating user can provide the public key of the key pair created for the conferencing session to a device of an invited participant. The device of the invited participant can use the public key received from the device of the initiating user to sign and/or encrypt a request to join the conferencing session. The encrypted request can be provided from the device of the invited participant to the device of the initiating user, via a server, without revealing the content of the encrypted request to the server (e.g., since only the initiating user device, and/or other devices of the initiating user, have access to the private key for decryption of the encrypted request). In this way, participants can request to join a conferencing session, and initiating users (and/or delegates of the initiating users in some implementations), can accept a request from a device to join the conferencing session, without revealing the participants of the conferencing session to the server.

Figure 7:
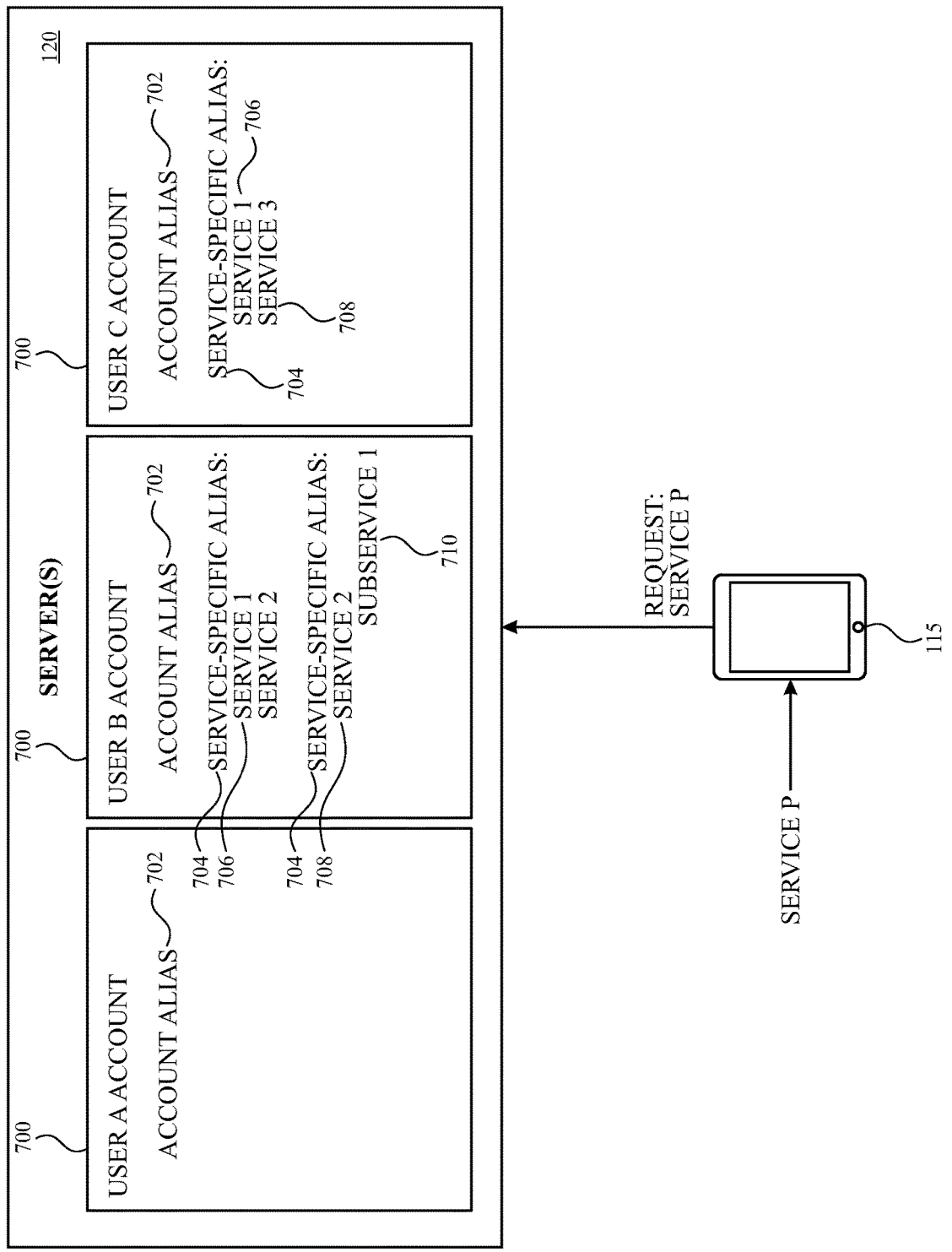
FIG. 7 illustrates a schematic diagram showing an electronic device requesting a service-specific alias from a server in accordance with one or more implementations.

FIG. 7 illustrates an example in which an electronic device (e.g., electronic device 115) provisions a service-specific alias, such as a service-specific alias for a conferencing session. In the example of FIG. 7, a server, such as server 120, stores accounts 700 for various users. As shown, the server may store, for each account 700, an account alias 702. For example, before the server 120 has an account 700 for a particular user or device, the device may request an account from the server, generate or obtain the account alias 702 at the device, and provide the account alias 702 to the server 120 to establish the account 700 (e.g., an account of a user of the device). The account alias 702 may be, for example, a permanent alias for the user, such as a phone number or an email address. In one or more implementations, the server may store multiple account aliases 702 for a particular account 700 (e.g., a phone number and one or more email addresses). The account alias 702 may be configured to allow contact with the user via any service that the other alias is registered with, including at least one service (e.g., a cellular service or an email service) that is independent of the server 120.

In the example of FIG. 7, the server 120 stores three accounts 700 for users A, B, and C, each having an account alias 702. In this example, the server also stores two service-specific aliases 704 for an account 700 of user B and a service-specific alias 704 for account 700 of User C. As shown, each service-specific alias 704 may be associated with a set 706 of services 708, each set 706 stored by the server 120 in connection with the corresponding service-specific alias 704.

In the example of FIG. 7, the account 700 of the User B includes a service-specific alias 704 that is associated with a set 706 of services 708 that includes "Service 1" (e.g., a messaging service) and "Service 2" (e.g., a conferencing service associated with a conferencing application 200). In this example, the account 700 of the User B also includes a service-specific alias 704 that is associated with a set 706 of services 708 that includes "Service 2" (e.g., the conferencing service) and a subservice 710 (e.g., "Subservice 1", such as a particular conferencing session). For example, service-specific alias 704 for the set 706 of services 708 that includes "Service 2" and the subservice 710 may be a service-specific and scope-limited alias that is configured to allow contact with the user via the set of services defined by the user and within a limited scope (e.g., the "Subservice 1") defined by the user of the electronic device 115. In some examples, the scope corresponds to a subset of one of the set of services (e.g., a particular call or a particular remote user or group of remote users). In some examples, the scope is stored at the server, as in the example of FIG. 7.

In the example of FIG. 7, the account 700 of the User C includes a service-specific alias 704 that is associated with a set 706 of services 708 that includes "Service 1" (e.g., a messaging service) and "Service 3" (e.g., a gaming service, a file transfer service, or another service for interacting with other participant devices).

The set 706 of services 708 for each service-specific alias 704 may define which services by which the server will allow communications addressed to the service-specific alias 704 to be provided to the device or devices associated with the account 700 (e.g., and associated with the account alias 702) corresponding to that service-specific alias 704. For example, if a remote device attempts to send a message using "Service 1" to a device associated with account 700 of User B by addressing the message to the service-specific alias 704 associated, the server may obtain the account alias 702 for the account 700 of User B, and pass the message to the device(s) of User B, because "Service 1" is a messaging service. In contrast, if a remote device attempts to send a message using "Service 1" to a device associated with account 700 of User B by addressing the message to the service-specific alias 704 that is associated with "Service 2" and "Subservice 1", the server deny the delivery of the message via "Service 1" to devices associated with that account 700. For example, if User B provisioned the service-specific alias 704 associated with "Service 2" and "Subservice 1" for a particular conferencing session, and a device having that service-specific alias 704 later attempts to contact User B by sending a text message to that service-specific alias 704, the text message will not be delivered by the server (or may be delivered but rejected by the device of User b) because that service-specific alias 704 is not provisioned for messaging. In this example, the subject technology has allowed User B to participate in a conferencing session with other users, without providing the other users sufficient information to continue to contact the User B after the conferencing session.

In the example of FIG. 7, the electronic device 115 provisions, from a server (e.g., server 120) storing an account 700 of a user of the electronic device 115 (e.g., User A) and an account alias 702 for the account 700, a service-specific alias for the account 700, the service-specific alias separate from the account alias 702 for the account 700 and configured to allow contact with and/or communications to the electronic device 115 via set 706 of services 708 defined by the electronic device 115 (e.g., based on input to the electronic device 115 received from the User A of the electronic device 115).

For example, as shown in FIG. 7, electronic device 115 may receive a user input indicating a service, such as "Service P". In some examples, the input "Service P" may be an input for initiating the service itself or for initiating a subservice of the service, in which a set 706 of services 708 is defined by the input (e.g., a user initiating a video call defines the set of services as video conferencing, and defines a subservice as the particular video call). In other examples, the input "Service P" may be a request for a service-specific alias 704, the request including a user-selected or user input definition of the set of services for the requested service-specific alias 704. As shown, responsive to receiving the input "Service P", the electronic device 115 provides a request to the server (e.g., server 120) for a service-specific alias, the request including the set of services ("Service P", which may include one or more of a messaging service, a file transfer service, a video conferencing service, or a gaming service) defined at the electronic device 115.

Figure 8:
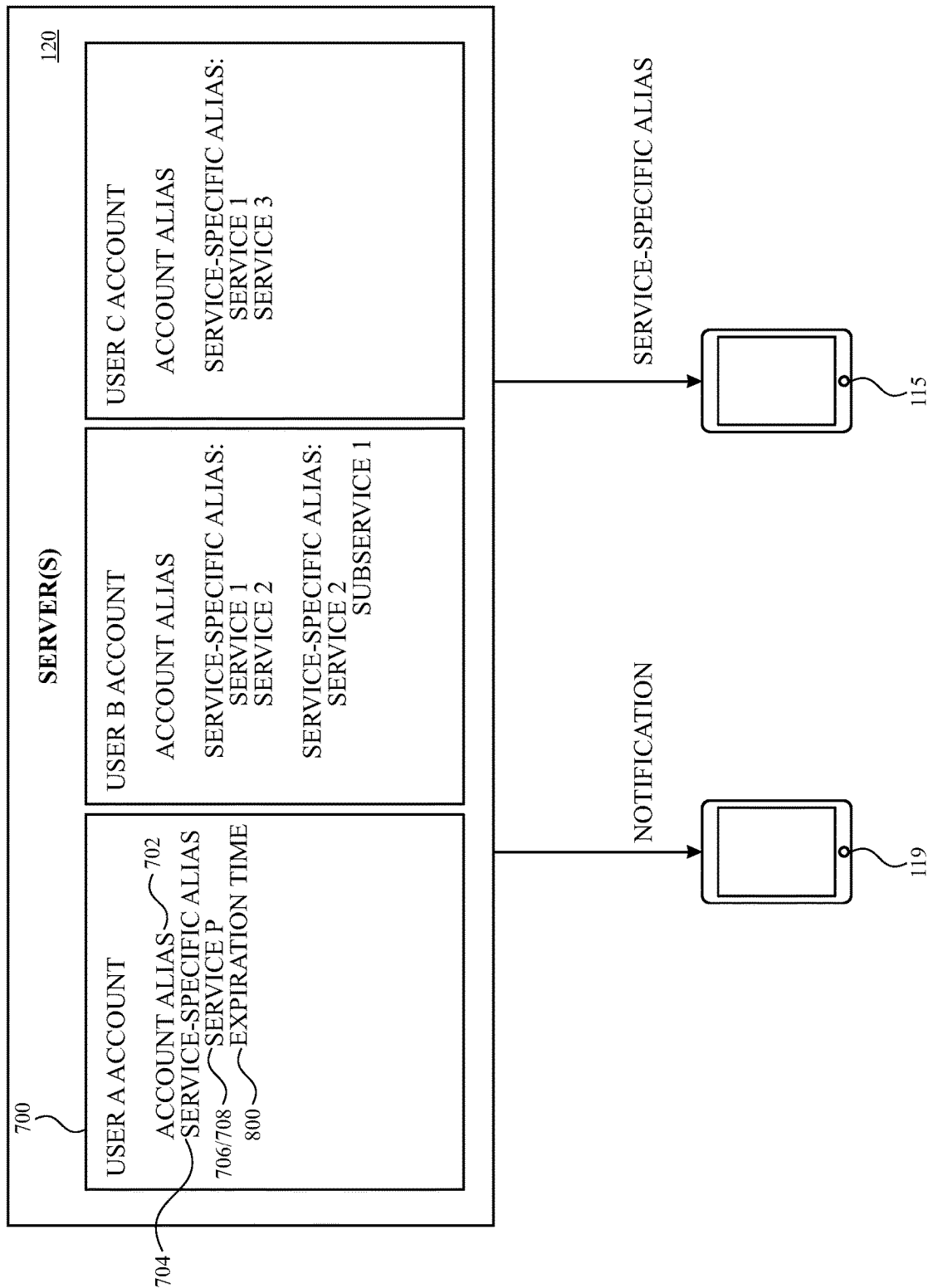
FIG. 8 illustrates a schematic diagram showing an electronic device receiving a service-specific alias from a server in accordance with one or more implementations.

As shown in FIG. 8, responsive to the request from the electronic device 115, the server may generate a service-specific alias 704 for the account 700 of User A of electronic device 115, and store the service-specific alias 704 in connection with the account alias 702 and the set 706 of services 708 (e.g., "Service P") provided by the electronic device 115 in the request. In one or more implementations, the server may generate the service-specific alias 704 by generating a random number. In one or more implementations, the server may generate the service-specific alias 704 by in part by including a time stamp in the service-specific alias. In one or more implementations, the server may generate the service-specific alias 704, in part, by including verification information in the service-specific alias 704 (e.g., in addition to a random number and usable to verify the validity of the service-specific alias).

As shown, the service-specific alias 704 for the account 700 of User A may then be provided to the electronic device 115 that requested the service-specific alias. FIG. 8 also indicates that, in one or more implementations, one or more other devices (e.g., electronic device 119) that are also associated with (e.g., logged into and/or registered to) the same account 700 as the account 700 for electronic device 115 may be provided with a notification that a service-specific alias 704 has been generated for the account 700. The notification may include an indication for the electronic device 119 to fetch the service-specific alias 704 from the server and/or from the electronic device 115. In this way, any or all devices associated with a common account can initiate services with a service-specific alias that was provisioned by any other of the devices associated with that common account.

FIG. 8 also illustrates how the service-specific alias 704 may be a temporary alias having an expiration time 800. The expiration time 800 may be defined upon provisioning of the service-specific alias. In some examples, the service-specific alias 704 is free of information that identifies the user or the account 700 of the user. For example, server may set an expiration time 800 at which the service-specific alias 704 will expire, responsive to the request from the electronic device 115 registered to the account 700 to provision the service-specific alias 704. In one or more implementations, the server may extend the expiration time based on another request from any device registered to the account 700 (e.g., an express request to extend the expiration time, or another use of the service-specific alias 704 by the device registered to the account prior to the expiration such as scheduling another occurrence of a reoccurring call or accepting a call using the service-specific alias 704).

In one or more implementations, the electronic device 115 and/or another electronic device (e.g., electronic device 119) associated with the same account as the electronic device 115 can renew and/or update an existing service-specific alias 704 (e.g., to change the set 706 of services 708, the expiration time, the scope or sub services, etc. associated with that service-specific alias 704). In one or more implementations, the electronic device 115 and/or another electronic device associated with the same account as the electronic device 115 can delete the service-specific alias 704 to revoke access to the devices of the account the via the corresponding set of services using that service-specific alias 704. In one or more implementations, synchronization of the service-specific alias 704 between multiple devices associated with the same account 700 (e.g., based on a notification as described in connection with FIG. 8) can be used for coordination of the expiration time 800. For example, the User A may want to renew a service-specific alias 704 for a recurring conferencing session, using the electronic device 119, in a circumstance when the electronic device 115 is off or otherwise unavailable to the user for renewing the event.

Figure 9:
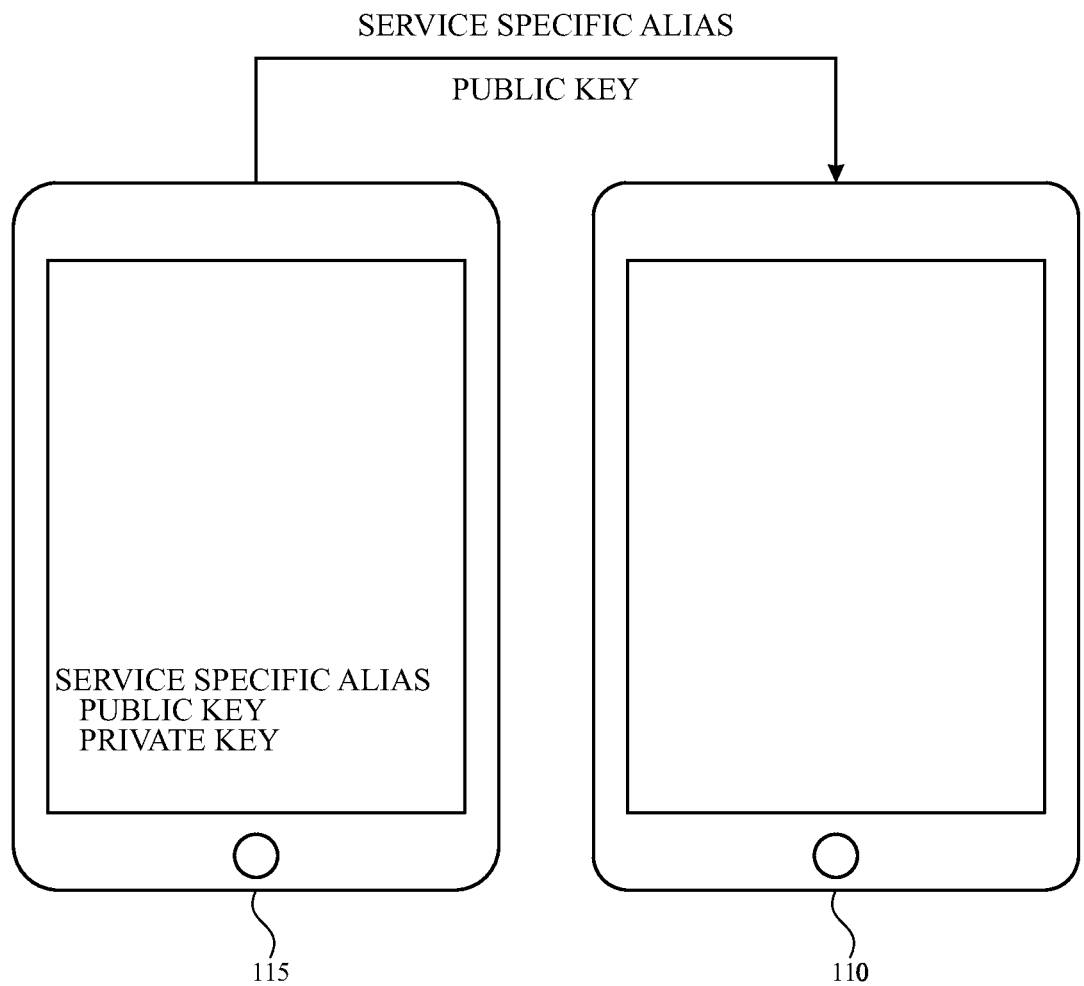
FIG. 9 illustrates a schematic diagram showing an electronic device providing a service-specific alias to another electronic device in accordance with one or more implementations.

Once a service-specific alias 704 has been obtained (e.g., provisioned) by an electronic device such as electronic device 115, the service-specific alias 704 can be provided to other devices for use for contacting the electronic device 115 and or any other device associated with the same account 700 as the electronic device 115. For example, as shown in FIG. 9, the electronic device 115 may send the service-specific alias 704 to a remote device (e.g., electronic device 110) to allow the remote device to contact (or otherwise communicate with) the electronic device 115 via the set 706 of services 708 defined by the electronic device 115 for that service-specific alias 704.

In various implementations, the service-specific alias 704 can be provided to the remote device alone, or along with other information. In one or more implementations, the service-specific alias 704 can be sent in a link associated with a service of the set of services (e.g., a link for a conferencing session). For example, the link may be a link that includes the service-specific alias 704 and a key (e.g., a public key) for a conferencing session, the key generated by the electronic device 115 for the conferencing session as part of a key pair for the conferencing session. As shown in FIG. 9, the electronic device 115 may store the private key and the public key of the key pair generated at the electronic device 115, along with the service-specific alias 704, and may provide the service-specific alias 704 and the public key to the electronic device 110.

In one or more implementations, the set of services for the service-specific alias 704 can be one service (e.g., conferencing) or multiple services (e.g., conferencing and messaging). In one or more implementations, the service-specific alias 704 can be receive-only (e.g., the electronic device 110 can send communications to a service-specific alias 704, but does not receive communications from a service-specific alias 704). For example, one device can provision and send a service-specific alias 704 to another device and then the other device can contact the first device using service-specific alias 704. In this example, the first device may be able to see the actual contact information (e.g., a phone number or an email address) of the other device even though the other device can't see the actual contact information of the first device.

In an exemplary use case, the electronic device 110 may attempt to call the service-specific alias 704 received from the electronic device 115, and the server may notify all devices associated with the same account as the electronic device 115 of the incoming call, if the service-specific alias is determined by the server to be valid (e.g., existing and unexpired, and defined for calls). The devices associated with the same account may accept the incoming call if they have fetched the service-specific alias 704 to which the call is addressed, but may not accept call unless they have received the service-specific alias 704. For example, a device associated with the same account as the electronic device 110 may not accept that the call that is intended for the device if the device hasn't fetched the service-specific alias 704 provisioned by the electronic device 115.

In one or more implementations, a scope identifier (e.g., corresponding to a subservice 710) may be stored in connection a service-specific alias 704, and can be used to allow use of a single service-specific alias 704 for multiple different scopes. In one or more implementations, a service-specific alias 704 may follow the caller ID of the provisioning device (e.g., a phone number of the provisioning device). For example, if a SIM card were to be removed from the electronic device 115 and inserted into a new device, a communication addressed to a still-valid service-specific alias 704 provisioned by the electronic device 115 may be provided to the new device since the new device would be associated with the same caller ID by virtue of the transfer of the SIM card.

Figure 10:
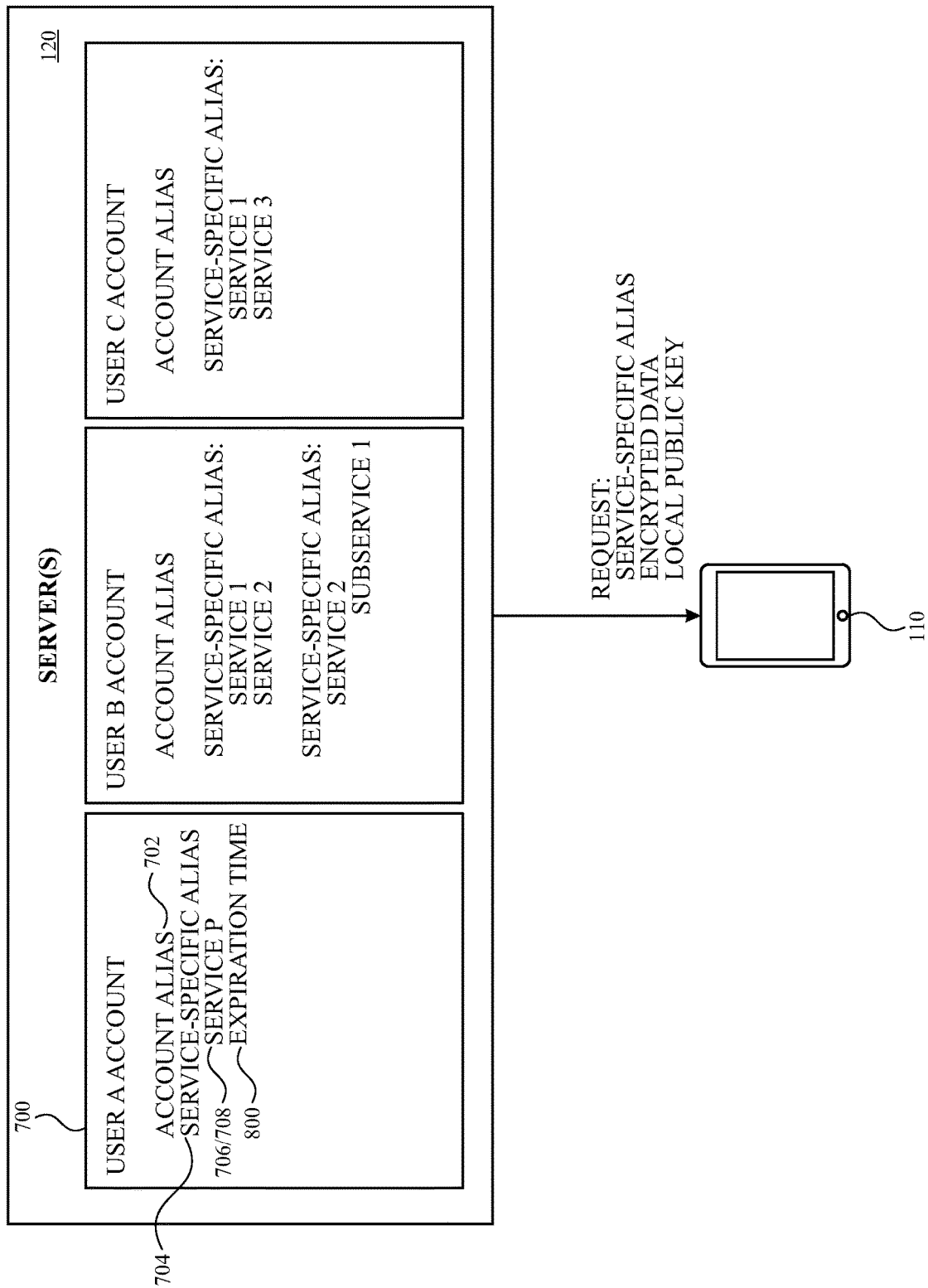
FIG. 10 illustrates a schematic diagram showing an electronic device attempting to contact another electronic device using a service-specific alias in accordance with one or more implementations.

As shown in FIG. 10, one or more servers (e.g., server 120) may receive a request, from another device (e.g., electronic device 110), to contact an account 700 via a service, the request including a service-specific alias 704 for the account 700. The one or more servers may determine whether to allow the contact with the account 700 via the service by determining whether the service is included in a set 706 of services 708 (e.g., "Service P") defined by the electronic device 115 for the service-specific alias 704. As shown, in one or more implementations, the request may also include encrypted data and/or a local public key that corresponds a private key stored at the electronic device 110. In the example of FIG. 10, the server stores an account 700 and an account alias 702 of the account 700, and the service-specific alias 704 is different from the account alias 702.

Figure 11:
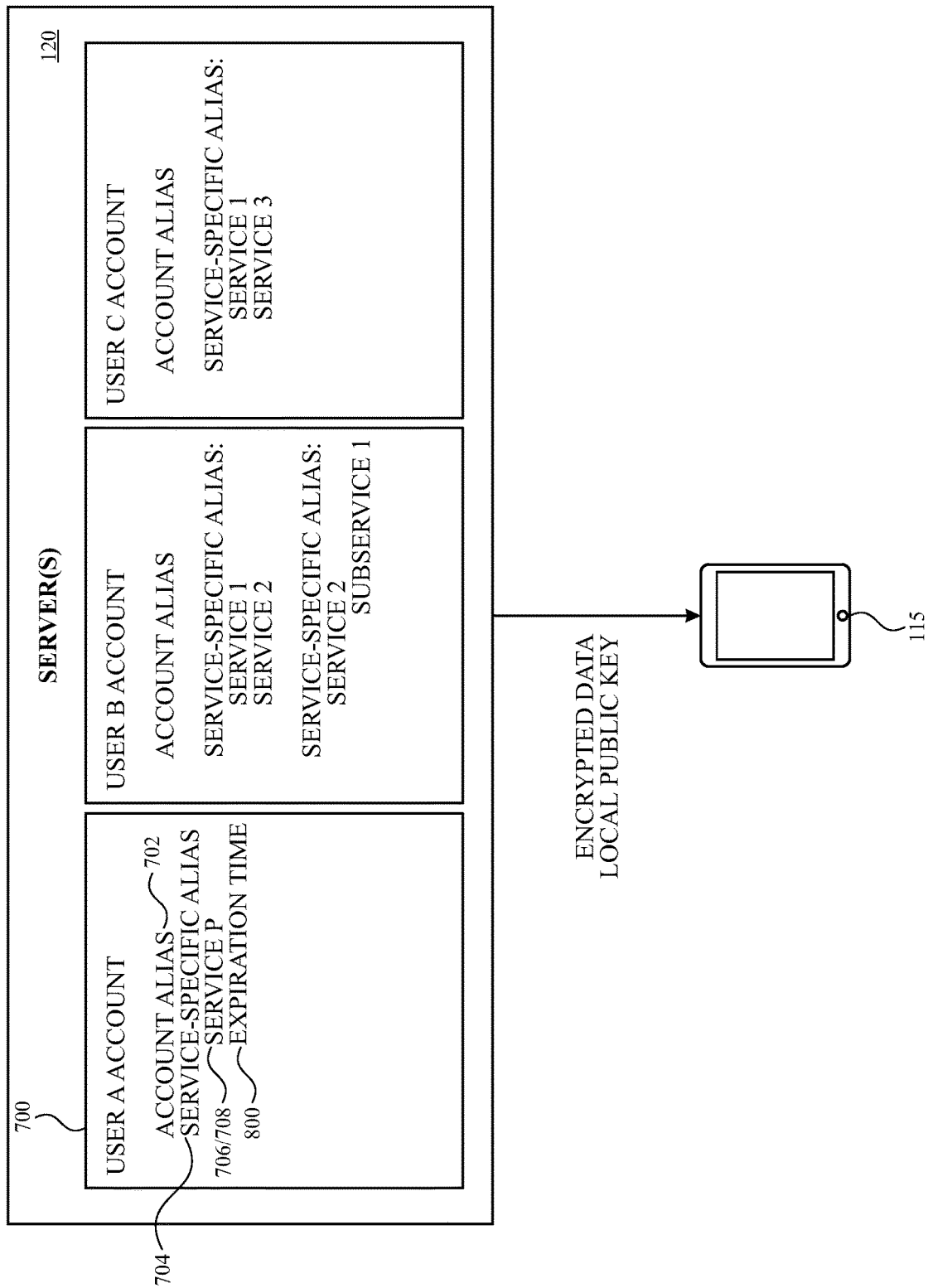
FIG. 11 illustrates a schematic diagram showing an electronic device receiving an encrypted data addressed to a service-specific alias in accordance with one or more implementations.

FIG. 11 illustrates how allowing the contact requested in FIG. 10 may include, by the one or more servers, obtaining the account alias 702 for the account, and providing information (e.g., the encrypted data and/or the local public key) associated with the request to a device registered to the account (e.g., the electronic device 115 or another device registered to the same account) using the account alias (e.g., without exposing the account alias to the electronic device 110).

In one or more implementations, the one or more servers also determine whether to allow the contact with the account 700 via the service by determining whether the service-specific alias 704 is expired (e.g., by comparing a current time to the expiration time 800 stored at the server). For example, as shown, the one or more servers may store the set of services defined by the user for the service-specific alias 704, and an expiration time 800 for the service-specific alias 704.

In one or more implementations, the request from the electronic device 110 in FIG. 10 is a request to contact the account via a subset of the service (e.g., a request to join a specific conferencing session), and the one or more servers also determines whether to allow the contact with the account via the service by determining whether the service-specific alias has a scope that includes the subset of the service (e.g., whether the service-specific alias 704 is the service-specific alias 704 provisioned for that particular conferencing session).

In one or more implementations, if a server receives an attempt to communicate with an electronic device using a service-specific alias 704, via a service for which the service-specific alias 704 wasn't provisioned, the attempt may be rejected by the server. In one or more implementations, a server maps a service-specific alias 704 to an account alias 702, and spam prevention operations (e.g., limitations on a number of messages in a period of time, etc.) that are applied for account aliases can also be applied to a service-specific alias 704. In one or more implementations, allowing or denying access using a service-specific alias 704 is enforced based on the set 706 of services 708 on the server side (e.g., a device can attempt to contact another device using a service-specific alias 704 that is associated with that device using a first service and be denied by the server because the service-specific alias 704 is only scoped for another service). In one or more implementations, a user can request a service-specific alias 704 from one device, and then sync that service-specific alias 704 across all devices of the user. In one or more implementations, synchronizing the service-specific alias 704 in this way allows a call to the service-specific alias 704 to ring or otherwise alert the user at multiple or all of the user's devices. In one or more implementations, an expired service-specific alias 704 may be stored by the server for a period of time after the expiration time 800, to allow for the possibility of a renewal of a previously expired service-specific alias 704. In one or more implementations, when a link corresponding to a service-specific alias 704 is used (e.g., to successfully join a conferencing session), the server may extend the expiration time 710 of the service-specific alias 704.

Figure 12:
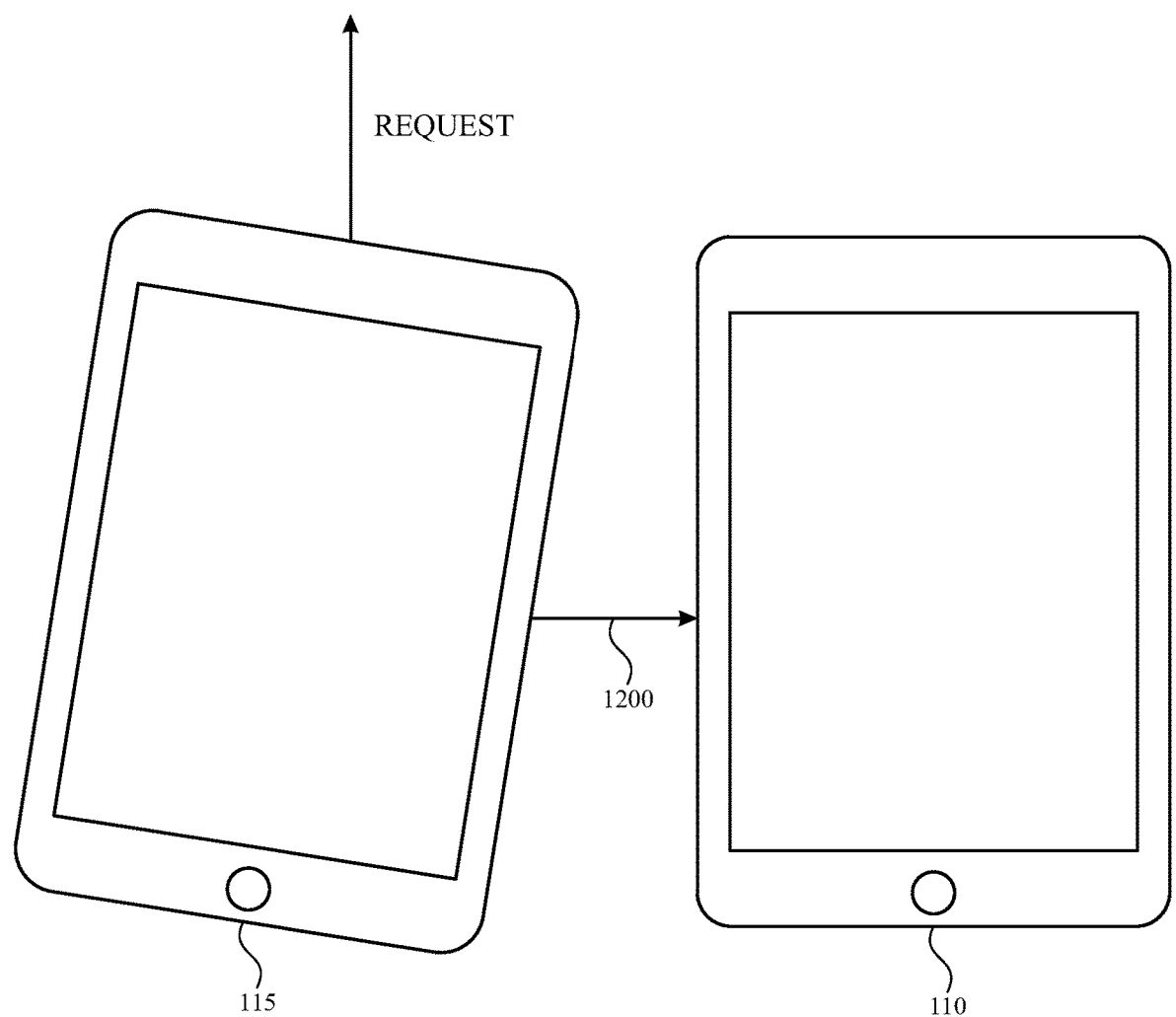
FIG. 12 illustrates a schematic diagram showing a proximity-based interaction between electronic devices in accordance with one or more implementations.
Figure 13:
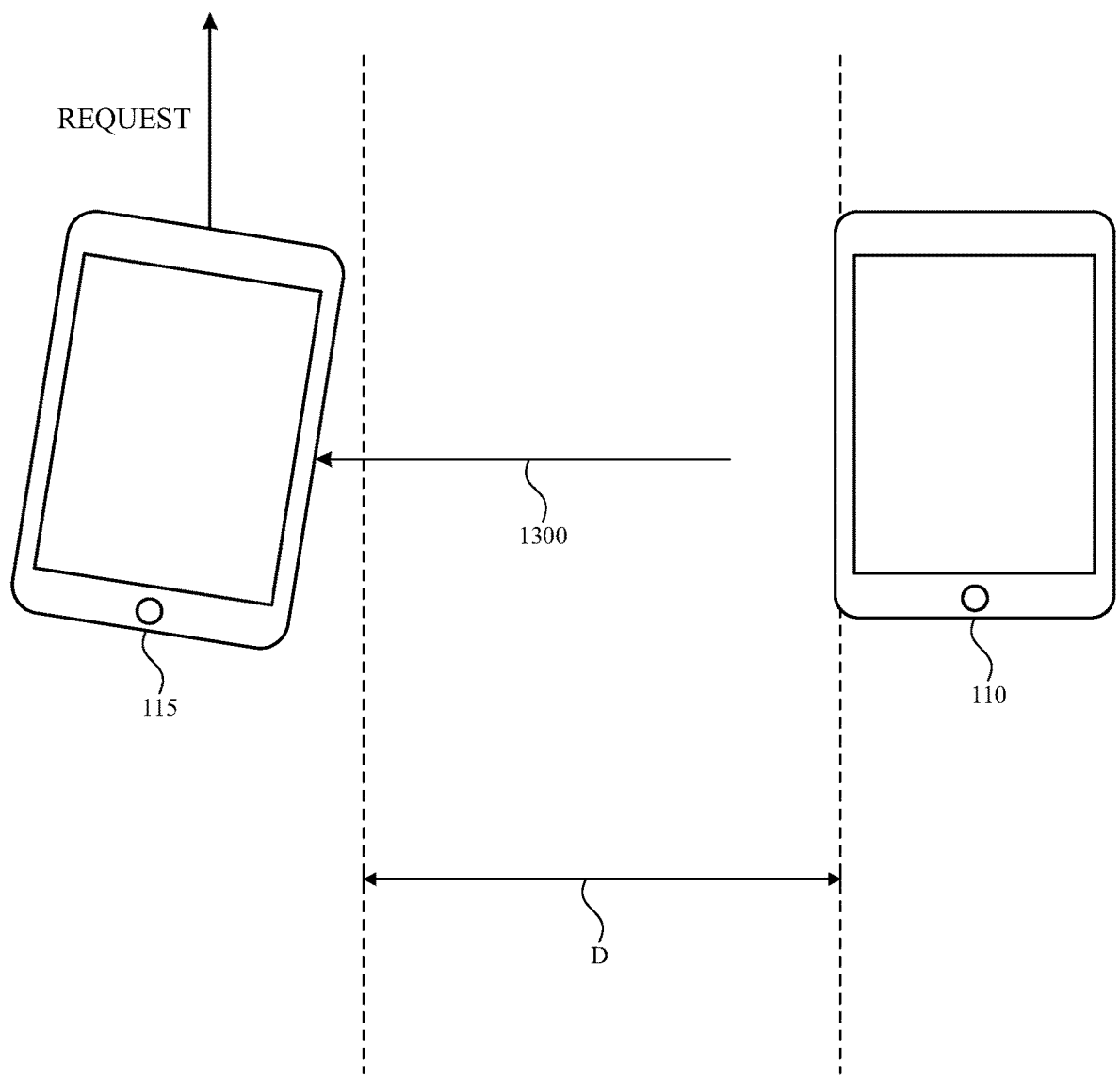
FIG. 13 illustrates a schematic diagram showing an electronic device requesting a service-specific alias responsive to a disconnection of a proximity-based connection with another electronic device in accordance with one or more implementations.

In the example of FIGS. 7-11, provisioning and use of a service-specific alias 704 is described primarily in connection with a call or a conferencing session between two or more devices. However it is appreciated that a service-specific alias 704 can be provisioned for services other than conferencing services. For example, as described herein, a service-specific alias 704 can be provisioned for a messaging service, for a file-transfer service, for a gaming server, and/or for other services by which one device can attempt to send communications to another device. For example, in one or more implementations, the set of services for a service-specific alias 704 includes a social media service and the service-specific alias 704 is configured to allow temporary (e.g., revokable by deletion of the service-specific alias, and/or by expiration at a predetermined time or at the end of a predetermined event) external access to social media content associated with the account of the user. As another example, in one or more implementations, the set of services for a service-specific alias 704 includes a digital library service and the service-specific alias 704 is configured to allow temporary (e.g., revokable by deletion of the service-specific alias, and/or expiration at a predetermined time or at the end of a predetermined event) external access to electronic book content associated with the account of the user. FIGS. 12 and 13 illustrate additional examples in which the set of services for a service-specific alias 704 includes, respectively, a messaging service and a file-transfer service.

For example, FIG. 12 illustrates an implementation in which a service-specific alias 704 may be provisioned, by one device, based on a proximity-based interaction with another device. For example, in a scenario in which a user of electronic device 115 would like to temporarily allow the user of electronic device 110 to send messages to the electronic device 115, the electronic device 115 may be tapped against (and/or placed nearly against) the electronic device 110 (as indicated by the arrow 1200). The tapping action illustrated in FIG. 12 may move the electronic device 115 and the electronic device 110 within a range (e.g., within about ten centimeters) for near-field communications (NFC) communications between the electronic device 115 and the electronic device 110. In one or more implementations the electronic device 115 provides the request for a service-specific alias 704 to a server storing an identification of the account alias 702 of the account 700 of the electronic device 115, responsive to the proximity-based interaction between the electronic device 115 and the electronic device 110. Responsively, the server (e.g., server 120) may generate the service-specific alias 704 as described above in connection with FIGS. 7 and 8.

In one or more implementations, the service-specific alias 704 generated responsive to the request triggered by the proximity-based interaction illustrated in FIG. 12 may be a messaging alias for contacting the user via a messaging service. The electronic device 115 may receive the service-specific alias 704, and provide the service-specific alias 704 to the electronic device 110 (e.g., via the NFC or BLTE communications link between the electronic device 115 and the electronic device 110 during the proximity-based interaction). In one or more implementations, to indicate that the service-specific alias 704 is for a messaging service, the tap illustrated in FIG. 12 may be performed while a messaging application is open on the electronic device 115. When the electronic device 115 detects the electronic device 110 via NFC during the tap action, the electronic device 115 provisions the service-specific alias 704 by requesting service-specific alias 704 corresponding to a stored account alias 702 for the electronic device 115 at the server, the request including an indication of the messaging service. For example, the request may be generated and provided to the server by the messaging application responsive to the tap. In this example, the temporary messaging alias cannot be used to contact the electronic device 115 via any service other than the messaging service.

In one or more implementations, the electronic device 115 (or another device associated with the same account 700 as the electronic device 115) may de-provision the temporary messaging alias to prevent further messages from the electronic device 110 from being delivered to the electronic device 115. In one or more implementations, the electronic device 110 also provisions a service-specific alias 704 (e.g., a temporary messaging alias) from the server responsive to the proximity-based interaction (e.g., the tap) with the electronic device 115, and provides that temporary messaging alias to the electronic device 115. In this way, users that may not desire to exchange permanent contact information (e.g., strangers that strike up a conversation on a bus ride) are provided with an opportunity to temporarily continue communicating using messages in a way that is revokable by one or both of the users at any time.

FIG. 13 illustrates another example for provisioning a service-specific alias. In the example of FIG. 13, a service-specific alias 704 is provisioned, by providing a request to a server storing an identification of the account alias 702 of the account 700 of the electronic device 115, responsive to detecting a disconnection of a proximity-based connection between the electronic device 115 and the electronic device 110. For example, as shown in FIG. 13, electronic device 115 may be moved in direction 1300 beyond a maximum distance D (e.g., several feet) by which a Bluetooth or direct Wi-Fi connection may be maintained between the devices. When the Bluetooth or direct Wi-Fi connection is lost or falls below a quality threshold, the electronic device the electronic device 115 may detect the disconnection and request the service-specific alias.

For example, the disconnection may be detected during a file transfer operation over the proximity-based connection (e.g., over a Bluetooth or direct Wi-Fi connection between the electronic device 115 and the electronic device 110). Responsive to the disconnection, the electronic device 115 may provision, from the server, a service-specific alias corresponding to a temporary file transfer alias. The electronic device 115 may provide the temporary file transfer alias to the electronic device 110 so that the electronic device 110 can continue the file transfer operation over the Internet (e.g., by transmitting the files to a network destination corresponding to the temporary file-transfer alias). In this way, when a local connection between devices drops (e.g., during a file transfer operation), the receiving device can provision and send a service-specific alias for the file transfer operation to the sending device, so that the transfer can continue over a wider area connection.

For example, electronic device 115 may provide a temporary file transfer alias to an electronic device 110, establish a network-based connection with the electronic device 110 using the temporary file transfer alias, and continue a file transfer operation that was previously in progress over the proximity-based connection, over the network connection. In one or more implementations, the proximity-based connection is a Bluetooth connection. In one or more implementations, the proximity-based connection is a direct Wi-Fi connection. In one or more implementations, the network connection is a connection over the Internet. In one or more implementations, the electronic device 115 initiates the file transfer over the proximity-based connection.

In one or more implementations, the electronic device 110 provides, directly to the electronic device 115 over the proximity-based connection and prior to the disconnection, an acceptance of the file transfer over the proximity-based connection. In one or more implementations, the electronic device 115 detects the disconnection when a distance between the electronic device 115 and the electronic device 110 exceeds a threshold (e.g., distance D).

Figure 14:
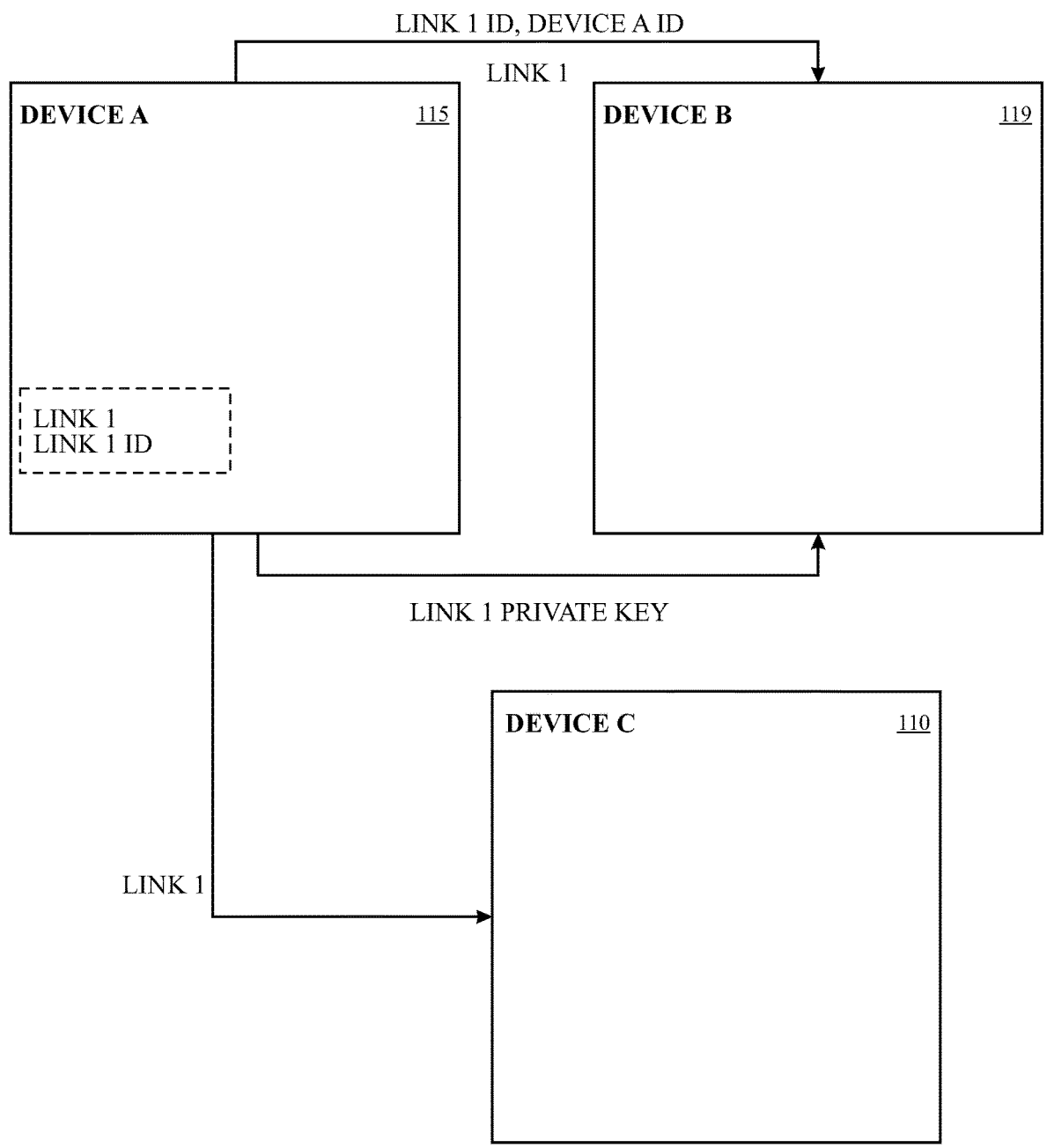
FIG. 14 illustrates a schematic diagram showing an electronic device associated with an account providing a link to another electronic device associated with the account and an electronic device not logged into the account in accordance with one or more implementations.

Returning to the example of a conferencing session between a device having a conferencing application 200 and a device which has a prior conferencing application 204 or does not have a conferencing application, FIG. 14 illustrates a scenario in which a device that generates a link for a conferencing session (e.g., a link including a service-specific alias and a public key, or another link) synchronizes the link with other devices associated with the same account. In this way, an event (e.g., a conferencing session) corresponding to the link can be initiated, hosted, and/or otherwise managed using any device associated with the same account as the deceive that generated the link.

In the example of FIG. 14, electronic device 115 is associated with a user account (e.g., an account 700) and has generated a link (e.g., Link 1 in FIG. 14) that corresponds to a communication session (e.g., a conferencing session such as an audio conferencing session or a video conferencing session). For example, the link may include, in one or more implementations, a public key, a group identifier, an originator handle, and/or a service-specific alias. As shown, the electronic device 115 may provide link information for the link, including a device identifier ("Device A ID") and a link identifier ("Link 1 ID", such as a time stamp, a sequence number, or another alphanumeric identifier) for the link, to electronic device 119 which, in this example, is associated with the same user account 700 as the electronic device 115. In one or more implementations, the electronic device 115 may also provide a private key (e.g., Link 1 Private Key) for the link and/or the corresponding conferencing session to the electronic device 119.

As shown, the electronic device 115 (or the electronic device 119 after receiving the link) provides the link to a device such as electronic device 110 that unassociated with and/or not logged into the user account, to provide access for the electronic device 110 to the communication session corresponding to that link. The link information may be provided to the electronic device 119 by a first channel (e.g., a background channel managed by the conferencing applications and/or a system process at the electronic device 115 and the electronic device 119), and the link may be provided to the electronic device 110 by a second channel (e.g., via a text message, an email, a social media post, a website, or the like). Because the electronic device 115 provided the link to the electronic device 119, either electronic device 115 or electronic device 119 can initiate the conferencing session associated with the link and, when the electronic device 110 accesses the link, either electronic device 115 or electronic device 119 can be used to permit or deny electronic device 110 from joining the conferencing session. For example, if the electronic device 110 encrypts a communication (e.g., a request-to-join message) for the conferencing session using a public key included in the link, and sends the encrypted message to a service-specific alias in the link, the electronic device 119 can receive the encrypted communication using the link information (e.g., a service-specific alias and/or a session identifier included in the link and/or the link information) and decrypt the encrypted communication using the private key provided by the electronic device 115.

For example, the electronic device 115 or electronic device may initiate the communication session and receive a request from the electronic device 110 to join the communication session, the request including information (e.g., a service-specific alias for the account associated with the electronic device 115 and electronic device 119 and the conferencing session) included in the link.

Figure 15:
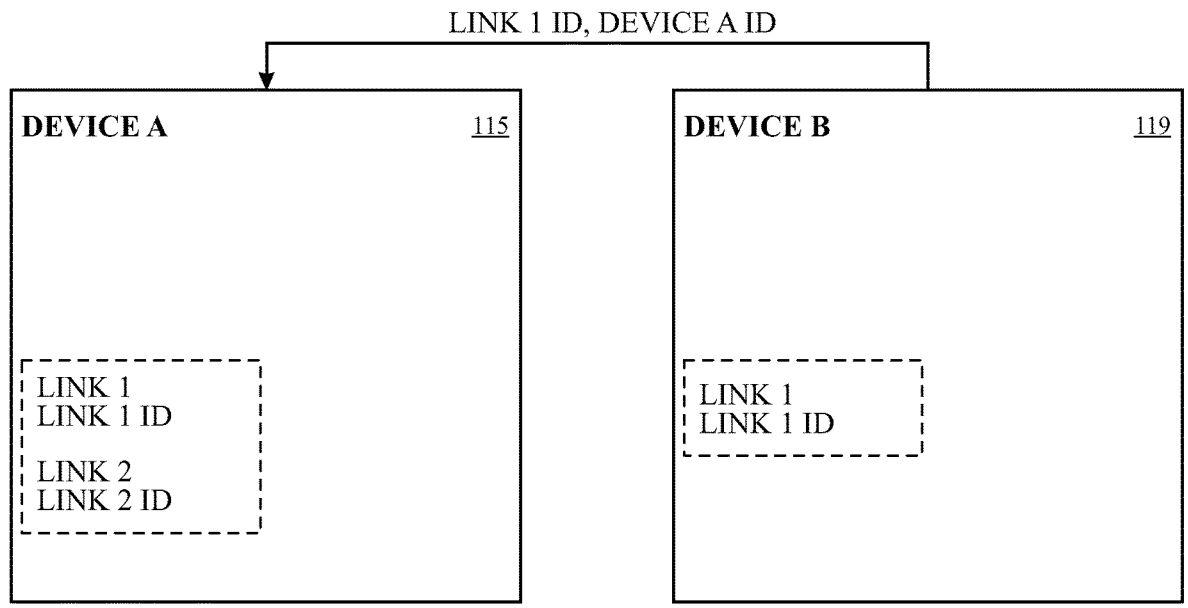
FIG. 15 illustrates a schematic diagram showing an electronic device associated with an account providing a link check-in communication to another electronic device associated with the account in accordance with one or more implementations.

FIGS. 15-19 illustrate various operations that may be performed to maintain link synchronization between electronic device 115, electronic device 119, and/or any other devices associated with the same account as the electronic device 115 and the electronic device 119. For example, as shown in FIG. 15, the electronic device 115 may generate and store a second link (e.g., Link 2) that corresponds to a different communication session and may store the device identifier for the first device (e.g., "Device A ID") and a different link identifier (e.g., "Link 2 ID") for the second link. As shown, the electronic device 115 may receive a link check-in communication from the electronic device 119, the link check-in communication including the device identifier for the electronic device 115 (e.g., "Device A ID") and the link identifier (e.g., "Link 1 ID"). In this way, the link check-in communication can inform the electronic device 119 the latest link that the electronic device 119 has from the first device.

Figure 16:
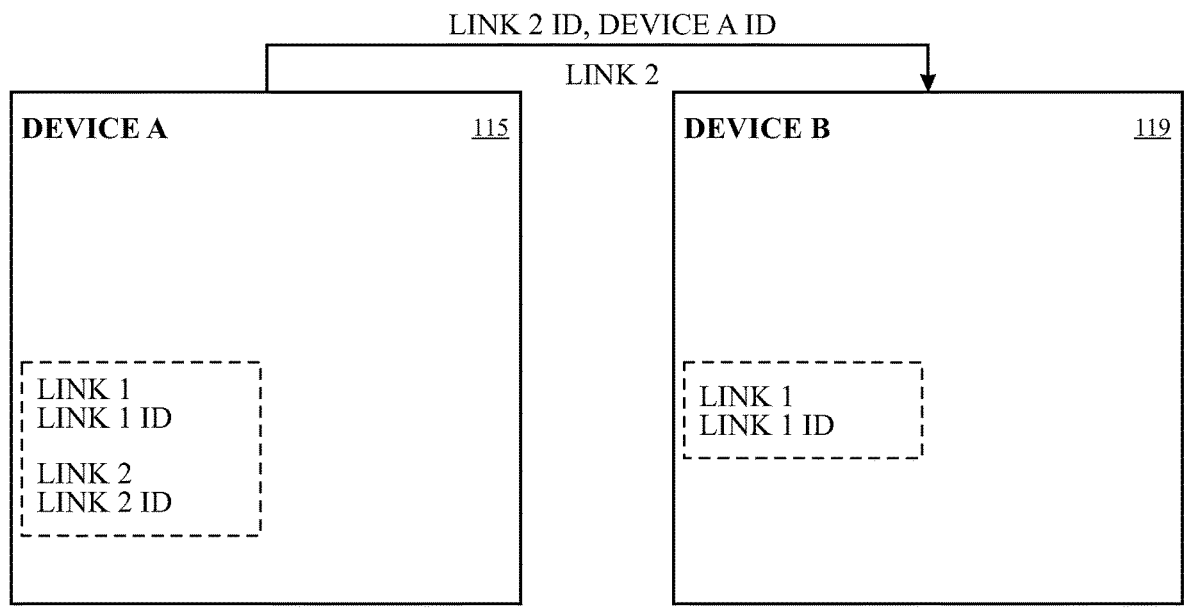
FIG. 16 illustrates a schematic diagram showing an electronic device associated with an account performing an update process for another electronic device associated with the account in accordance with one or more implementations.

As illustrated in FIG. 16, the electronic device 115 may determine that the link identifier provided by the electronic device 119 in the link check-in communication ("Link 1 ID") is associated with a time that is earlier in time than a time associated with the different sequence number ("Link 2 ID") and, responsively, perform an update process for the electronic device 119. The update process may include providing a link (e.g., Link 2) to the electronic device 119 (e.g., with the same device identifier, Device A ID, and with a different link identifier, Link 2 ID). For example, the link identifier (Link 1 ID) may be a time at which the first link (Link 1) was generated at the electronic device 115 and the different link identifier (Link 2 ID) may be a time at which the second link (Link 2) was generated at the electronic device 115. In another example, the link identifier (Link 1 ID) may be a first sequence number and the different link identifier may be a second sequence number that is higher (e.g., by one) than the first sequence number. In contrast with the example of FIGS. 15 and 16, if the electronic device 115 determines that the link identifier provided by the electronic device 119 in the link check-in communication is associated with a time that is not earlier in time than a time associated with the different link identifier, the electronic device 115 may determine not to perform an update process with respect to the link and the second device.

Figure 17:
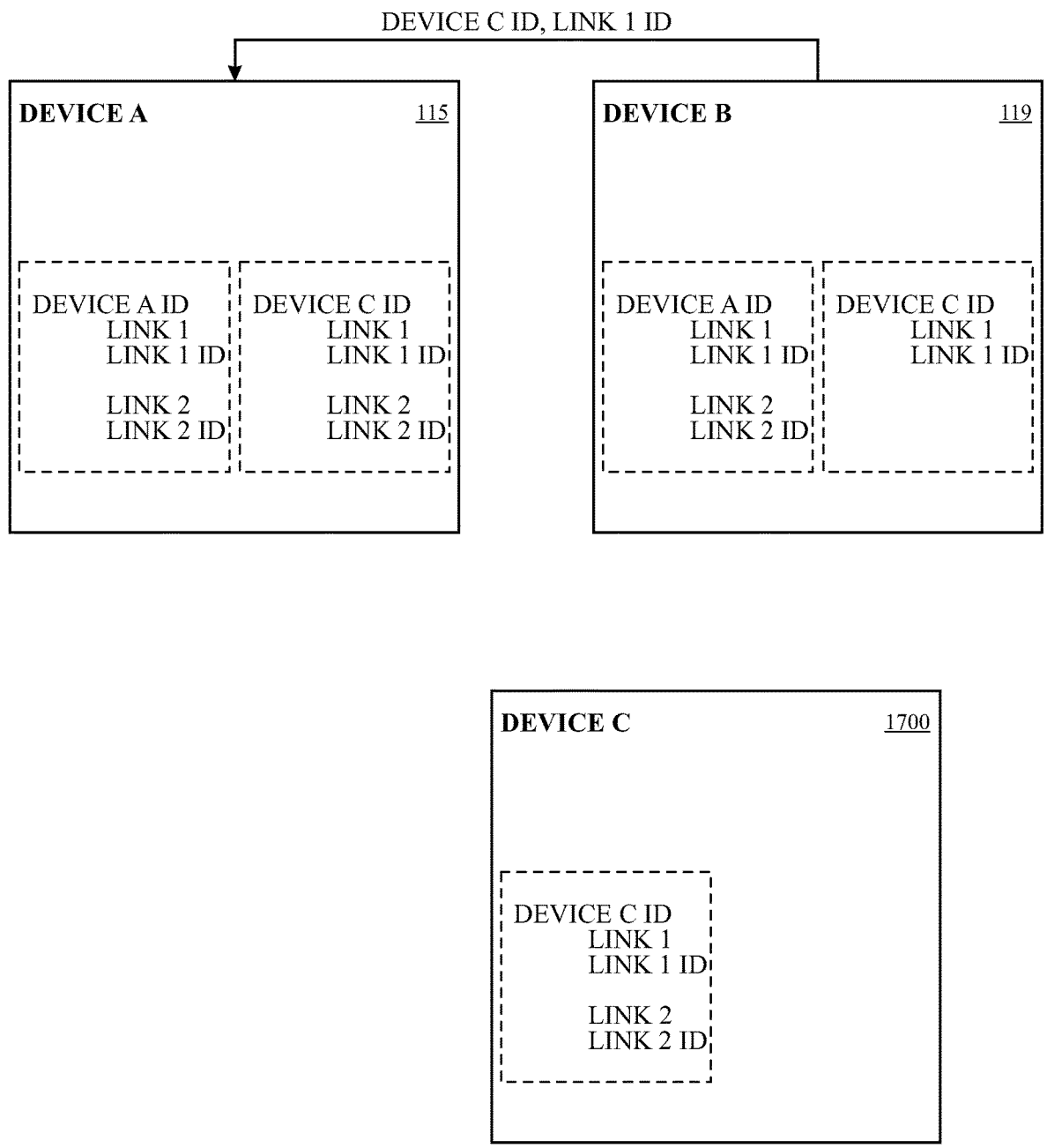
FIG. 17 illustrates a schematic diagram showing a first electronic device associated with an account providing a link check-in communication to second electronic device associated with the account for a link generated by a third electronic device associated with the account in accordance with one or more implementations.

FIG. 17 illustrates an example scenario in which the electronic device 115 has received and stored one or more additional links generated at another device (e.g., electronic device 1700) associated with the user account of the electronic device 115 and the electronic device 119. In this example, the additional links each include or are associated with a device identifier ("Device C ID") for the electronic device 1700, and an additional link identifier ("Link 1 ID" and "Link 2 ID"). This example shows that links generated at different devices can, in some examples, have the same link identifier (e.g., Link 1 ID), but can be differentiated by being associated with, sent with, and/or stored in connection with the device identifier (e.g., Device A ID or Device C ID, in this example) for the device that generated the link.

FIG. 17 illustrates an example in which the electronic device 115 receives a link check-in communication from the electronic device 119, the link check-in communication including the device identifier for the electronic device 1700 (e.g., Device C ID) and a further additional link identifier (e.g., Link 1 ID).

Figure 18:
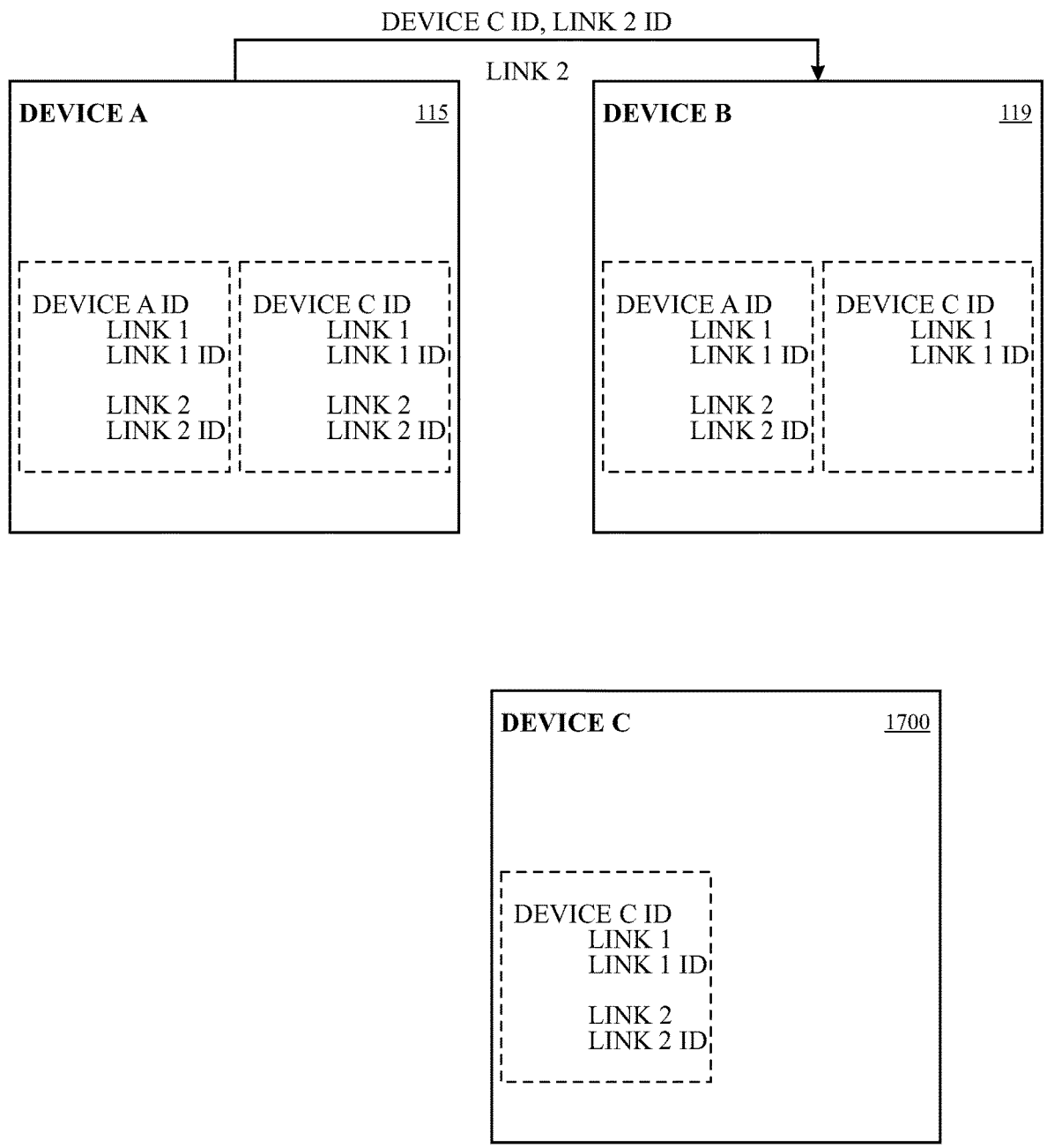
FIG. 18 illustrates a schematic diagram showing the first electronic device of FIG. 17 providing a link generated by the third electronic device associated with the account to the second electronic device associated with the account in accordance with one or more implementations.

As shown in FIG. 18, the electronic device 115 may perform an update process for the electronic device 119 by providing the additional link (Link 2), previously received from the electronic device 1700 (e.g., along with the link identifier, Link 2 ID, for that link), to the electronic device 119, responsive to determining that the further additional link identifier (Link 1 ID) is associated with a time that is earlier in time than a time associated with the additional link identifier (Link 2 ID) and the device identifier (Device C ID) for the device that generated that link.

Figure 19:
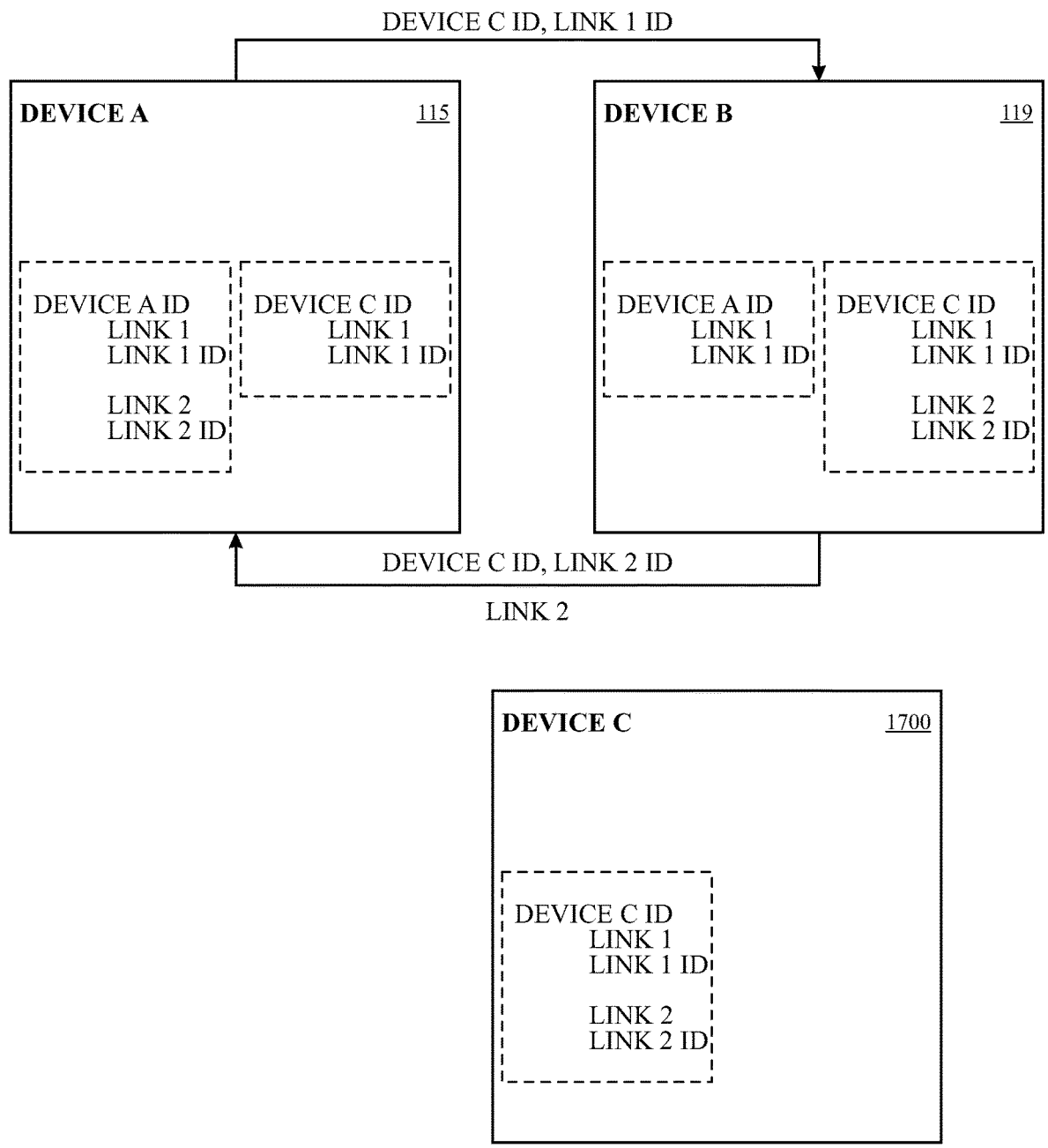
FIG. 19 illustrates a schematic diagram showing a first electronic device associated with an account providing a link check-in communication to a second electronic device associated with the account and receiving a link generated by a third electronic device associated with the account from the second electronic device associated with the account in accordance with one or more implementations.

FIG. 19 illustrates an example scenario in which the electronic device 115 sends (e.g., in a link check-in communication) the device identifier for the electronic device 1700 (Device C ID) and an additional link identifier (Link 1 ID) to the electronic device 119, and responsively receives a further additional link (Link 2) including the device identifier for the electronic device 1700 (Device C ID) and a further additional link identifier (Link 2 ID). For example, the check-in and update process shown in FIG. 19 may be performed when the electronic device 119 has received a link (e.g., Link 2) that has not yet been received by the electronic device 115 (or the electronic device 115 can obtain the link from the electronic device 1700 that generated the link or from another device associated with the account).

In any of the various operations of FIGS. 14-19, a device performing an update process to provide a link update to another device may provide a private key for that link to the other device. In other implementations, the private key may be provided once and used for multiple links. Using the operations illustrated in FIGS. 14-19, links generated by any device associated with an account may be synchronized across all of the devices associated with the account. This can be advantageous in cases in which, for example, a link creator device is turned off, logged out of the account, out of power, or otherwise unavailable or offline when an event (e.g., a conferencing session) corresponding to the link is being initiated or is ongoing, and the other devices associated with the account can be used to initiate, host, and/or otherwise manage the event.

In one or more implementations, any or all of the devices at which links are stored may delete a link when a service-specific alias for the link expires. For example, when a service-specific alias 704 expires at an expiration time 800 as described herein, the server storing the service-specific alias 704 may send a notification to the devices associated with the corresponding account 700 for the service-specific alias (e.g., a notification to fetch an update). For example, electronic device 115, electronic device 119, and/or electronic device 1700 may determine that a service-specific alias 704 is expired based on the attempted fetch, and may delete any links that include that service-specific alias.

Figure 20:
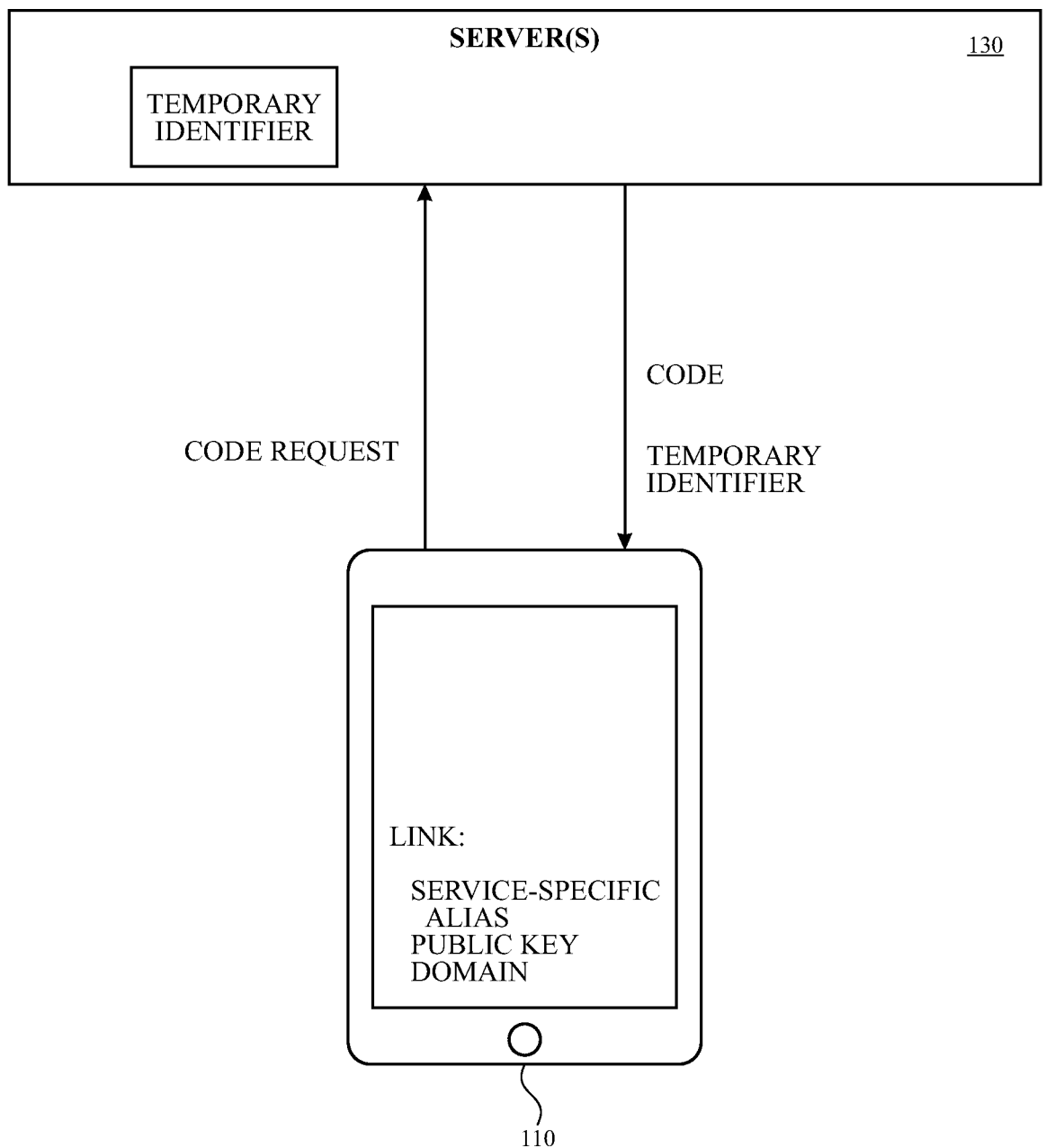
FIG. 20 illustrates a schematic diagram showing an electronic device obtaining code from a server for a web-based application for joining a call in accordance with one or more implementations.
Figure 21:
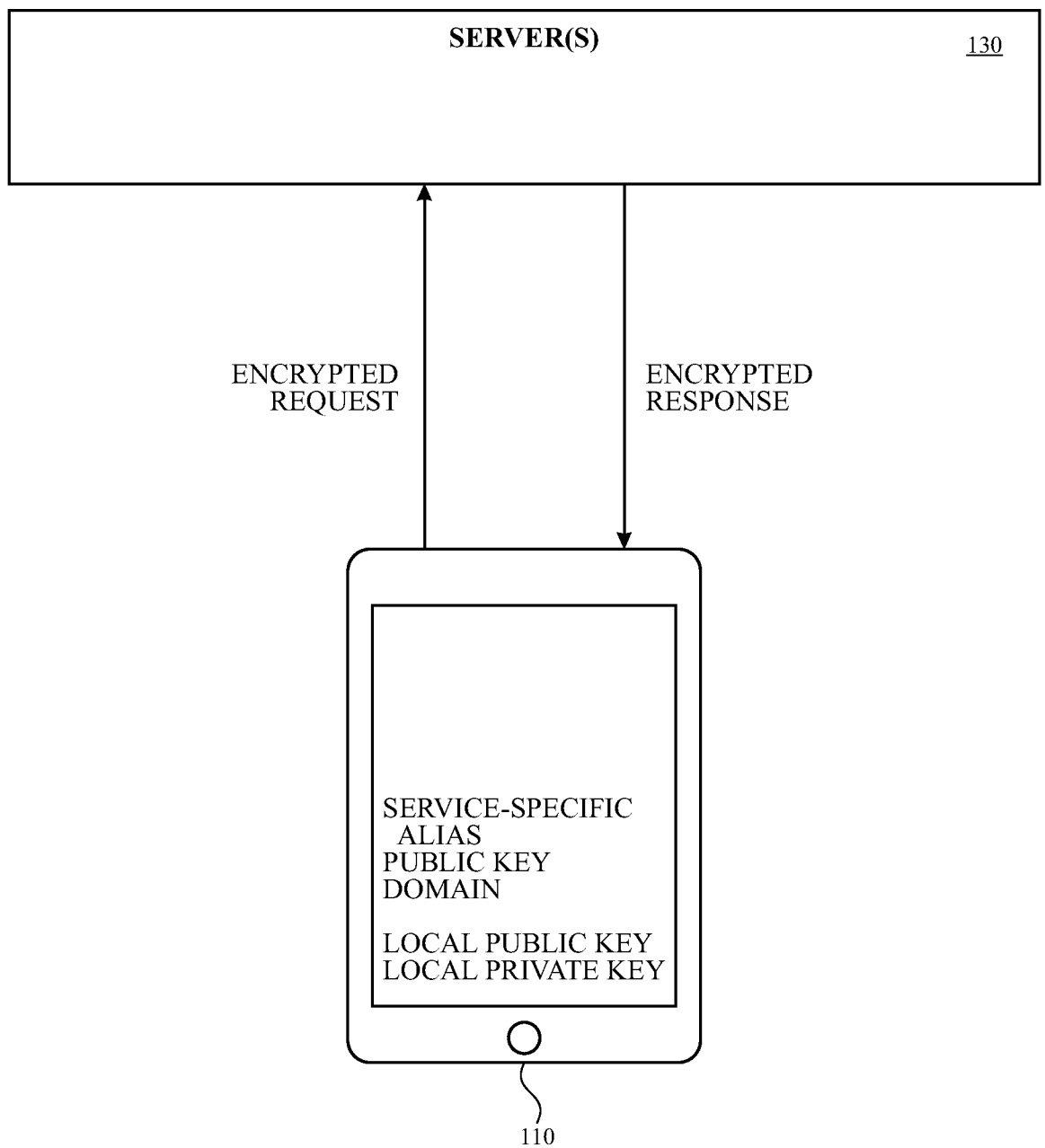
FIG. 21 illustrates a schematic diagram showing an electronic device requesting to join a call in accordance with one or more implementations.
Figure 22:
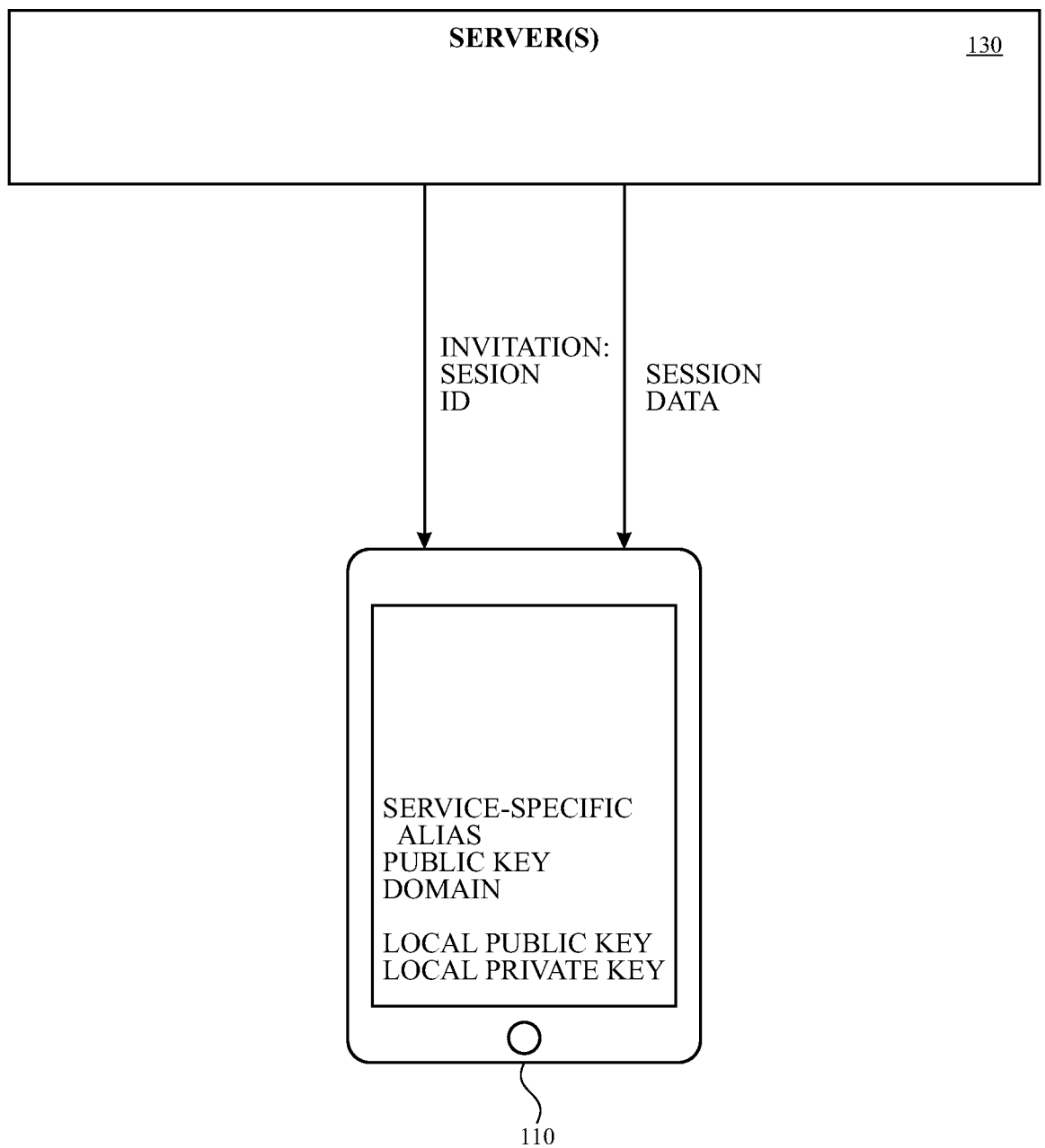
FIG. 22 illustrates a schematic diagram showing an electronic device joining a call in accordance with one or more implementations.

As discussed herein, aspects of the subject technology allow for devices to join a conferencing session from a web-based application, such as without exposing communications for joining the conferencing a session to a server. FIGS. 20-22 illustrate an example scenario in which an electronic device, such as electronic device 110 that does not have a conferencing application for a conferencing session, joins a conferencing a session (e.g., using a web-based application via a browser such as browser 208 of FIG. 2).

As shown in FIG. 20, electronic device 110 may provide a code request to a server (e.g., server 130) at a domain obtained from a link (e.g., a link received as discussed above in connection with FIG. 9) that corresponds to a call (also referred to herein as a conferencing session) with another device such as electronic device 115. For example, the electronic device 110 may have a link that includes domain for the server, a public key for the conferencing session, and a service-specific alias for an account of a creator of the link. As shown, the electronic device 110 may obtain code from the server responsive to the request, code (e.g., code such as JavaScript code for a web-based application).

FIG. 20 also illustrates how the electronic device 110 may also, in some implementations, receive, from the server (e.g., with the code for the web-based application) a temporary identifier for the electronic device 110. For example, the server may generate the temporary identifier for the electronic device 110 responsive to the code request, and store the temporary identifier at the server. In one or more implementations, the server provides the temporary identifier to the electronic device 110. In one or more implementations, the server may establish a collection of rights associated with the temporary identifier, that can be expanded or diminished by the server based on the activity associated with the temporary identifier. In some examples, the server may limit requests (e.g., request-to-join messages and/or other messages) from the device associated with the temporary identifier, such as until a trusted device (e.g., a device logged into an account with the server, a device that has been in a conferencing session associated with a request for a least a minimum period of time, or a device that was included on an original invitation for the conferencing session associated with a request) approves a request from a device associated with the temporary identifier. In other examples, the server may limit an amount of data that can be transmitted through the server from the device associated with the temporary identifier in a given time period, and may increase the amount of data if a trusted device approves a request from a device associated with the temporary identifier. In one or more implementations, one or more servers may also track and/or limit an amount of links (or other data, such as service-specific aliases) that are generated by devices logged into a particular account, and/or may increase or decrease the amount of links based on activity associated with the links (or other data) For example, the server may limit the amount of requests associated with links (or other data, such as a service-specific alias) over a period of time, and/or may increase or decrease the limit, based on activity associated with the links (or other data) and/or activity associated with the account.

The electronic device 110 may execute the obtained code to: (i) encrypt a request (e.g., a request-to-join message) to join the call using the public key obtained from the link, and (ii) send the encrypted request to the server for delivery to the electronic device 115 or another device associated with the same account as the electronic device 115 (e.g., as described above in connection with FIG. 10). In one or more implementations, the link and the request may be free of identifying information of current participants or encryption keys for communication within the call. In one or more implementations, the public key corresponds to (e.g., is part of a key pair with) a private key generated and held by the electronic device 115 and inaccessible by the server.

For example, as discussed in connection with FIG. 10, sending the encrypted request to the server for delivery to the electronic device 115 may include sending the encrypted request to the server with an alias (e.g. a service-specific alias 704) for a user of the electronic device 115, the alias included in the link and free of identifying information of the user of the electronic device 110. In some examples, the server and/or another server stores a mapping between the alias (e.g., the service-specific alias 704 for the account 700 of the user) and contact information for the user (e.g., the account alias 702 for the account), the mapping inaccessible by the electronic device 110. As also discussed above in connection with FIG. 10, the request may also include a public key (e.g., a local public key) for the electronic device 110.

As shown in FIG. 21, the electronic device 110 may receive an encrypted response to the request (e.g., the encrypted request-to-join), from the server (e.g., server 130). For example, the encrypted response may be a response from the electronic device 115 (or another device associated with the same account as the electronic device 115) indicating that the encrypted request-to-join has been approved. The electronic device 110 may decrypt the encrypted response using a local private key corresponding to the public key for the electronic device 110 and using the public key obtained from the link, to obtain an identifier of the call (e.g., a session identifier or Session ID).

In some examples, the server may limit requests (e.g., request-to-join messages and/or other messages) from the device associated with the temporary identifier, such as until a trusted device (e.g., a device that generated a link for which the request-to-join message is being provided) approves a request from the device associated with the temporary identifier. For example, until a device that has been assigned a temporary identifier is accepted into a conferencing session in response to a request-to-join message, the server may limit the device to a first number of requests associated with any link over a predefined period of time. After the device associated with the temporary identifier receives an approval response to a request, the server may, for example, increase the number of requests associated with any link that that device can send over the predefined period of time to a second, higher number of requests.

As shown in FIG. 22, the electronic device 110 receives, using the obtained code, an invitation to join a call associated with the identifier. The electronic device 110 may then verify that the session identifier in the invitation corresponds to the session identifier obtained by decrypting the encrypted response described in connection with FIG. 21, and provide a user option to join the call. The electronic device 110 may then receive a user acceptance of the invitation, and join the call to begin receiving session data (e.g., audio and/or video streams for the conferencing session).

In one or more implementations, the electronic device 110 may receive the encrypted response to the encrypted request-to-join message referred to in connection with FIG. 21 via the server from the electronic device 115 that generated the link. In one or more other implementations, the electronic device 115 that generated the link may delegate another device (e.g., a device included in an original invitation for the conferencing session) to approve the request-to-join. For example, the encrypted response to the request-to-join message may include an approval provided by a delegate device that is a participant in an ongoing call with the electronic device 115 or another device (e.g., electronic device 119) that is associated with the same user as the electronic device, and encrypted by the electronic device 115 or another device (e.g., electronic device 119) that is associated with the same user as the electronic device.

Figure 23:
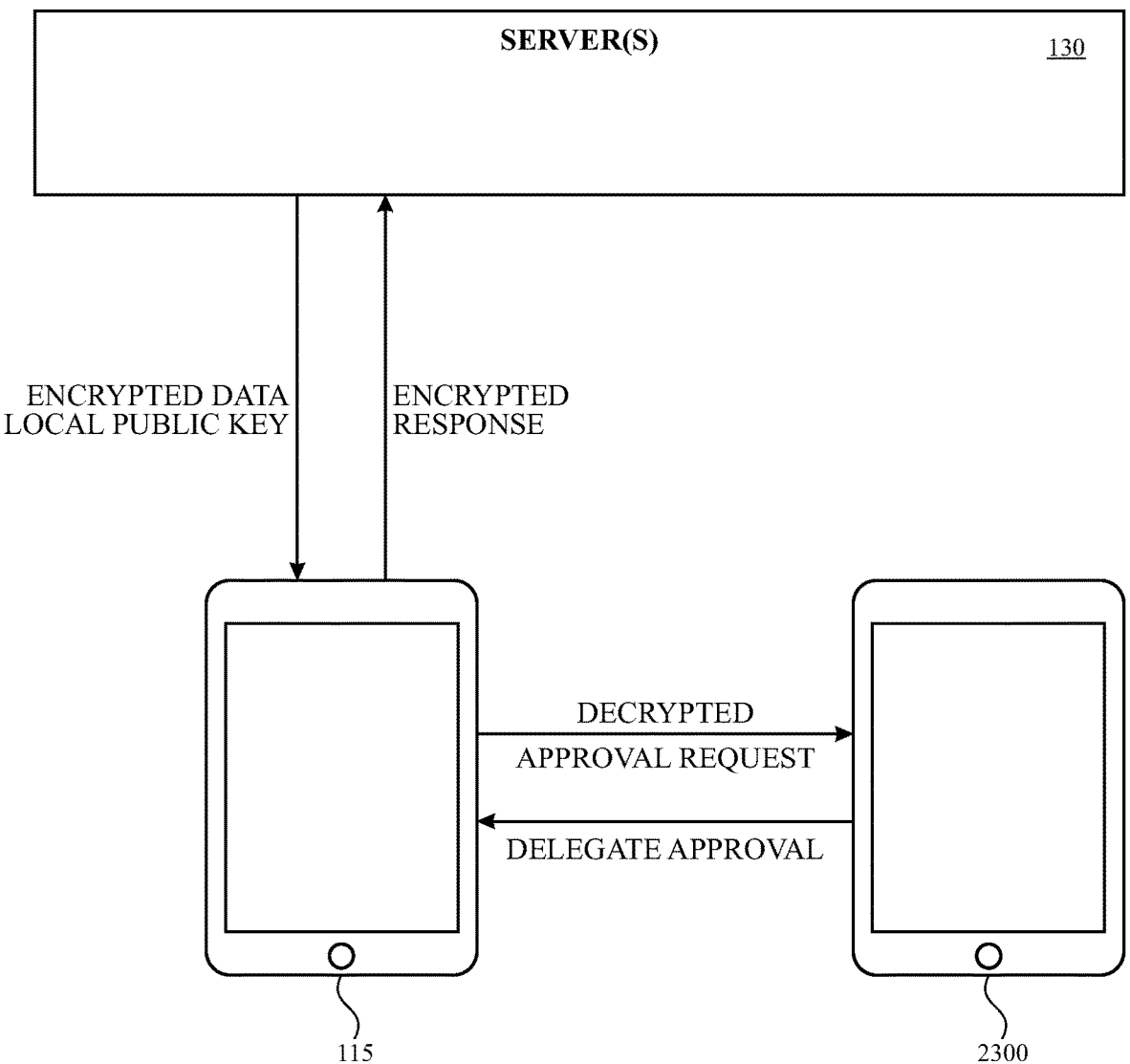
FIG. 23 illustrates a schematic diagram showing an example of a delegate approval process for approving a request to join a call in accordance with one or more implementations.

For example, FIG. 23 illustrates a scenario in which the electronic device 115 receives encrypted data (e.g., an encrypted request-to-join message) from the electronic device 110 of FIG. 21 via a server (e.g., server 120), decrypts the encrypted request using the private key generated at the electronic device 115, and provides a decrypted approval request to another device 2300 (e.g., a trusted device such as a device included in an original invitation to the conferencing session or a device that has been a participant in the ongoing conferencing session for greater than a minimum period of time). In the example of FIG. 23, the electronic device 115 receives a delegate approval from the device 2300, encrypts an approval response based on the delegate approval (e.g., using the local public key provided from the electronic device 110 and the private key generated at the electronic device 115), and provides the encrypted response to the server for delivery to the electronic device 110.

Figure 24:
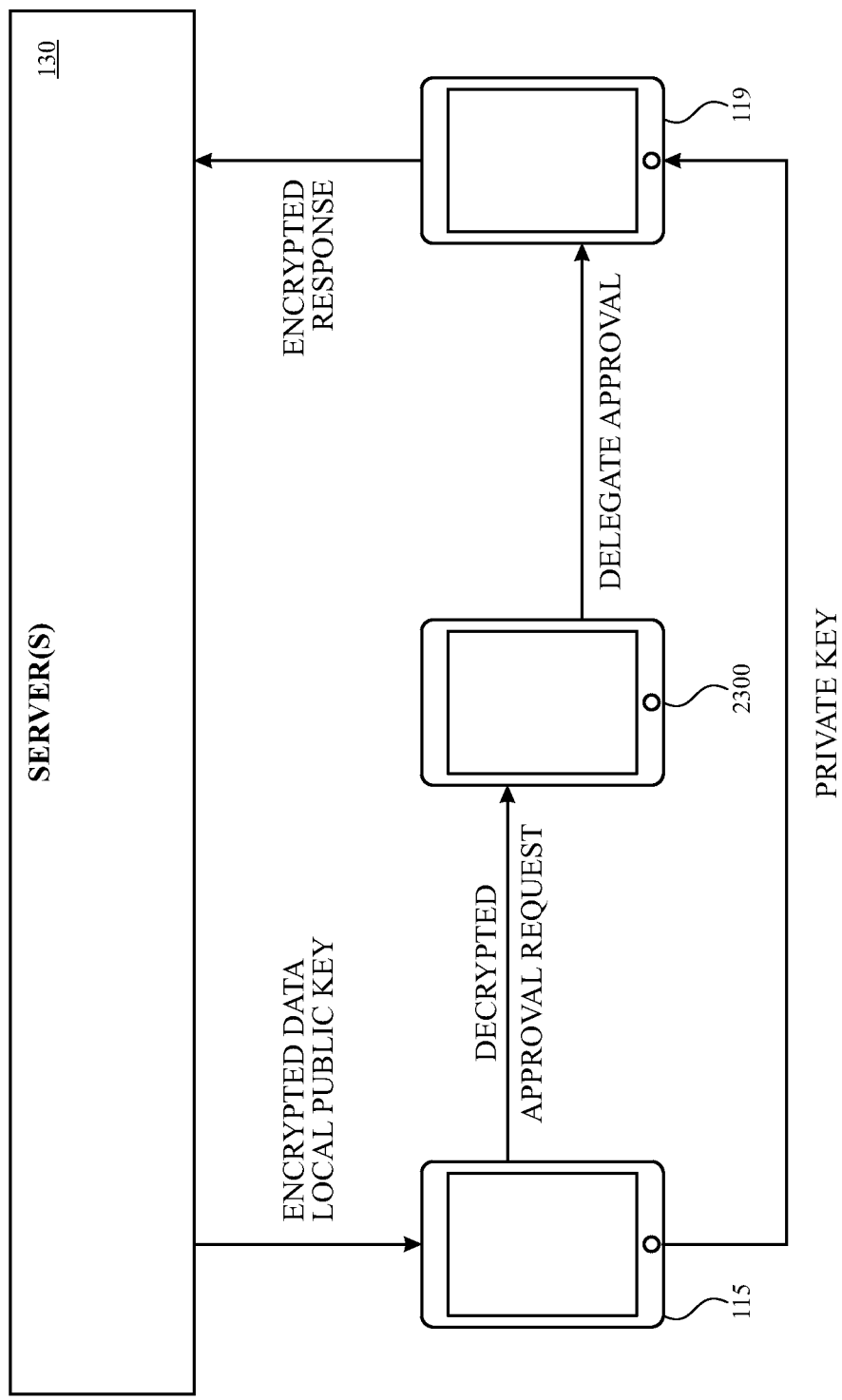
FIG. 24 illustrates a schematic diagram showing an example of another delegate approval process for approving a request to join a call in accordance with one or more implementations.

As another example of delegate approval of a request-to-join message, FIG. 24, illustrates a scenario in which the electronic device 115 receives encrypted data (e.g., an encrypted request-to-join message) from the electronic device 110 of FIG. 21 via a server (e.g., server 120), decrypts the encrypted request using the private key generated at the electronic device 115, and provides a decrypted approval request to another device 2300 (e.g., a trusted device such as a device included in an original invitation to the conferencing session or a device that has been a participant in the ongoing conferencing session for greater than a minimum period of time). In the example of FIG. 24, another device (e.g., electronic device 119) associated with the same account as the electronic device 115 receives a delegate approve from the device 2300, encrypts an approval response based on the delegate response (e.g., using the local public key provided from the electronic device 110 and the private key generated at the electronic device 115 and provided to the electronic device 119, such as in a link synchronization operation as described above in connection with FIG. 14), and provides the encrypted response to the server for delivery to the electronic device 110. In other examples, the encrypted request-to-join message may be received and decrypted by the electronic device 119 and approved by the electronic device 119 or based on a delete approval from electronic device 2300.

In this way, any device that is a trusted participant in the conferencing session can approve a request-to-join message, even if no device associated with the account of the link creator device is a current participant in the call (e.g., as long as one device associated with the account of the link creator device is online and able to decrypt the encrypted request to join, and encrypt the delegate approval response).

In one or more implementations, the subject technology may provide participants in a conferencing session with the ability to expel another participant. For example, because the links described herein for joining a conferencing session can be used by any network connected device to request to join a conferencing session (e.g., and may be widely available in circumstances in which the link is posted on a web page, in a blog, or via social media), users that are not desired to be participants in the conferencing session, may inadvertently be allowed to join the conferencing session. It may be desirable for the original invitees of the conferencing session and/or participants that have been in the conferencing session for at least a minimum amount of time to be able to expel some other participants that have joined the conferencing session if one or more criteria (e.g., an expelling factor) is met.

Figure 25:
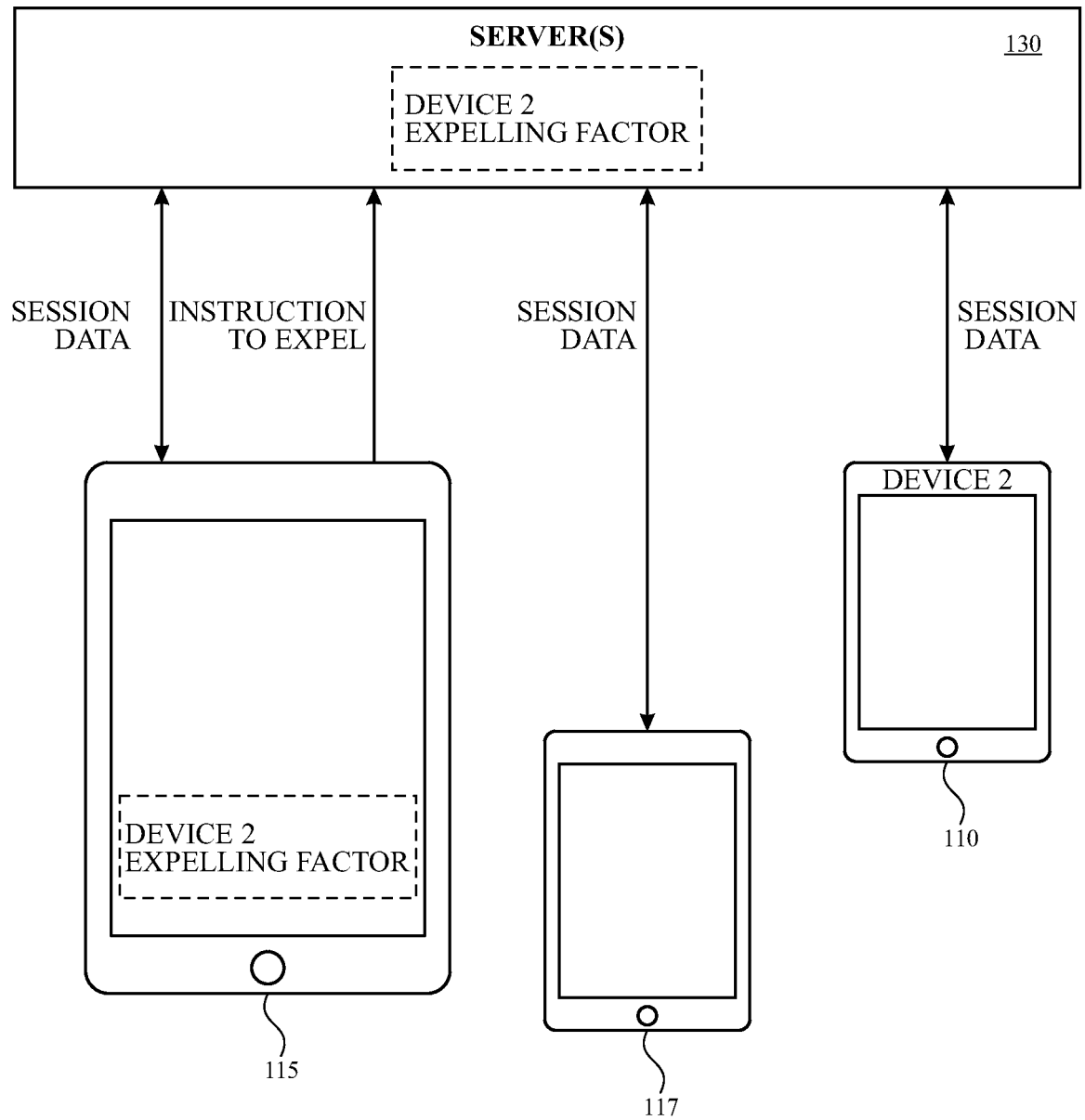
FIG. 25 illustrates a schematic diagram showing an example of an electronic device transmitting an instruction to expel another electronic device from a conferencing session in accordance with one or more implementations.

For example, as shown in FIG. 25, electronic device 115 may be connected to a conferencing session with electronic device 117 and electronic device 110, and may identify electronic device 110 as an expellable device (e.g., a device that is enabled to be expelled) or a non-expellable device (e.g., a device that is disabled from being expelled) based on an expelling factor for the electronic device 110. As shown in FIG. 25, one or more servers such as the server 130 (e.g., which may be or include a relay server) may also determine or obtain an expelling factor for the electronic device 110. In one or more implementations, the electronic device 119 may also determine or obtain an expelling factor for the electronic device 110.

Figure 26:
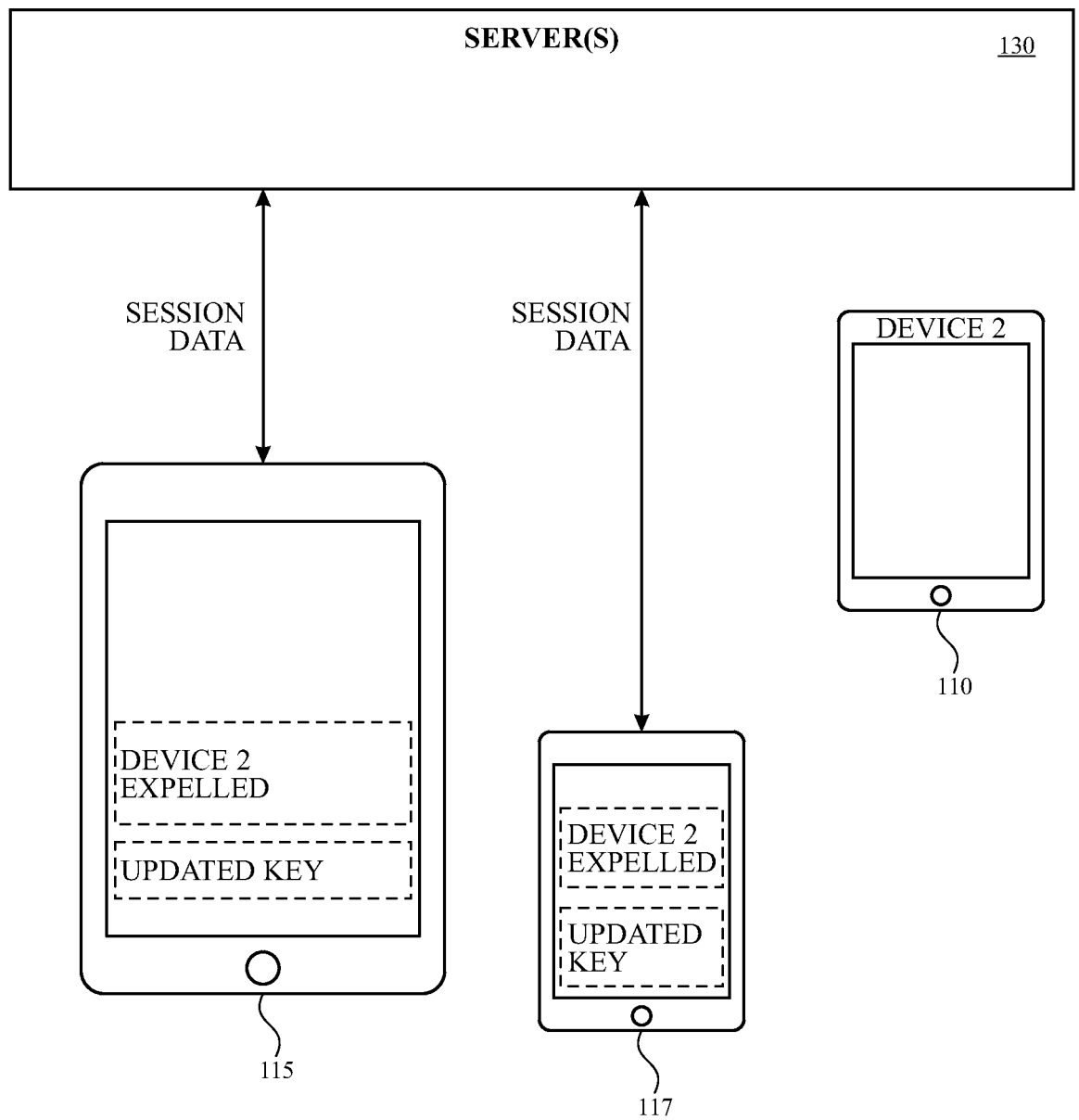
FIG. 26 illustrates a schematic diagram showing an example of an electronic device receiving a confirmation that another electronic device has been expelled from a conferencing session in accordance with one or more implementations.

As illustrated in FIG. 25, the electronic device 115 may send an instruction to expel the electronic device 110 to the server 130. In scenarios, in which the electronic device 110 is an expellable device based on the expelling factor at the server, the electronic device 110 may be disconnected (expelled) from the conferencing session, as shown in FIG. 26. As shown in FIG. 26, when electronic device 110 is expelled, the electronic device 115 and the other participant devices in the conferencing session (e.g., electronic device 117) may store an indication that the electronic device 110 has been expelled (e.g., in order to prevent the electronic device 110 from requesting to rejoin the conferencing session). FIG. 26 also indicates how, when electronic device 110 is expelled, the electronic device 115 and the other participant devices in the conferencing session (e.g., electronic device 117) may roll the keys for encrypting the session data being exchanged within the conferencing session, so that the expelled electronic device can no longer decrypt the session data for the conferencing session after expulsion. Rolling the keys for encrypting the session data may include generating a new key at each participant device and encrypting and sending the new key to the other participant devices, in one or more implementations.

Figure 27:
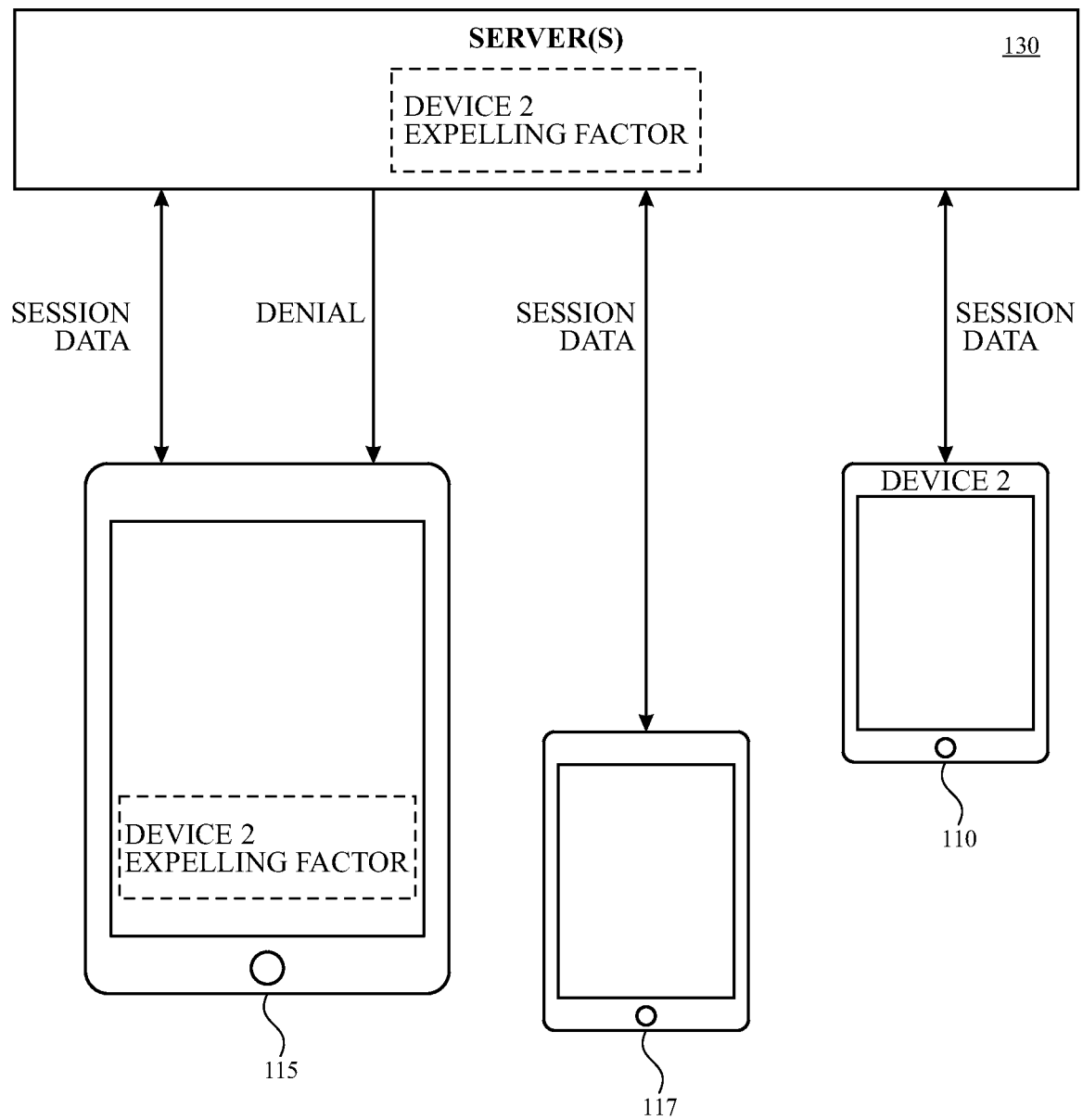
FIG. 27 illustrates a schematic diagram showing an example of an electronic device that is disabled from being expelled from a conferencing session in accordance with one or more implementations.

In contrast with FIG. 26, FIG. 27 illustrates how, in scenarios in which an instruction to expel is sent for the electronic device 110 when the electronic device 110 is a non-expellable device (e.g., based on the expelling factor at the server), the electronic device 115 may receive a denial from the server, and the electronic device 110 may remain in the conferencing session.

In one or more implementations, the expelling factor may be a pre-determined amount of time following admission of the electronic device 110 into the conferencing session, and electronic device 115 identifies the electronic device 110 as an expellable device for the pre-determined amount of time following the admission of the second device into the conferencing session, and identifies the electronic device 110 as a non-expellable device after the pre-determined amount of time following the admission of the second device into the video conferencing session. In one or more implementations, prior to the pre-determined amount of time, while the electronic device 110 is a non-expellable device, the electronic device 115 provides a request (e.g., an expel request) to the server 130 to remove the electronic device 110 from the conferencing session (see, e.g., FIG. 25), and receives a confirmation that the electronic device 110 has been removed from the conferencing session (see, e.g., FIG. 26). In one or more implementations, after the pre-determined amount of time, while the second device is a non-expellable device, the first device provides a request to a server to remove the second device from the conferencing session(see, e.g., FIG. 25), and receives a response indicating that the second device cannot be removed from the video conferencing session (see, e.g., FIG. 27).

In one or more implementations, the electronic device 115 starts a timer upon admission of the electronic device 110 into the conferencing session. In one or more implementations, the electronic device 117 also starts a timer upon admission of the electronic device 110 into the conferencing session, and identifies the electronic device 110 as a non-expellable device after expiration of the timer of the electronic device 117.

In one or more implementations, a server (e.g., server 130) that relays data (e.g., session data, such as encrypted audio and/or video data) between the electronic device 115 and the electronic device 110 during the conferencing session also starts a timer upon admission of the electronic device 110 into the conferencing session, and identifies the electronic device 110 as an expellable device before the expiration of the time at the server, and as a non-expellable device after expiration of the timer of the server. In some examples, the timer of the first device is different from (e.g., longer or shorter than) the timer of the server.

In one or more implementations, before the pre-determined amount of time (e.g., and before expiration of the timer for the electronic device 110 at the server), while the electronic device 110 is identified by the first device as an expellable device (e.g., and identified by the server as an expellable device), the electronic device 115 provides a request to the server to remove the electronic device 110 from the conferencing session, and receives a response indicating that the electronic device 110 has been expelled from the conferencing session. In one or more implementations, after the pre-determined amount of time (e.g., and before expiration of the timer for the electronic device 110 at the server), while the electronic device 110 is identified by the first device as a non-expellable device (e.g., and identified by the server as an expellable device), the electronic device 117 provides a request to the server to remove the electronic device 110 from the conferencing session, and receives a response indicating that the electronic device 110 has been expelled from the conferencing session. In one or more implementations, before the pre-determined amount of time (e.g., and after expiration of the timer for the electronic device 110 at the server), while the electronic device 110 is identified by the first device as an expellable device (e.g., and identified by the server as a non-expellable device), the electronic device 115 provides a request to the server to remove the electronic device 110 from the conferencing session, and receives a response indicating that the electronic device 110 cannot be removed from the conferencing session.

In one or more implementations, the expelling factor may be a joining method factor that depends on the connection mechanism by which the device joined the conferencing session (e.g., via the conferencing application 200, via a web-based application using a browser 206 or 208, and/or as a new participant or as an original invitee). For example, in one or more examples, electronic device 110 is connected to the conferencing session via a conferencing application 200 and the electronic device 115 identifies the second device as a non-expellable device (e.g., immediately upon admission of the electronic device 110 to the conferencing session). In these examples, the electronic device 115 is unable to remove the electronic device 110 from the conferencing session. In one or more implementations, the electronic device 115 is an initiator of the conferencing session.

In one or more other examples, the electronic device 110 has been admitted to the conferencing session via a web-based application (e.g., using a browser 208), and the electronic device 115 identifies the second device as an expellable device. In these examples, the electronic device 110 may continue to be identified as an expellable device while exchanging at least audio streams (e.g., and video streams) with the first device during at least a portion of the conferencing session. In one or more example scenarios, the electronic device 115 provides a request to a server to remove the electronic device 110 from the video conferencing session, and receives a confirmation that the third device has been removed from the conferencing session (e.g., as described above in connection with FIG. 26). In one or more implementations, after a pre-determined amount of time following the electronic device 110 being admitted to the conferencing session (and not expelled during the pre-determined amount of time), the electronic device 115 identifies the electronic device 110 that was initially identified as an expellable based on the connection mechanism, identifies as a trusted (non-expellable) device.

In the examples of FIGS. 25-27, the electronic device 115 may be connected to the conferencing session via a video conferencing application at the first device or via a web-based application (e.g., using a browser 202).

In one or more implementations, after a participant device has been removed from a conferencing session, each remaining participant device and the server may store and/or update a list of removed devices. In one or more implementations, each remaining participant device and the server may delete or reset the list of removed devices when the conferencing session ends (e.g., when the last participant device leaves the conferencing session). In one or more implementations, after the participant device is removed from a conferencing session, the remaining participant devices may update encryption keys corresponding to the conferencing session (e.g., in response to a server notification that membership in the video conferencing session has changed). In one or more implementations, an already trusted participant device (e.g., known to the server to be trusted by virtue of being connected to the conferencing session via the conferencing application 200, being an original invitee for the conferencing session, and/or having been a participant in the conferencing session for at least a predetermined period of time) can bypass the pre-determined time during which a new participant device would be identified as expellable, and make the new participant device trusted (and thus non-expellable) earlier than the expiration of the pre-determined time.

Figure 28:
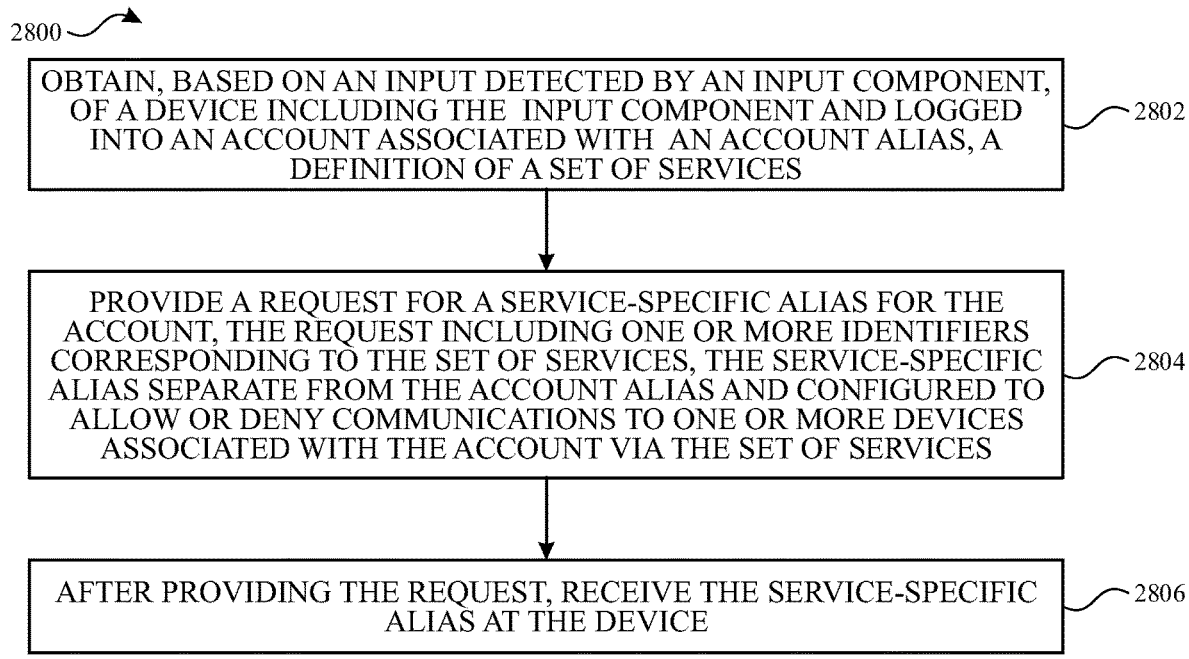
FIG. 28 illustrates a flow diagram of an example process for obtaining a service-specific alias in accordance with one or more implementations.

FIG. 28 illustrates a flow diagram of an example process 2800 for obtaining a service-specific alias, in accordance with one or more implementations. For explanatory purposes, the process 2800 is primarily described herein with reference to the components of FIGS. 1 and 2 (particularly with reference to electronic device 115), which may be executed by one or more processors of the electronic device 115 of FIGS. 1 and 2. However, the process 2800 is not limited to the electronic device 115, and one or more blocks (or operations) of the process 2800 may be performed by one or more other components of other suitable devices, such as one or more of the electronic device 117, the electronic device 110, the electronic device 119, and/or one or more servers such as the server 120 and/or the server 130. Further for explanatory purposes, the blocks of the process 2800 are described herein as occurring in serial, or linearly. However, multiple blocks of the process 2800 may occur in parallel. In addition, the blocks of the process 2800 need not be performed in the order shown and/or one or more blocks of the process 2800 need not be performed and/or can be replaced by other operations.

At block 2802, a device (e.g., electronic device 115) including an input component and logged into an account (e.g., an account 700) associated with an account alias (e.g., an account alias 702) obtains, based on an input detected by the input component, a definition of a set of services (e.g., a set 706 of services 708, such as "Service P" as described above in connection with the example of FIG. 7). For example, the set of services may include one or more of a messaging service, a file transfer service, a video conferencing service, or a gaming service.

At block 2804, the device may provide a request for a service-specific alias (e.g., a service-specific alias 704) for the account. The request may include one or more identifiers corresponding to the set of services. The request may be provided locally on the device for generation of a service-specific alias at the device, or the request may be provided to a server for provisioning of the service-specific alias at the server. For example, providing the request for the service-specific alias may include providing the request from the device to a server (e.g., server 120) storing an identification of the account alias of the account. The account alias may be configured to allow contact with the one or more devices associated with the account via any service that the account alias is registered with, including at least one service that is independent of the server. The service-specific alias may be separate from the account alias and configured to allow or deny communications to one or more devices associated with the account via the set of services.

At block 2806, after providing the request, the device may receive the service-specific alias (e.g., as described above in connection with the example of FIG. 8). In one or more implementations, the device may send the service-specific alias from the device to a remote device (e.g., electronic device 110) to allow the remote device to provide communications to the one or more devices associated with the account via the set of services (e.g., as described above in connection with the example of FIG. 9). In one or more implementations, the service-specific alias may be a temporary alias having an expiration time initially defined (e.g., by a provisioning server, such as server 120) upon provisioning of the service-specific alias. In one or more implementations, the device may also obtain a limited scope for the set of services (e.g., an indication of a subservice 710, such as a particular call or conferencing session of a conferencing service) based on the input detected by the input component, and the service-specific alias may be a service-specific and scope-limited alias configured to allow or deny communications to the one or more devices associated with the account via the set of services and within the limited scope (e.g., by only allowing a remote device to contact the device or another device associated with the account using the service-specific and scope-limited alias for a single scheduled conferencing session).

In one or more implementations, the device may detect a proximity-based interaction with a second device (e.g., as described above in connection with FIG. 12). Providing the request for the service-specific alias may include providing the request from the device to a server (e.g., server 120) storing an identification of the account alias of the account responsive to detecting the proximity-based interaction. The service-specific alias may be, for example, a message alias for contacting the one or more devices associated with the account via a messaging service.

In one or more implementations, the device may detect a disconnection of a proximity-based connection between the device and a second device (e.g., as described above in connection with FIG. 13). Providing the request for the service-specific alias may include providing the request from the device to a server (e.g., server 120) storing an identification of the account alias of the account responsive to detecting the disconnection of the proximity-based connection. The device may receive, from the server, the service-specific alias responsive to the request. For example, the service-specific alias may be a temporary file-transfer alias for continuing a file transfer that was in progress over the proximity-based connection, over a wider area network.

Figure 29:
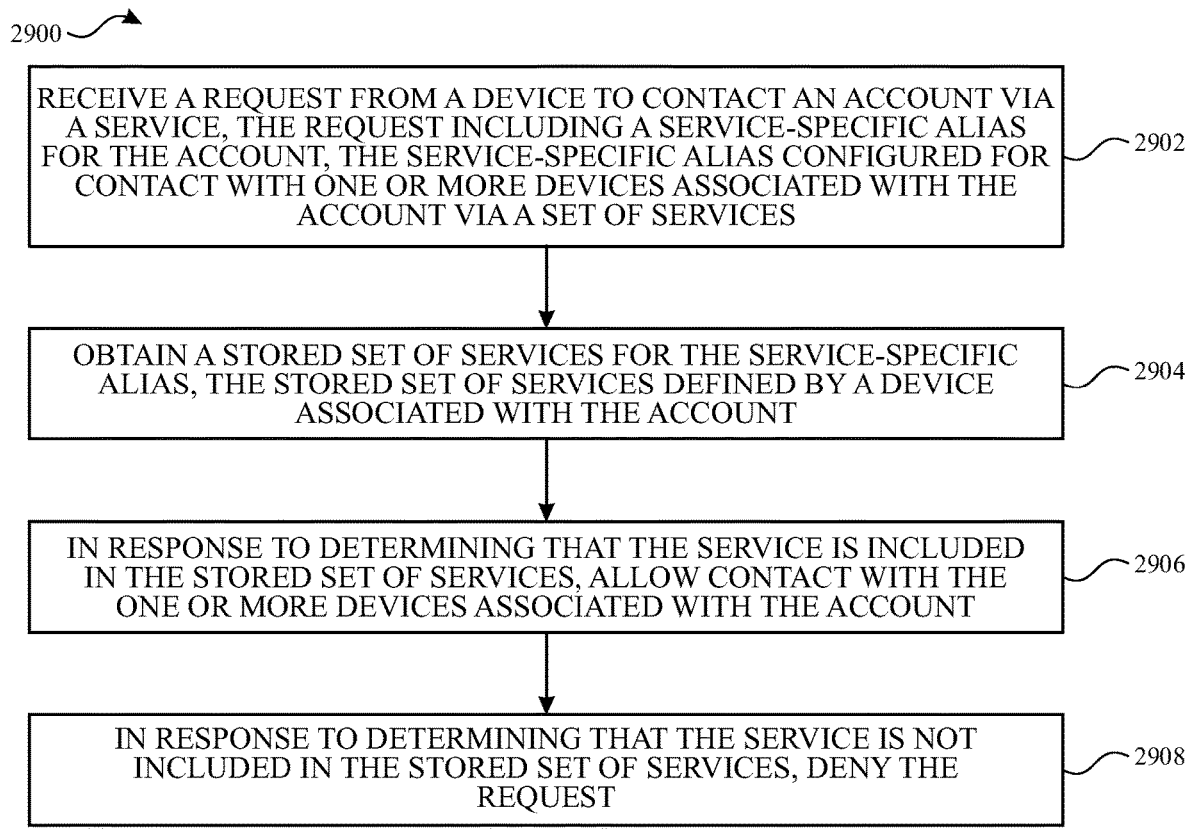
FIG. 29 illustrates a flow diagram of an example process for controlling communications to a service-specific alias in accordance with one or more implementations.

FIG. 29 illustrates a flow diagram of an example process 2900 for allowing or denying attempts to provide communications to a service-specific alias, in accordance with one or more implementations. For explanatory purposes, the process 2900 is primarily described herein with reference to the components of FIG. 1 (particularly with reference to server 120), which may be executed by one or more processors of the server 120 of FIG. 1. However, the process 2900 is not limited to the server 120, and one or more blocks (or operations) of the process 2900 may be performed by one or more other components of other suitable devices, such as one or more of the electronic device 115, electronic device 117, the electronic device 110, the electronic device 119, and/or one or more other servers such as the server 130. Further for explanatory purposes, the blocks of the process 2900 are described herein as occurring in serial, or linearly. However, multiple blocks of the process 2900 may occur in parallel. In addition, the blocks of the process 2900 need not be performed in the order shown and/or one or more blocks of the process 2900 need not be performed and/or can be replaced by other operations.

At block 2902, one or more servers (e.g., server 120 and/or server 130) may receive a request (e.g., as described above in connection with FIG. 10) from a device (e.g., electronic device 110) to contact an account (e.g., an account 700) via a service (e.g., a messaging service, a conferencing service, or other services as described herein). The request may include a service-specific alias (e.g., a service-specific alias 704) for the account, which may be configured for contact with one or more devices (e.g., electronic device 115 or electronic device 119) associated with the account via a set of services. For example, the one or more servers may only allow contact with one or more devices associated with the account, using the service-specific alias, if the attempted contact is via the set of servers for that service-specific alias.

In one or more implementations, prior to receiving the request, the one or more servers may store time information (e.g., an expiration time 800) in association with the service-specific alias. In one or more implementations, the one or more servers generate the service-specific alias, and may, in some examples, include time information in the service-specific alias. In one or more implementations, the one or more servers may, prior to receiving the request, generate the service-specific alias, in part, by including verification information (e.g., a checksum) in the service-specific alias. The verification information can be used to verify that the service-specific alias has not been modified or corrupted, in some implementations.

At block 2904, the one or more servers may obtain a stored set (e.g., a set 706) of services (e.g., services 708) for the service-specific alias. The stored set of services may be defined by a device associated with the account (e.g., as described above in connection with FIG. 7).

At block 2906, in response to determining that the service is included in the stored set of services, the one or more servers may allow contact with the one or more devices associated with the account. For example, the one or more servers store an account (e.g., the account 700) and an account alias (e.g., the account alias 702) of the account, the service-specific alias different from the account alias. Allowing the contact may include, by the one or more servers, obtaining the account alias (e.g., a phone number or an email address) for the account, and providing information associated with the request to a device registered to the account using the account alias.

At block 2908, the one or more servers may, in response to determining that the service is not included in the stored set of services, deny the request. In one or more implementations, the one or more servers may also determine whether to allow the contact with the account via the service by determining whether the service-specific alias is expired. For example, the one or more servers may set an expiration time (e.g., an expiration time 800 as discussed herein) at which the service-specific alias will expire, responsive to a request from the device associated with the account to provision the service-specific alias. The one or more servers may also extend the expiration time for the service-specific alias based on a further request from a device associated with the account (e.g., the device that requested the service-specific alias or another device associated with the account).

In one or more implementations, the request may be a request to contact the account via a subset (e.g., a subservice 710) of the service, and the one or more servers may determine whether to allow the contact with the account via the subset of the service, in part, by determining whether the service-specific alias has a scope that includes the subset of the service. In one or more implementations, the one or more servers may receive a scope (e.g., a subservice such as subservice 710, which may be or include a particular conferencing session in some examples) for the service-specific alias from the device associated with the account. The one or more servers may also store the scope in connection with the service-specific alias.

In one or more implementations, the one or more servers may also identify one or more other devices associated with the account, and provide a notification to the one or more other devices with respect to creation of the service-specific alias. (e.g., a notification to fetch the service-specific alias, as described above in connection with FIG. 8).

Figure 30:
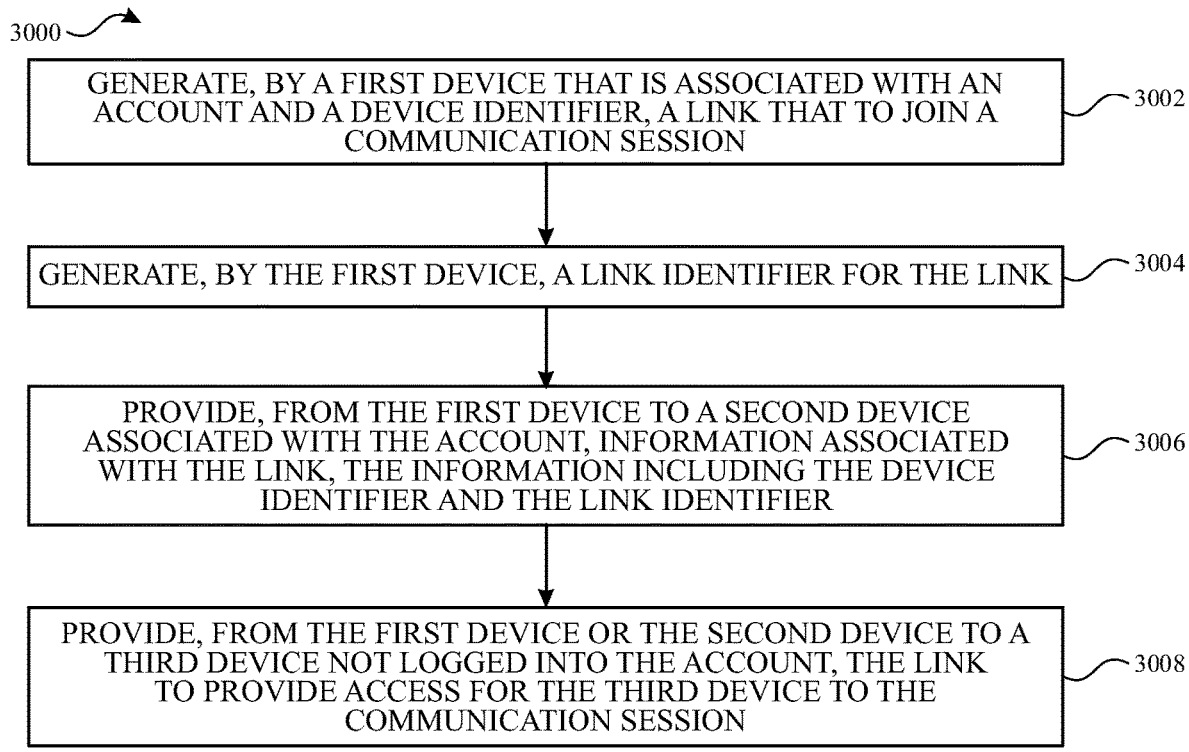
FIG. 30 illustrates a flow diagram of an example process for link synchronization in accordance with one or more implementations.

FIG. 30 illustrates a flow diagram of an example process 3000 for link synchronization among devices associated with a common account, in accordance with one or more implementations. For explanatory purposes, the process 3000 is primarily described herein with reference to the components of FIGS. 1 and 2 (particularly with reference to electronic device 115), which may be executed by one or more processors of the electronic device 115 of FIGS. 1 and 2. However, the process 3000 is not limited to the electronic device 115, and one or more blocks (or operations) of the process 3000 may be performed by one or more other components of other suitable devices, such as one or more of the electronic device 117, the electronic device 110, the electronic device 119, and/or one or more servers such as the server 120 and/or the server 130. Further for explanatory purposes, the blocks of the process 3000 are described herein as occurring in serial, or linearly. However, multiple blocks of the process 3000 may occur in parallel. In addition, the blocks of the process 3000 need not be performed in the order shown and/or one or more blocks of the process 3000 need not be performed and/or can be replaced by other operations.

At block 3002, a first device (e.g., electronic device 115) that is associated with an account (e.g., an account 700) and a device identifier (e.g., "Device A ID"), may generate a link to join a communication session (e.g., an audio communications session or a video communications session).

At block 3004, the first device may generate a link identifier for the link. For example, the link identifier may be an alphanumeric character or string of characters, such as a time stamp or a sequence number. In one or more implementations, each link generated by a devices may have a sequence number that is a number that is one number higher than the sequence number of the last link generated by that device.

At block 3006, the first device may provide (e.g., as described above in connection with FIG. 14), to a second device (e.g., electronic device 119) associated with the account, information associated with the link, the information including the device identifier and the link identifier. The first device may also provide a key such as a private key for the link from the first device to the second device (e.g., as described above in connection with FIG. 14).

At block 3008, the first device or the second device may provide, to a third device (e.g., electronic device 110) not logged into the account, the link to provide access for the third device to the communication session (e.g., as described above in connection with FIG. 14). In one or more implementations, the communication session may be initiated by the first device or the second device, and the first device and/or the second device may receive a request to join the communication session from the third device, the request including information (e.g., a service-specific alias for the account of the first device and the second device) included in the link.

In one or more implementations, the first device may generate a second link to join a different communication session. In one or more implementations, the first device may also generate a different link identifier for the second link. In one or more implementations, the second link may be generated using the device identifier for the first device and a different link identifier.

In one or more implementations, the first device may receive a link check-in communication from the second device, the link check-in communication including the device identifier and the link identifier (e.g., as described above in connection with FIG. 15). The first device may determine whether to perform an update process for the second device by determining whether the link identifier meets one or more criteria. For example, the first device may perform the update process by providing the second link to the second device based on a determination that the link identifier provided by the second device in the link check-in communication is associated with a time that is earlier in time than a time associated with the different link identifier (e.g., as described above in connection with FIG. 16). In another example, the first device may determine not to perform the update process based on a determination that the link identifier provided by the second device in the link check-in communication is not earlier in time than the different link identifier.

In one or more implementations, the first device may receive an additional link generated at a fourth device (e.g., electronic device 1700) associated with the account, the additional link including a device identifier (e.g., "Device C ID") for the fourth device, and an additional link identifier. The first device may receive the additional link from the fourth device or from another device such as the second device that has received the additional link from the fourth device. For example, the first device may receive a link check-in communication from the second device (e.g., after receiving the additional link from the fourth device), the link check-in communication including the device identifier for the fourth device and a further additional link identifier (e.g., as described above in connection with FIG. 17). The first device may provide (e.g., as described above in connection with FIG. 18) the additional link, previously received from the fourth device, to the second device, responsive to determining that the further additional link identifier meets one or more criteria (e.g., is associated with a time that is earlier in time than a time associated with the additional link identifier or is a sequence number that is less than an additional sequence number corresponding to the additional link identifier).

In another example, the first device sends the device identifier for the fourth device and the additional link identifier to the second device, and receives, after sending the device identifier for the fourth device and the additional link identifier to the second device, a further additional link including the device identifier for the fourth device and a further additional link identifier (e.g., as described above in connection with FIG. 19).

Figure 31:
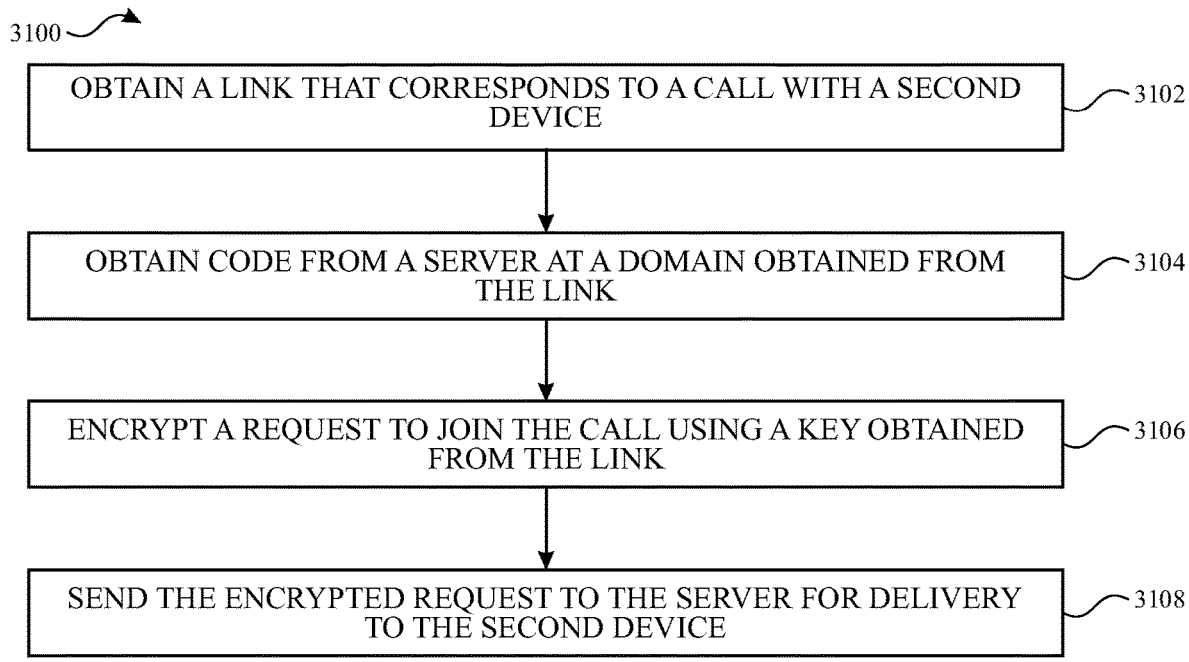
FIG. 31 illustrates a flow diagram of an example process for requesting to join a call in accordance with one or more implementations.

FIG. 31 illustrates a flow diagram of an example process 3100 for joining a conferencing session using a web-based application, in accordance with one or more implementations. For explanatory purposes, the process 3100 is primarily described herein with reference to the components of FIGS. 1 and 2 (particularly with reference to electronic device 110), which may be executed by one or more processors of the electronic device 110 of FIGS. 1 and 2. However, the process 3100 is not limited to the electronic device 115, and one or more blocks (or operations) of the process 3100 may be performed by one or more other components of other suitable devices, such as one or more of the electronic device 117, the electronic device 115, the electronic device 119, and/or one or more servers such as the server 120 and/or the server 130. Further for explanatory purposes, the blocks of the process 3100 are described herein as occurring in serial, or linearly. However, multiple blocks of the process 3100 may occur in parallel. In addition, the blocks of the process 3100 need not be performed in the order shown and/or one or more blocks of the process 3100 need not be performed and/or can be replaced by other operations.

At block 3102, a first device (e.g., electronic device 110) may obtain a link that corresponds to a call with a second device (e.g., electronic device 115). For example, the link may be received from the second device (e.g., in a message, or an email) or from a social media post or a web page (as examples)

At block 3104, the first device may obtain code (e.g., JavaScript or other code) from a server (e.g., server 130) at a domain obtained from the link. For example, the first device may obtain the code by sending a code request (e.g., an HTTP request) to the server (e.g., server 130) and receiving the code responsive to the code request (e.g., as described above in connection with FIG. 20).

At block 3106, the first device may execute the code to encrypt a request to join the call using a key obtained from the link. For example, the key may be included in the link, or an encoded version of the key may be included in the link. For example, the key may be a public key that corresponds to a private key generated by the second device and inaccessible by the server.

At block 3108, the first device may execute the code to send the encrypted request to the server for delivery to the second device (e.g., as described above in connection with FIG. 21). For example, sending the encrypted request to the server for delivery to the second device may include sending the encrypted request to the server with an alias (e.g., a service-specific alias) for an account associated with the second device. For example, information used to identify the alias may be included in the link (e.g., the alias or an encoded version of the alias may be included in the link). In one or more implementations, the alias is free of identifying information of a user of the second device. For example, in one or more implementations, the link and the request do not include (1) identifying information of current participants in the call and (2) keys for decrypting communication within the call.

In one or more implementations, the request includes information used to identify a public key for the first device. For example, the public key or an encrypted or encoded version of the public key for the first device may be included in or sent along with the encrypted request.

In one or more implementations, the first device may receive an encrypted response to the request from the server (e.g., as described above in connection with FIG. 21). For example, the encrypted response may be received via the server from the second device. The first device may decrypt the encrypted response using a private key corresponding to the public key for the first device and using the key obtained using the link. The first device may obtain an identifier of the call (e.g., a Session ID) from the decrypted response. The first device may receive, using the obtained code, an invitation to join a call associated with the identifier (e.g., as describe above in connection with FIG. 22). The first device may receive an input to an input component indicating acceptance of the invitation, and may join the call based on receiving the input. In various implementations, the encrypted response may include an approval that was provided a third device that is a participant in the call and that has been encrypted by the first device or a fourth device that is associated with an account associated with the first device (e.g., as described above in connection with FIGS. 23 and/or 24).

In one or more implementations, the first device may obtain, using the obtained code, a temporary identifier for the first device from the server (e.g., as described above in connection with FIG. 20). The first device may provide the temporary identifier to the server with the encrypted request and/or the server may store the temporary identifier in connection with the request, the call, and/or the first device. The server may limit the number of requests that can be made from any device associated with the temporary identifier (e.g., until a trusted device, such as a device that has been in a call for greater than a minimum amount of time, or a device included on an original invitation for a call, approves a request from a device associated with the temporary identifier).

Figure 32:
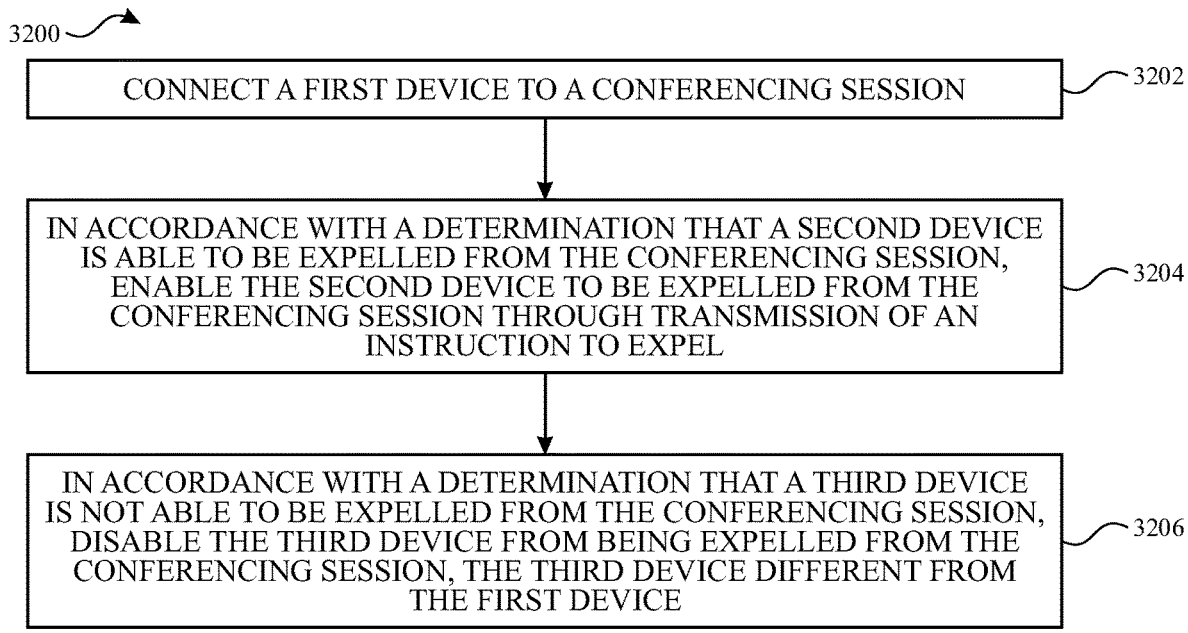
FIG. 32 illustrates a flow diagram of an example process for managing devices in a conferencing session in accordance with one or more implementations.

FIG. 32 illustrates a flow diagram of an example process 3200 for expelling participants in a conferencing session, in accordance with one or more implementations. For explanatory purposes, the process 3200 is primarily described herein with reference to the components of FIGS. 1 and 2 (particularly with reference to electronic device 115), which may be executed by one or more processors of the electronic device 115 of FIGS. 1 and 2. However, the process 3200 is not limited to the electronic device 115, and one or more blocks (or operations) of the process 3200 may be performed by one or more other components of other suitable devices, such as one or more of the electronic device 117, the electronic device 110, the electronic device 119, and/or one or more servers such as the server 120 and/or the server 130. Further for explanatory purposes, the blocks of the process 3200 are described herein as occurring in serial, or linearly. However, multiple blocks of the process 3200 may occur in parallel. In addition, the blocks of the process 3200 need not be performed in the order shown and/or one or more blocks of the process 3200 need not be performed and/or can be replaced by other operations.

At block 3202, a first device (e.g., electronic device 115) connects to a conferencing session. For example, the conferencing session may correspond to a voice call or a video call. For example, connecting to the conferencing session may include connecting the first device to the conferencing session via a conferencing application at the first device. As another example, connecting to the conferencing session may include connecting the first device to the conferencing session via a web-based application.

At block 3204, in accordance with a determination that a second device (e.g., electronic device 110) is able to be expelled (e.g., is an expellable device) from the conferencing session, enabling the second device to be expelled from the conferencing session through transmission of a instruction to expel (e.g., through transmission of an expel request, as described above in connection with FIGS. 25 and 26). In some examples, the enabling is performed by the first device (e.g., by determining whether the second device has been in the conferencing session for a predetermined period of time and/or by determining a joining method or connection mechanism of the second device). In some examples, the enabling is performed by the server (e.g., by determining whether the second device has been in the conferencing session for a predetermined period of time and/or by determining a joining method or connection mechanism of the second device).

For example, the first device and/or the server may determine that the second device is able to be expelled from the conferencing session for a pre-determined amount of time (e.g., based on an expelling factor corresponding to the pre-determined amount of time) following admission of the second device into the conferencing session. In one or more implementations, the second device is enabled to be expelled from the conferencing session while the first device exchanges at least audio streams with the second device during at least a portion of the conferencing session (e.g., prior to the end of the pre-determined amount of time). In some examples, after a pre-determined amount of time following the second device being admitted to the conferencing session, the first device and/or the server and/or another participant device determines that the second device is no longer able to be expelled.

In some examples, the first device may determine that the second device is able to be expelled from the conferencing session based on a first connection factor (e.g., a joining method factor) that corresponds to a first connection mechanism (e.g., a conferencing application at a device or a web-based application) by which the second device is connected to the conferencing session. For example, the first connection mechanism may be a conferencing application at the second device. In some examples, the first device is unable to remove the second device that is connected to the conferencing session by the conferencing application at the second device from the conferencing session. In some examples, the first device is an initiator of the conferencing session.

At block 3206, in accordance with a determination that a third device (e.g., electronic device 110 or another electronic device) is not able to be expelled (e.g., is a non-expellable device) from the conferencing session, the third device may be disabled from being expelled from the conferencing session. The third device may be different from the first device. For example, the first device and/or the server may determine that the third device is not able to be expelled from the conferencing session after a pre-determined amount of time following admission of the third device into the conferencing session. In one or more implementations, third device is the second device.

In some examples, the first device may determine that the third device is not able to be expelled from the conferencing session based on a second connection factor that corresponds to a second connection mechanism by which the third device is connected to the conferencing session. For example, the second connection mechanism may be a web-based application at the second device. In one or more implementations, the second device did not initiate the conferencing session. In one or more implementations, the third device did not initiate the conferencing session.

In one or more implementations, prior to the pre-determined amount of time following the admission of the second device into the conferencing session, while the second device is able to be expelled from the conferencing session through the transmission of the instruction to expel (e.g., an expel request), the first device may transmit the instruction to expel from the first device to a server (e.g., server 130). The first device may receive a confirmation at the first device from the server that the second device has been expelled from the conferencing session (e.g., as described above in connection with FIGS. 25 and 26).

In one or more implementations, after the pre-determined amount of time following the admission of the third device into the conferencing session, while the third device is disabled from being expelled from the conferencing session, the first device may transmit, to a server (e.g., server 130), an instruction to expel the third device. The first device may receive a response at the first device from the server indicating that the third device cannot be expelled from the conferencing session (e.g., as described above in connection with FIGS. 25 and 27).

In some examples, the first device starts a timer upon admission of the second device into the video conferencing session. In some examples, another participant device in the conferencing session also starts a timer upon admission of the second device into the video conferencing session, and identifies the second device as a non-expellable device after expiration of the timer of the third participant device.

In some examples, a server (e.g., server 130) that relays data between the first device and the second device during the conferencing session also starts a timer upon admission of the second device into the conferencing session, and identifies the second device as a non-expellable device after expiration of the timer of the server. In some examples, the timer of the first device is different from the timer of the server. In some examples, before the pre-determined amount of time (e.g., before expiration of a timer for the second device at a the first device), while the second device is identified by the first device as an expellable device (e.g., and identified by the server as a non-expellable device), the first device provides a request to a server to remove the second device from the conferencing session, and receives a response indicating that the second device cannot be removed from the conferencing session (e.g., as described above in connection with FIGS. 25 and 27).

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing conferencing sessions for electronic devices. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of conferencing sessions for electronic devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 33:
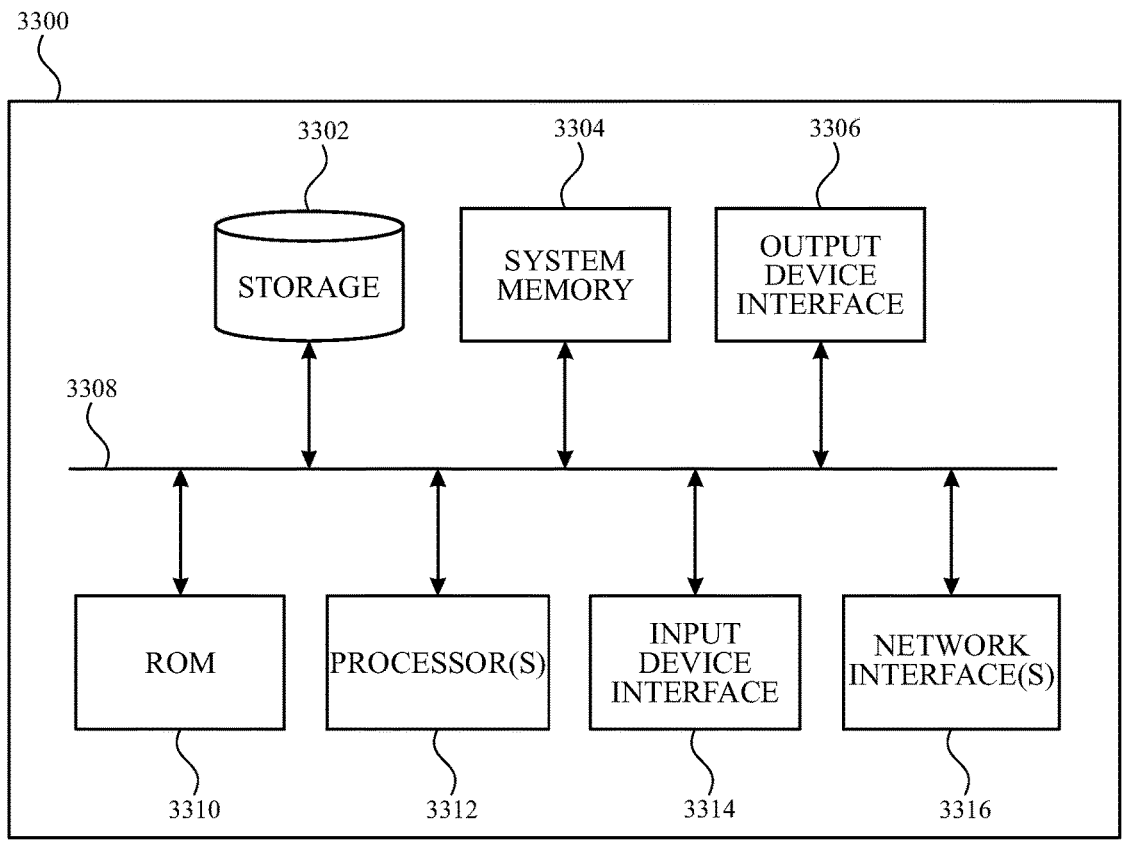
FIG. 33 illustrates an electronic system with which one or more implementations of the subject technology may be implemented.

FIG. 33 illustrates an electronic system 3300 with which one or more implementations of the subject technology may be implemented. The electronic system 3300 can be, and/or can be a part of, the electronic device 110, the electronic device 115, the electronic device 117, the electronic device 119, the server 120, and/or the server 130 shown in FIG. 1. The electronic system 3300 may include various types of computer readable media and interfaces for various other types of computer readable media. The electronic system 3300 includes a bus 3308, one or more processing unit(s) 3312, a system memory 3304 (and/or buffer), a ROM 3310, a permanent storage device 3302, an input device interface 3314, an output device interface 3306, and one or more network interfaces 3316, or subsets and variations thereof.

The bus 3308 collectively represents all system, peripheral, and chipset buses that communicatively connect the numerous internal devices of the electronic system 3300. In one or more implementations, the bus 3308 communicatively connects the one or more processing unit(s) 3312 with the ROM 3310, the system memory 3304, and the permanent storage device 3302. From these various memory units, the one or more processing unit(s) 3312 retrieves instructions to execute and data to process in order to execute the processes of the subject disclosure. The one or more processing unit(s) 3312 can be a single processor or a multi-core processor in different implementations.

The ROM 3310 stores static data and instructions that are needed by the one or more processing unit(s) 3312 and other modules of the electronic system 3300. The permanent storage device 3302, on the other hand, may be a read-and-write memory device. The permanent storage device 3302 may be a non-volatile memory unit that stores instructions and data even when the electronic system 3300 is off. In one or more implementations, a mass-storage device (such as a magnetic or optical disk and its corresponding disk drive) may be used as the permanent storage device 3302.

In one or more implementations, a removable storage device (such as a floppy disk, flash drive, and its corresponding disk drive) may be used as the permanent storage device 3302. Like the permanent storage device 3302, the system memory 3304 may be a read-and-write memory device. However, unlike the permanent storage device 3302, the system memory 3304 may be a volatile read-and-write memory, such as random access memory. The system memory 3304 may store any of the instructions and data that one or more processing unit(s) 3312 may need at runtime. In one or more implementations, the processes of the subject disclosure are stored in the system memory 3304, the permanent storage device 3302, and/or the ROM 3310. From these various memory units, the one or more processing unit(s) 3312 retrieves instructions to execute and data to process in order to execute the processes of one or more implementations.

The bus 3308 also connects to the input and output device interfaces 3314 and 3306. The input device interface 3314 enables a user to communicate information and select commands to the electronic system 3300. Input devices that may be used with the input device interface 3314 may include, for example, alphanumeric keyboards and pointing devices (also called "cursor control devices"). The output device interface 3306 may enable, for example, the display of images generated by electronic system 3300. Output devices that may be used with the output device interface 3306 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 33, the bus 3308 also couples the electronic system 3300 to one or more networks and/or to one or more network nodes, such as the electronic device 115 shown in FIG. 1, through the one or more network interface(s) 3316. In this manner, the electronic system 3300 can be a part of a network of computers (such as a LAN, a wide area network ("WAN"), or an Intranet, or a network of networks, such as the Internet. Any or all components of the electronic system 3300 can be used in conjunction with the subject disclosure.

In accordance with various aspects of the subject disclosure, a device is provided that includes a memory and at least one processor communicatively coupled to the memory and configured to receive a plurality of components of a uniform resource locator (URL); verify whether the plurality of components include one or more expected components for the URL; in response to verifying that the plurality of components include one or more expected components for the URL, determine whether content of at least one of the one or more expected components for the URL is valid; in response to determining that the content of at least one of the one or more expected components for the URL is valid, encode the content of the at least one of the one or more expected components for the URL; and assemble the URL by combining the encoded content of the at least one of the one or more expected components for the URL with at least one additional component of the URL.

In accordance with various aspects of the subject disclosure, a non-transitory computer-readable medium is provided that includes instructions, which when executed by at least one computing device, cause the at least one computing device to perform operations that include receiving, at a first device, a plurality of components of a uniform resource locator (URL); verifying whether the plurality of components include one or more expected components for the URL; in response to verifying that the plurality of components include one or more expected components for the URL, determining whether content of at least one of the one or more expected components for the URL is valid; in response to determining that the content of at least one of the one or more expected components for the URL is valid, encoding the content of the at least one of the one or more expected components for the URL; and assembling the URL by combining the encoded content of the at least one of the one or more expected components for the URL with at least one additional component of the URL.

In accordance with various aspects of the subject disclosure, a method is provided that includes receiving, at a first device, a plurality of components of a uniform resource locator (URL); verifying whether the plurality of components include one or more expected components for the URL; in response to verifying that the plurality of components include one or more expected components for the URL, determining whether content of at least one of the one or more expected components for the URL is valid; in response to determining that the content of at least one of the one or more expected components for the URL is valid, encoding the content of the at least one of the one or more expected components for the URL; and assembling the URL by combining the encoded content of the at least one of the one or more expected components for the URL with at least one additional component of the URL.

In accordance with various aspects of the subject disclosure, a method is provided that includes receiving, at a first device, a request to join a call with a second device, the request including a plurality of components of a uniform resource locator (URL); assembling, by the first device, the URL using the plurality of components for the URL; and joining the call, by the first device, using the assembled URL.

In accordance with various aspects of the subject disclosure, a method is provided that includes, by a device including an input component and logged into an account associated with an account alias: obtaining, based on an input detected by the input component, a definition of a set of services; providing a request for a service-specific alias for the account, the request including one or more identifiers corresponding to the set of services, the service-specific alias separate from the account alias and configured to allow or deny communications to one or more devices associated with the account via the set of services; and, after providing the request, receiving the service-specific alias.

In accordance with various aspects of the subject disclosure, a method is provided that includes, by one or more servers: receiving a request from a device to contact an account via a service, the request including a service-specific alias for the account, and configured to allow contact with one or more devices associated with the account via a set of services; obtaining a stored set of services for the service-specific alias, the stored set of services defined by a device associated with the account; in response to determining that the service is included in the stored set of services, allowing contact with the one or more devices associated with the account; and in response to determining that the service is not included in the stored set of services, denying the request.

In accordance with various aspects of the subject disclosure, a method is provided that includes generating, by a first device that is associated with an account and a device identifier, a link to join a communication session; generating, by the first device, a link identifier for the link; providing, from the first device to a second device associated with the account, information associated with the link, the information including the device identifier and the link identifier; and providing, from the first device or the second device to a third device not logged into the account, the link to provide access for the third device to the communication session In accordance with various aspects of the subject disclosure, a method is provided that includes, by a first device: obtaining a link that corresponds to a call with a second device; obtaining code from a server at a domain obtained from the link; and executing the code to: encrypt a request to join the call using a key obtained using the link; and send the encrypted request to the server for delivery to the second device.

In accordance with various aspects of the subject disclosure, a method is provided that includes, by a first device: connecting to a conferencing session; determining an expelling factor for a second device; and identifying the second device as an expellable device that can be expelled from the conferencing session or a non-expellable device that is non-expellable from the conferencing session based on the expelling factor.

In accordance with various aspects of the subject disclosure, a method is provided that includes, connecting, by a first device, to a conferencing session; in accordance with a determination that a second device is able to be expelled from the conferencing session, enabling the second device to be expelled from the conferencing session through transmission of a instruction to expel; and, in accordance with a determination that a third device is not able to be expelled from the conferencing session, disabling the third device from being expelled from the conferencing session, wherein the third device is different from the first device Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   by a device including an input component and logged into an account, wherein the account is associated with an account alias:
   obtaining, based on an input detected by the input component, an indication of a selected set of services from a plurality of services;
   providing a request for a service-specific alias for the account, the request including one or more identifiers corresponding to the selected set of services, wherein the service-specific alias is separate from the account alias and configured to allow or deny communications from a remote device to one or more devices associated with the account via the selected set of services, the remote device being separate from another device to which the request is provided; and
   after providing the request, receiving the service-specific alias.

2. The method of claim 1, further comprising:
   detecting, by the device, a proximity-based interaction with a second device,
   wherein providing the request for the service-specific alias comprises providing the request from the device to a server storing an identification of the account alias of the account responsive to detecting the proximity-based interaction, and
   wherein the service-specific alias is a message alias for contacting the one or more devices associated with the account via a messaging service.

3. The method of claim 1, further comprising:
   detecting, by the device, a disconnection of a proximity-based connection between the device and a second device, and
   wherein providing the request for the service-specific alias comprises providing the request from the device to a server storing an identification of the account alias of the account responsive to detecting the disconnection of the proximity-based connection.

4. The method of claim 1, further comprising sending the service-specific alias from the device to the remote device to allow the remote device to provide communications to the one or more devices associated with the account via the set of services.

5. The method of claim 1, wherein the set of services includes one or more of a messaging service, a file transfer service, a video conferencing service, or a gaming service.

6. The method of claim 1, wherein the service-specific alias is a temporary alias having an expiration time initially defined upon provisioning of the service-specific alias.

7. The method of claim 1, further comprising obtaining a limited scope for the set of services based on the input detected by the input component, wherein the service-specific alias is a service-specific and scope-limited alias configured to allow or deny communications to the one or more devices associated with the account via the set of services and within the limited scope.

8. The method of claim 1, wherein providing the request for the service-specific alias comprises providing the request from the device to a server storing an identification of the account alias of the account, and wherein the account alias is configured to allow contact with the one or more devices associated with the account via any service that the account alias is registered with, including at least one service that is independent of the server.

9. An electronic device, comprising:
   a memory;
   an input component; and
   one or more processors configured to:
   obtain, based on an input detected by the input component, a definition of a set of services of a plurality of services;
   provide a request for a service-specific alias for an account to which the electronic device is logged in, wherein the account is associated with an account alias, wherein the request includes one or more identifiers corresponding to the set of services, and wherein the service-specific alias is separate from the account alias and configured to allow or deny communications from a remote device to one or more devices associated with the account via the set of services, the remote device being separate from another device to which the request is provided; and
   after providing the request, receiving the service-specific alias.

10. The electronic device of claim 9, wherein the one or more processors are further configured to:
    detect a proximity-based interaction with a second device,
    wherein the one or more processors are configured to provide the request for the service-specific alias by providing the request to a server storing an identification of the account alias of the account responsive to detecting the proximity-based interaction, and
    wherein the service-specific alias is a message alias for contacting the one or more devices associated with the account via a messaging service.

11. The electronic device of claim 9, wherein the one or more processors are further configured to:
    detect a disconnection of a proximity-based connection between the electronic device and a second device, and
    wherein the one or more processors are configured to provide the request for the service-specific alias by providing the request to a server storing an identification of the account alias of the account responsive to detecting the disconnection of the proximity-based connection.

12. The electronic device of claim 9, wherein the one or more processors are further configured to send the service-specific alias to the remote device to allow the remote device to provide communications to the one or more devices associated with the account via the set of services.

13. The electronic device of claim 9, wherein the set of services includes one or more of a messaging service, a file transfer service, a video conferencing service, or a gaming service.

14. The electronic device of claim 9, wherein the service-specific alias is a temporary alias having an expiration time initially defined upon provisioning of the service-specific alias.

15. The electronic device of claim 9, wherein the one or more processors are further configured to obtain a limited scope for the set of services based on the input detected by the input component, and wherein the service-specific alias is a service-specific and scope-limited alias configured to allow or deny communications to the one or more devices associated with the account via the set of services and within the limited scope.

16. The electronic device of claim 9, wherein the one or more processors are configured to provide the request for the service-specific alias by providing the request to a server storing an identification of the account alias of the account, and wherein the account alias is configured to allow contact with the one or more devices associated with the account via any service that the account alias is registered with, including at least one service that is independent of the server.

17. A non-transitory computer-readable medium storing instructions which, when executed by one or more processors, cause the one or more processors to perform operations comprising:
by a device including an input component and logged into an account, wherein the account is associated with an account alias:
obtaining, based on an input detected by the input component, a definition of a set of services;
providing a request for a service-specific alias for the account, the request including identifiers corresponding to multiple services of the set of services, wherein the service-specific alias is separate from the account alias and configured to allow or deny communications from a remote device to one or more devices associated with the account via the set of services, the remote device being separate from another device to which the request is provided; and
after providing the request, receiving the service-specific alias.

18. The non-transitory computer-readable medium of claim 17, the operations further comprising:
detecting, by the device, a proximity-based interaction with a second device,
wherein providing the request for the service-specific alias comprises providing the request from the device to a server storing an identification of the account alias of the account responsive to detecting the proximity-based interaction, and
wherein the service-specific alias is a message alias for contacting the one or more devices associated with the account via a messaging service.

19. The non-transitory computer-readable medium of claim 17, the operations further comprising:
detecting, by the device, a disconnection of a proximity-based connection between the device and a second device, and
wherein providing the request for the service-specific alias comprises providing the request from the device to a server storing an identification of the account alias of the account responsive to detecting the disconnection of the proximity-based connection.

20. The non-transitory computer-readable medium of claim 17, the operations further comprising sending the service-specific alias from the device to the remote device to allow the remote device to provide communications to the one or more devices associated with the account via the set of services.

21. The method of claim 1, wherein the one or more identifiers included in the request correspond to a selected subset of the set of services.

* * * * *